(12) United States Patent
Rivera

(10) Patent No.: US 12,161,254 B2
(45) Date of Patent: *Dec. 10, 2024

(54) COFFEE HOLDER

(71) Applicant: Adrian Rivera, Whittier, CA (US)

(72) Inventor: Adrian Rivera, Whittier, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/395,368

(22) Filed: Dec. 22, 2023

(65) Prior Publication Data

US 2024/0122399 A1 Apr. 18, 2024

Related U.S. Application Data

(63) Continuation of application No. 18/239,093, filed on Aug. 28, 2023, now Pat. No. 11,903,518, which is a
(Continued)

(51) Int. Cl.
*A47J 31/047* (2006.01)
*A47J 31/06* (2006.01)
*A47J 31/44* (2006.01)

(52) U.S. Cl.
CPC .......... *A47J 31/446* (2013.01); *A47J 31/047* (2013.01); *A47J 31/0647* (2013.01); *A47J 31/44* (2013.01)

(58) Field of Classification Search
CPC ... A47B 81/00; A47J 31/4482; A47J 31/3623; A47J 31/3695; A47J 31/0668; A47J 31/369; A47J 31/04; A47J 31/047; A47J 31/20; A47J 31/50; A47J 31/407; A47J 31/0605; A47J 31/4403; A47J 31/061; A47J 31/06; A47J 31/3633; A47J 31/3638; A47J 31/0642; A47J 31/0626; A47J 31/46; A47J 31/56

USPC ......... 99/272, 322, 323, 281, 284, 286, 287, 99/292, 293, 295, 997, 299, 300, 303, 99/304, 452, 453
See application file for complete search history.

(56) References Cited

U.S. PATENT DOCUMENTS 1,743,925 A 1/1930 Krause
1,871,590 A 8/1932 D'Annunzio et al.
(Continued)

FOREIGN PATENT DOCUMENTS

CN 2850479 Y 12/2006
CN ZL 200520143365.6 12/2006
(Continued)

OTHER PUBLICATIONS

United States District Court Western District of Washington Case No. C15-0522RSL, Order Construing Claims, Feb. 24, 2016.
(Continued)

*Primary Examiner* — Phuong T Nguyen
(74) *Attorney, Agent, or Firm* — IP Strategies

(57) ABSTRACT

A coffee holder includes a holder body and a holder lid. The holder body includes a holder base, a holder sidewall extending from the base and defining an interior configured to receive loose coffee, and an open receiving end opposite the base. The holder lid is configured to engage the holder body to cover the open receiving end. The holder lid includes a recessed portion that extends into the holder body interior when the holder lid engages the holder body, and a passage in the recessed portion configured to allow fluid to flow into the holder body interior from the recessed portion.

30 Claims, 44 Drawing Sheets

Related U.S. Application Data continuation of application No. 16/905,853, filed on Jun. 18, 2020, now Pat. No. 11,737,597, which is a continuation of application No. 13/644,501, filed on Oct. 4, 2012, now Pat. No. 11,534,020, which is a continuation-in-part of application No. 12/762,262, filed on Apr. 16, 2010, now Pat. No. 9,844,292, and a continuation-in-part of application No. 12/620,584, filed on Nov. 17, 2009, now Pat. No. 8,291,812, and a continuation-in-part of application No. 12/610,181, filed on Oct. 30, 2009, now Pat. No. 8,621,981.

(56) References Cited

U.S. PATENT DOCUMENTS

| | | |
|---|---|---|
| 2,433,815 A | 12/1947 | Laforge |
| 3,022,411 A | 2/1962 | Soper et al. |
| 3,115,822 A | 12/1963 | Totten |
| 3,119,682 A | 1/1964 | Martin et al. |
| 3,120,170 A | 2/1964 | Garte |
| 3,136,241 A | 6/1964 | Price |
| 3,199,682 A | 8/1965 | Scholtz |
| 3,224,360 A | 12/1965 | Wickenberg et al. |
| 3,269,298 A | 8/1966 | Grundmann |
| 3,316,388 A | 4/1967 | Wickenberg et al. |
| 3,326,115 A | 6/1967 | Karlen et al. |
| 3,336,857 A | 8/1967 | Knodt et al. |
| 3,384,004 A | 5/1968 | Perlman et al. |
| 3,403,617 A | 10/1968 | Lampe |
| 3,405,630 A | 10/1968 | Weber, III |
| 3,411,431 A | 11/1968 | Moerlini et al. |
| 3,446,624 A | 5/1969 | Luedtke |
| 3,478,670 A | 11/1969 | Fuqua |
| 3,530,787 A | 9/1970 | Litterio |
| 3,583,308 A | 6/1971 | Williams |
| 3,592,126 A | 7/1971 | Dombrowik |
| 3,599,557 A | 8/1971 | Leal |
| 3,607,297 A | 9/1971 | Fasano |
| 3,695,168 A | 10/1972 | Van Brunt |
| 3,757,670 A | 9/1973 | Laama et al. |
| 3,812,273 A | 5/1974 | Schmidt |
| 3,844,206 A | 10/1974 | Weber |
| 3,878,772 A | 4/1975 | Nordskog |
| 3,948,157 A | 4/1976 | Layre |
| 3,958,502 A | 5/1976 | Vitous |
| 4,036,121 A | 7/1977 | Bieri |
| 4,052,318 A | 10/1977 | Krebs |
| 4,086,848 A | 5/1978 | Hahn |
| 4,143,590 A | 3/1979 | Kasakoff |
| 4,164,644 A | 8/1979 | Remsnyder et al. |
| D255,313 S | 6/1980 | Elkerbout |
| 4,221,670 A | 9/1980 | Ziemek |
| 4,253,385 A | 3/1981 | Illy |
| 4,286,515 A | 9/1981 | Baumann et al. |
| 4,300,442 A | 11/1981 | Martin |
| 4,510,853 A | 4/1985 | Takagi |
| 4,550,024 A | 10/1985 | le Granse |
| 4,603,621 A | 8/1986 | Roberts |
| 4,644,855 A | 2/1987 | Woolman et al. |
| 4,644,856 A | 2/1987 | Borgmann |
| 4,703,687 A | 11/1987 | Wei |
| 4,704,954 A | 11/1987 | Mollenhoff |
| 4,706,555 A | 11/1987 | Nakamura et al. |
| 4,721,835 A | 1/1988 | Welker |
| 4,739,697 A | 4/1988 | Roberts |
| 4,759,274 A | 7/1988 | Schmidt |
| 4,800,089 A | 1/1989 | Scott |
| 4,832,845 A | 5/1989 | Hendretti |
| 4,833,979 A | 5/1989 | Garulli et al. |
| 4,858,523 A | 8/1989 | Helbling |
| 4,865,737 A | 9/1989 | McMichael |
| 4,867,880 A | 9/1989 | Pelle et al. |
| 4,967,648 A | 11/1990 | Helbling |
| 4,986,172 A | 1/1991 | Hunnicutt, Jr. |
| 4,998,463 A | 3/1991 | Precht et al. |
| 5,000,082 A | 3/1991 | Lassota |
| 5,012,059 A | 4/1991 | Boatman |
| 5,012,629 A | 5/1991 | Rehman et al. |
| 5,028,328 A | 7/1991 | Long |
| 5,046,409 A | 9/1991 | Henn |
| 5,072,660 A | 12/1991 | Helbling |
| 5,108,768 A | 4/1992 | So |
| 5,109,763 A | 5/1992 | Morris et al. |
| 5,123,335 A | 6/1992 | Aselu |
| 5,171,457 A | 12/1992 | Acuff et al. |
| 5,190,653 A | 3/1993 | Herrick et al. |
| 5,197,374 A | 3/1993 | Fond |
| 5,233,914 A | 8/1993 | English |
| 5,242,702 A | 9/1993 | Fond |
| 5,243,164 A | 9/1993 | Erickson et al. |
| 5,265,517 A | 11/1993 | Gilbert |
| 5,267,506 A | 12/1993 | Cai |
| 5,287,797 A | 2/1994 | Grykiewicz et al. |
| 5,298,267 A | 3/1994 | Gruenbacher |
| 5,325,765 A | 7/1994 | Sylvan et al. |
| 5,335,589 A | 8/1994 | Yerves, Jr. et al. |
| 5,343,799 A | 9/1994 | Fond |
| 5,347,916 A | 9/1994 | Fond et al. |
| 5,363,745 A | 11/1994 | Lin |
| 5,398,596 A | 3/1995 | Fond |
| 5,401,328 A | 3/1995 | Schmitz |
| 5,403,605 A | 4/1995 | Smith et al. |
| 5,406,882 A | 4/1995 | Shaanan |
| 5,424,083 A | 6/1995 | Lozito |
| 5,463,932 A | 11/1995 | Olson |
| 5,490,448 A | 2/1996 | Weller et al. |
| 5,526,733 A | 6/1996 | Klawuhn et al. |
| 5,528,730 A | 6/1996 | Yagi et al. |
| 5,531,152 A | 7/1996 | Gardosi |
| 5,562,941 A | 10/1996 | Levy |
| 5,582,730 A | 12/1996 | Hugentobler |
| 5,582,731 A | 12/1996 | Gianfranco |
| 5,605,710 A | 2/1997 | Pridonoff et al. |
| 5,633,026 A | 5/1997 | Gruenbacher |
| 5,635,233 A | 6/1997 | Levinson |
| 5,636,563 A | 6/1997 | Oppermann et al. |
| 5,649,412 A | 7/1997 | Binacchi |
| 5,669,287 A | 9/1997 | Jefferson, Jr. et al. |
| 5,676,041 A | 10/1997 | Glucksman et al. |
| 5,775,206 A | 7/1998 | St-Gelais |
| 5,829,340 A | 11/1998 | Yang |
| 5,840,189 A | 11/1998 | Sylvan et al. |
| 5,865,094 A | 2/1999 | Kealy |
| 5,865,095 A * | 2/1999 | Mulle .............. A47J 31/42 99/293 |
| 5,870,943 A | 2/1999 | Levi et al. |
| 5,875,704 A | 3/1999 | Levi et al. |
| 5,887,508 A | 3/1999 | Estaun |
| 5,887,510 A | 3/1999 | Porter |
| D407,602 S | 4/1999 | Patel |
| 5,895,672 A | 4/1999 | Cooper |
| 5,897,899 A | 4/1999 | Fond |
| 5,924,563 A | 7/1999 | Salyers |
| 5,932,260 A | 8/1999 | Soughan |
| 6,065,609 A | 5/2000 | Lake |
| 6,079,315 A | 6/2000 | Beaulieu et al. |
| 6,118,933 A | 9/2000 | Roberson |
| D431,423 S | 10/2000 | Ohm et al. |
| 6,136,352 A | 10/2000 | Silverstein et al. |
| 6,161,470 A | 12/2000 | Justus |
| 6,164,191 A | 12/2000 | Liu et al. |
| 6,182,554 B1 | 2/2001 | Beaulieu et al. |
| 6,189,438 B1 | 2/2001 | Bielfeldt et al. |
| RE37,173 E | 5/2001 | Jefferson, Jr. et al. |
| 6,227,102 B1 | 5/2001 | Sham et al. |
| 6,231,909 B1 | 5/2001 | Levinson |
| 6,250,209 B1 | 6/2001 | Pope |
| 6,253,662 B1 | 7/2001 | Zelson |
| 6,263,781 B1 | 7/2001 | Calagui |
| D452,433 S | 12/2001 | Lazaris |
| D452,434 S | 12/2001 | Sweeney |
| D454,433 S | 3/2002 | Peter |
| 6,440,256 B1 | 8/2002 | Gordon et al. |
| 6,499,388 B2 | 12/2002 | Schmed |

(56) References Cited

U.S. PATENT DOCUMENTS

| | | |
|---|---|---|
| 6,510,783 B1 | 1/2003 | Basile et al. |
| D474,110 S | 5/2003 | Sweeney |
| D474,111 S | 5/2003 | Lazaris |
| 6,589,577 B2 | 7/2003 | Lazaris et al. |
| 6,606,938 B2 | 8/2003 | Taylor |
| 6,607,762 B2 | 8/2003 | Lazaris et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,662,955 B1 | 12/2003 | Lassota |
| 6,672,200 B2 | 1/2004 | Duffy et al. |
| 6,708,600 B2 | 3/2004 | Winkler et al. |
| 6,727,484 B2 | 4/2004 | Policappelli |
| 6,740,345 B2 | 5/2004 | Cai |
| 6,748,850 B1 | 6/2004 | Kraan |
| 6,758,130 B2 | 7/2004 | Sargent et al. |
| 6,763,759 B2 | 7/2004 | Denisart |
| 6,777,007 B2 | 8/2004 | Cai |
| 6,786,134 B2 | 9/2004 | Green |
| 6,786,136 B2 | 9/2004 | Cirigliano et al. |
| 6,810,788 B2 | 11/2004 | Hale |
| 6,832,542 B2 | 12/2004 | Hu et al. |
| 6,843,165 B2 | 1/2005 | Stoner |
| 6,854,378 B2 | 2/2005 | Jarisch et al. |
| D502,362 S | 3/2005 | Lazaris et al. |
| 6,904,840 B1 | 6/2005 | Pfeifer et al. |
| 6,948,420 B2 | 9/2005 | Kirschner et al. |
| 6,968,775 B2 | 11/2005 | Burrows et al. |
| 6,994,015 B2 | 2/2006 | Bruinsma |
| 7,047,870 B2 | 5/2006 | Gantt et al. |
| 7,081,263 B2 | 7/2006 | Albrecht |
| 7,131,369 B2 | 11/2006 | Gantt et al. |
| 7,165,488 B2 | 1/2007 | Bragg et al. |
| D541,587 S | 5/2007 | Pezij |
| 7,270,050 B2 | 9/2007 | Glucksman et al. |
| 7,284,679 B2 | 10/2007 | Zill et al. |
| 7,320,274 B2 | 1/2008 | Castellani |
| 7,328,651 B2 | 2/2008 | Halliday et al. |
| 7,377,089 B2 | 5/2008 | Rapparini |
| 7,461,587 B2 | 12/2008 | Guerrero |
| 7,673,558 B2 | 3/2010 | Panesar et al. |
| 7,681,492 B2 | 3/2010 | Liverani et al. |
| 7,685,931 B2 | 3/2010 | Rivera |
| 7,703,381 B2 | 4/2010 | Liverani et al. |
| 7,730,829 B2 | 6/2010 | Hammad |
| 7,836,819 B2 | 11/2010 | Suggi Liverani et al. |
| 7,845,270 B2 | 12/2010 | Rahn et al. |
| 7,856,920 B2 | 12/2010 | Schmed et al. |
| 7,930,972 B2 | 4/2011 | Denisart et al. |
| 7,946,217 B2 | 5/2011 | Favre et al. |
| 7,980,169 B2 | 7/2011 | Fischer |
| 7,987,768 B2 | 8/2011 | Green et al. |
| 8,047,127 B2 | 11/2011 | Lin |
| 8,051,766 B1 | 11/2011 | Yu et al. |
| 8,087,347 B2 | 1/2012 | Halliday et al. |
| 8,250,970 B2 | 8/2012 | Thomas |
| 8,291,812 B2 | 10/2012 | Rivera |
| 8,327,754 B2 | 12/2012 | Kirschner et al. |
| D688,095 S | 8/2013 | DeMiglio et al. |
| 8,561,524 B2 | 10/2013 | DeMiglio et al. |
| D694,579 S | 12/2013 | Khubani |
| 8,720,320 B1 | 5/2014 | Rivera |
| 9,232,871 B2 | 1/2016 | Rivera |
| 9,232,872 B2 | 1/2016 | Rivera |
| 9,271,597 B2 | 3/2016 | Rivera |
| 9,402,501 B1 | 8/2016 | Vu |
| 2001/0043954 A1 | 11/2001 | Sweet |
| 2002/0005367 A1 | 1/2002 | Zelson |
| 2002/0023543 A1 | 2/2002 | Schmed |
| 2002/0035929 A1 | 3/2002 | Kanba et al. |
| 2002/0048621 A1 | 4/2002 | Boyd et al. |
| 2002/0059870 A1 | 5/2002 | Walters, Jr. et al. |
| 2002/0078831 A1 | 6/2002 | Cai |
| 2002/0148356 A1 | 10/2002 | Lazaris et al. |
| 2002/0148358 A1 | 10/2002 | Sweeney et al. |
| 2003/0006185 A1 | 1/2003 | Hepler |
| 2003/0041739 A1 | 3/2003 | Cai |
| 2003/0167928 A1 | 9/2003 | Mulle et al. |
| 2003/0200872 A1 | 10/2003 | Lin |
| 2003/0213370 A1 | 11/2003 | Hammad et al. |
| 2003/0222089 A1 | 12/2003 | Hale |
| 2003/0226449 A1 | 12/2003 | Carasso et al. |
| 2004/0005384 A1 | 1/2004 | Cai |
| 2004/0020368 A1 | 2/2004 | Cai |
| 2004/0020922 A1 | 2/2004 | Alves |
| 2004/0055472 A1 | 3/2004 | Stoner |
| 2004/0118290 A1 | 6/2004 | Cai |
| 2004/0182247 A1 | 9/2004 | Guerrero |
| 2004/0244600 A1 | 12/2004 | Lalanne-Eygun |
| 2004/0255790 A1 | 12/2004 | Green |
| 2005/0051478 A1 | 3/2005 | Karanikos et al. |
| 2005/0095158 A1 | 5/2005 | Kirschner et al. |
| 2005/0160918 A1 | 7/2005 | Winstanley et al. |
| 2005/0172819 A1 | 8/2005 | Chen et al. |
| 2005/0188854 A1 | 9/2005 | Green et al. |
| 2005/0236323 A1 | 10/2005 | Oliver et al. |
| 2005/0257695 A1 | 11/2005 | Dobranski et al. |
| 2005/0266122 A1 | 12/2005 | Franceschi |
| 2005/0284303 A1 | 12/2005 | Zell et al. |
| 2006/0019000 A1 | 1/2006 | Zanetti |
| 2006/0107841 A1 | 5/2006 | Schifferle |
| 2006/0150823 A1 | 7/2006 | Thomas |
| 2006/0159815 A1 | 7/2006 | Crook et al. |
| 2006/0169150 A1 | 8/2006 | Voss et al. |
| 2006/0174769 A1 | 8/2006 | Favre et al. |
| 2006/0196364 A1 | 9/2006 | Kirschner |
| 2006/0254428 A1 | 11/2006 | Glucksman et al. |
| 2007/0039477 A1 | 2/2007 | Bowden et al. |
| 2007/0175334 A1 | 8/2007 | Halliday et al. |
| 2007/0175338 A1 | 8/2007 | Glucksman et al. |
| 2007/0193452 A1 | 8/2007 | Campetella et al. |
| 2007/0259074 A1 | 11/2007 | Searchilli et al. |
| 2007/0277677 A1 | 12/2007 | Roberg |
| 2008/0216667 A1 | 9/2008 | Garman et al. |
| 2009/0202691 A1 | 8/2009 | Gauger |
| 2009/0229470 A1 | 9/2009 | Dorfmueller |
| 2009/0229471 A1 | 9/2009 | Lun et al. |
| 2010/0083843 A1 | 4/2010 | Denisart et al. |
| 2010/0288131 A1 | 11/2010 | Kilber et al. |
| 2010/0303964 A1 | 12/2010 | Beaulieu et al. |
| 2011/0209623 A1 | 9/2011 | Leung et al. |
| 2011/0274802 A1 | 11/2011 | Rivera |
| 2012/0207895 A1 | 8/2012 | Rivera |
| 2012/0207896 A1 | 8/2012 | Rivera |
| 2012/0276264 A1 | 11/2012 | Rivera |
| 2012/0285330 A1 | 11/2012 | Demiglio et al. |
| 2012/0285334 A1 | 11/2012 | Demiglio et al. |
| 2013/0017303 A1 | 1/2013 | Vu |
| 2013/0025466 A1 | 1/2013 | Fu et al. |
| 2013/0156897 A1 | 6/2013 | Goldstein |
| 2014/0245895 A1 | 9/2014 | DeMiglio et al. |
| 2014/0287105 A1 | 9/2014 | Husband et al. |

FOREIGN PATENT DOCUMENTS

| | | |
|---|---|---|
| EP | 1774879 B1 | 4/2007 |
| EP | 1886605 A1 | 2/2008 |
| FR | 948422 | 8/1949 |
| WO | 2005079637 A1 | 9/2005 |
| WO | 2005092160 A1 | 10/2005 |
| WO | 2011153272 A2 | 12/2011 |

OTHER PUBLICATIONS

United States District Court Western District of Washington Case No. C15-0522RSL, Order on Obviousness Regarding Claims 5, 8, 18, AND 19 Of U.S. Pat. No. 8,720,320, Jun. 14, 2018.

United States District Court Western District of Washington Case No. C15-0522RSL, Judgment in a Civil Case, Jun. 14, 2018.

United States District Court Western District of Washington Case No. C15-0522RSL, Judgment in a Civil Case, Jul. 13, 2018.

CAFC 2018-2215, 2018-2254, Decision, Jan. 13, 2020.

(56) References Cited

OTHER PUBLICATIONS

PTAB Case IPR2014-00042, Decision, Institution of Inter Partes Review, Feb. 19, 2014.
PTAB Case IPR2014-00042, Final Written Decision, Feb. 6, 2015.
PTAB Case IPR2014-00042, Petitioner's Updated Exhibit List, Nov. 14, 2014.
PTAB Case IPR2014-00042, Patent Owner's Updated Exhibit List, Sep. 9, 2014.
Davids, Kenneth. Coffee: A Guide to Buying, Brewing, and Enjoying. New York: St. Martin's Griffin, 2001; pp. 1-8, 127-137, 146-148, 189-190, 253.
PTAB Case IPR2014-00042, Deposition Transcript of Paul Phillips, dated Jul. 31, 2014.
Davids, Kenneth. Coffee: A Guide to Buying, Brewing, and Enjoying. New York: St. Martin's Griffin, 2001; pp. 160-164.
PTAB Case IPR2014-00042, Declaration of Alexander Slocum In Support of Opposition to Patent Owner's Motion to Amend, dated Aug. 13, 2014.
PTAB Case IPR2014-00042, Declaration of Alexander Slocum In Support of Petitioner's Reply to Patent Owner's Response, dated Aug. 13, 2014.
PTAB Case IPR2014-00042, Petitioner's Oral Hearing Demonstratives.
PTAB Case IPR2014-00042, Teleconference Transcript, dated Oct. 27, 2014.
PTAB Case IPR2014-00042, Teleconference Transcript, dated Nov. 13, 2014.
PTAB Case IPR2014-00042, Declaration of Paul Phillips in Support of Patent Owner's Response to the Petition and Patent Owner's Motion to Amend.
PTAB Case IPR2014-00042, Sep. 3, 2014 deposition transcript of Dr. Alexander H. Slocum.
PTAB Case IPR2014-00042, Declaration of Paul Phillips in Support of Patent Owner's Reply in Support of Motion to Amend.
PTAB Case IPR2014-00042, Patent Owner's Demonstrative Exhibits.
USCAFC 2015-1683 JUDGEMENT, Apr. 8, 2016.
CAFC 2018-2215, 2018-2254, Judgement, Jan. 13, 2020.
Amazon,com advertisement, Keurig My K-Cup Reusable Coffee Filter—Old Model, Jan. 15, 2006, https://www.amazon.com/Keurig-5048-Reusable-Coffee-Filter/dp/B000DLB2GI/ref=asc_df_B000DLB2FI/?tag=hyprod-20&linkCode=df0&hvadid=167154327488&hvpos=&hvnetw=g&hvrand=7305666241200739661&hvpone=&hvptwo=&hvqmt=&hvdev=c&hvdvcmdl=&hvlocint=&hvlocphy=9012305&hvtargid=pla-305740401970&psc=1.
United States District Court Central District of California, LA CV16-04676 JAK (Lead Case),, Order Re Summary Judgment, Jul. 7, 2017.
United States District Court Central District of California, LA CV16-04676 JAK (Lead Case), Order Re Claim Construction, Jul. 13, 2017.
United States District Court Central District of California, LA CV16-04676 JAK (Lead Case), Joint Status Report on the Issue of Priority Date, Jul. 9, 2019.
United States District Court Central District of California, LA CV16-04676 JAK (Lead Case), Order Granting Plaintiff's Ex Parte Application for Reconsideration Regarding Priority Date Dispute, Jul. 8, 2019.
United States District Court Central District of California, LA CV16-04676 JAK (Lead Case), Judgment, Apr. 15, 2020.
United States District Court Western District of Washington Case No. C15-0522RSL, Order Granting in Part Plaintiff's Motion for Summary Judgment, Aug. 17, 2016.
United States District Court Western District of Washington Case No. C15-0522RSL, Special Verdict Form, Jun. 8, 2018.
United States International Trade Commission, Investigation No. 337-TA-929, Initial Determination on Violation of Section 337 and Recommended Determination on Remedy and Bond, Sep. 4, 2015.
United States International Trade Commission, Investigation No. 337-TA-929, Commission Opinion, Apr. 6, 2016.
United States International Trade Commission, Investigation No. 337-TA-929, Commission Opinion, Apr. 4, 2017.
United States International Trade Commission, Investigation No. 337-TA-929, Commission Opinion, Aug. 15, 2017.
United States International Trade Commission, Investigation No. 337-TA-929, Notice of Prior Art by Respondents Solofill, LLC, and Dongguan Hai Rui Precision Mould Co., Ltd., Feb. 4, 2015.
United States International Trade Commission, Investigation No. 337-TA-929, Respondent Amazon.com, Inc.'s Notice of Prior Art, Feb. 4, 2015.
United States International Trade Commission, Investigation No. 337-TA-929, Respondents' Amended Final Exhibit Lists, Jul. 23, 2015.
United States International Trade Commission, Investigation No. 337-TA-929, Respondents' Final Exhibit List.
CAFC 2016-1841, DECISION, May 23, 2017.

* cited by examiner

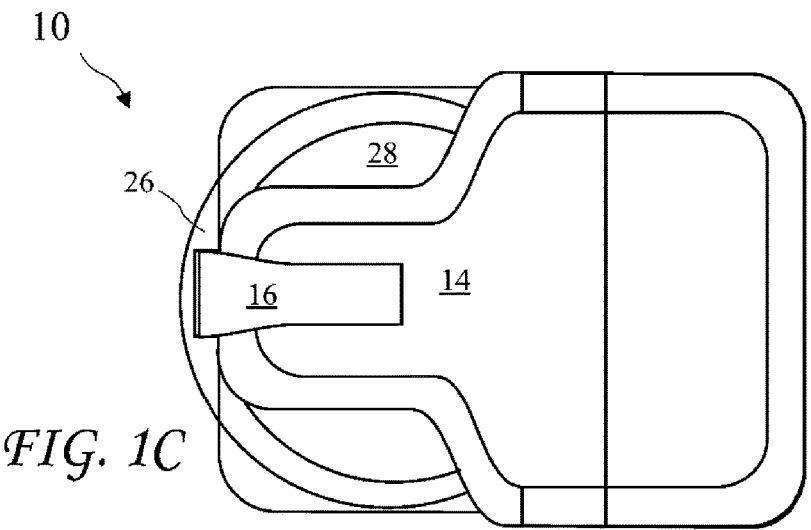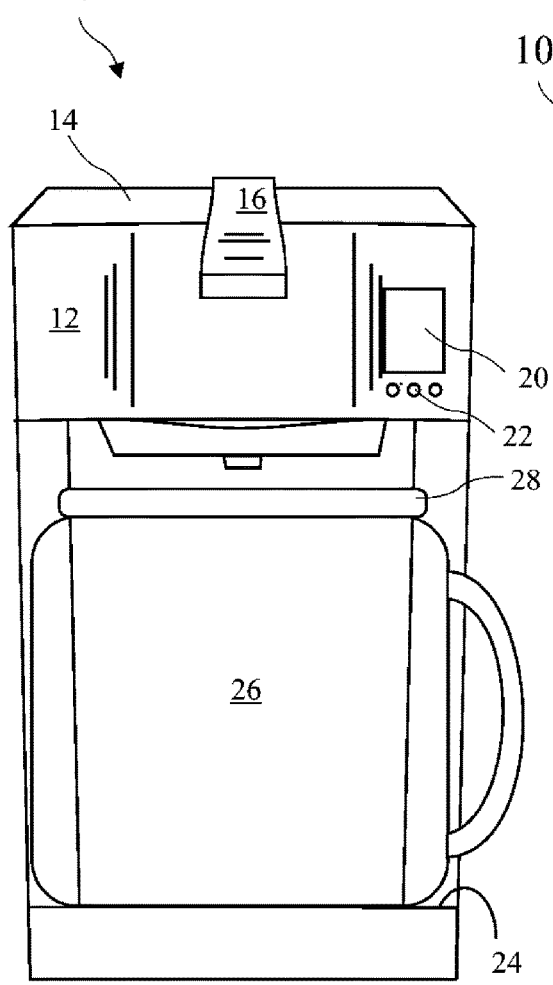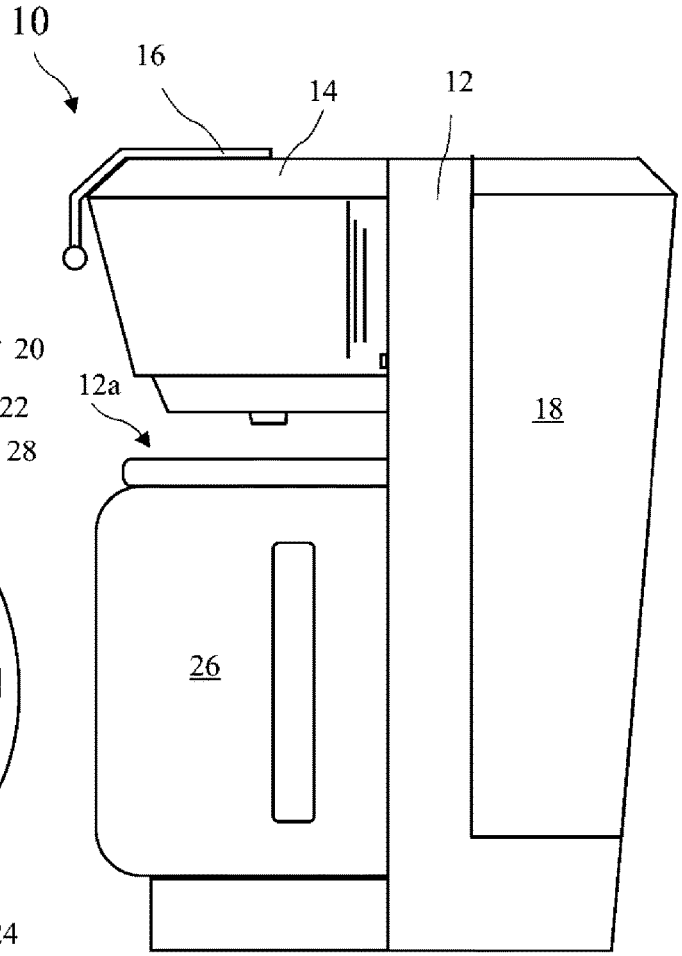
FIG. 1C
FIG. 1A
FIG. 1B

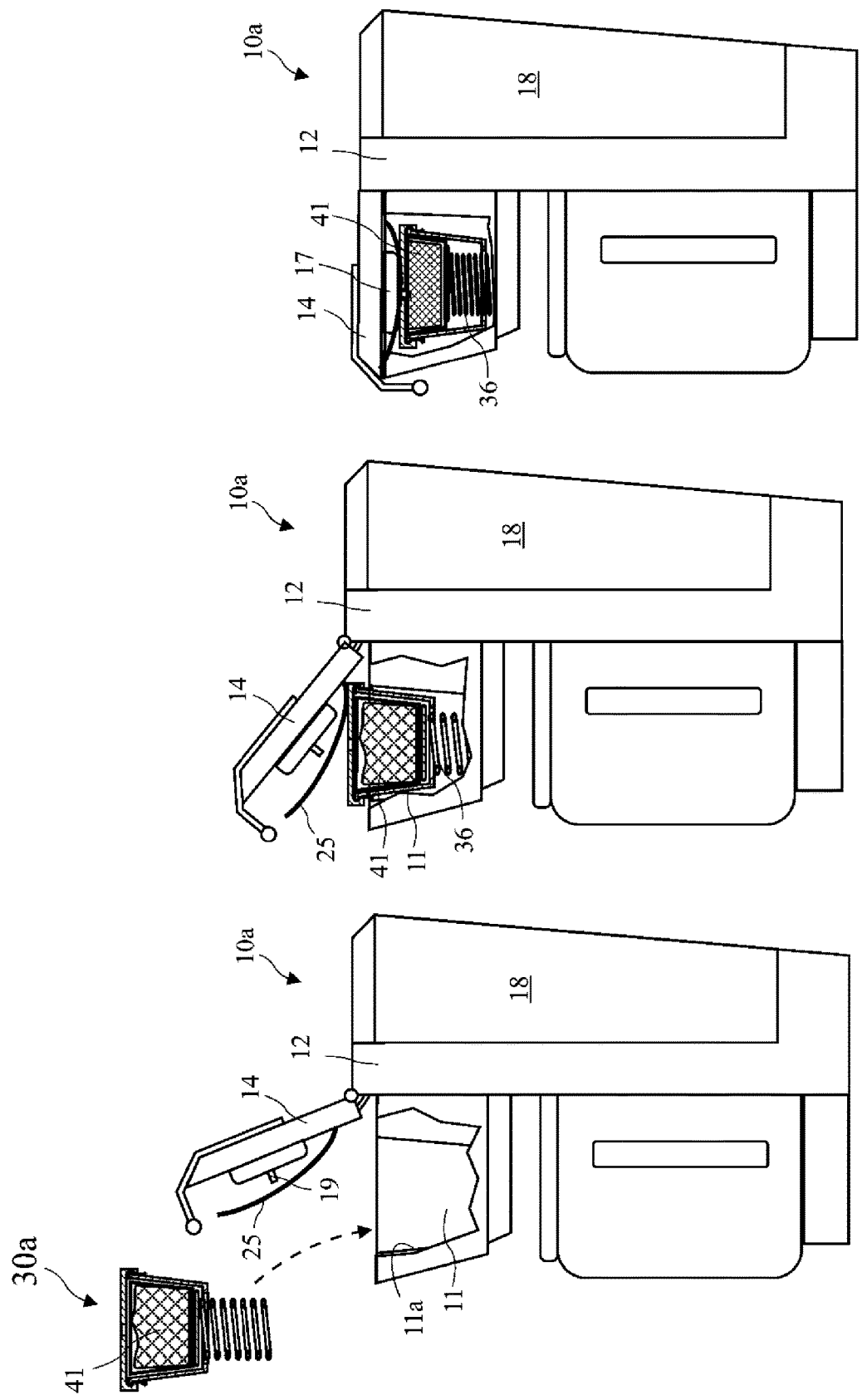

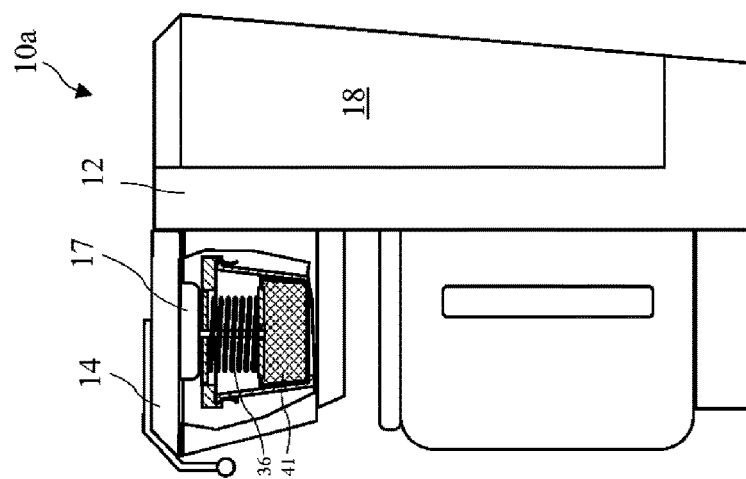
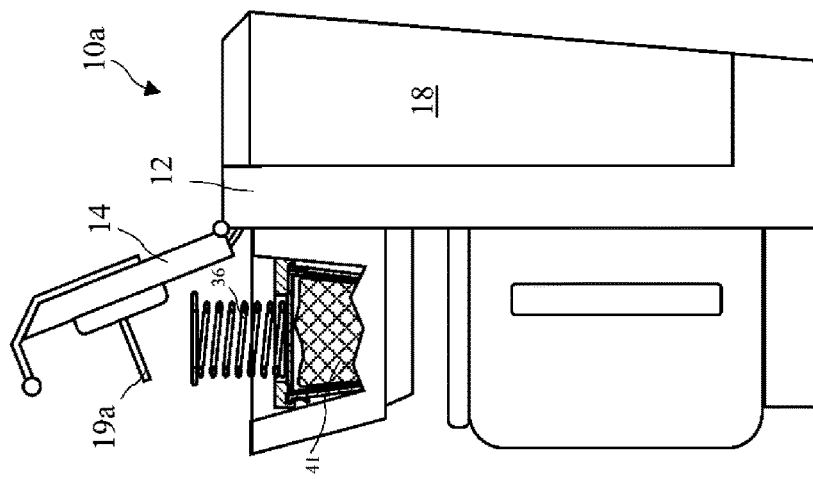
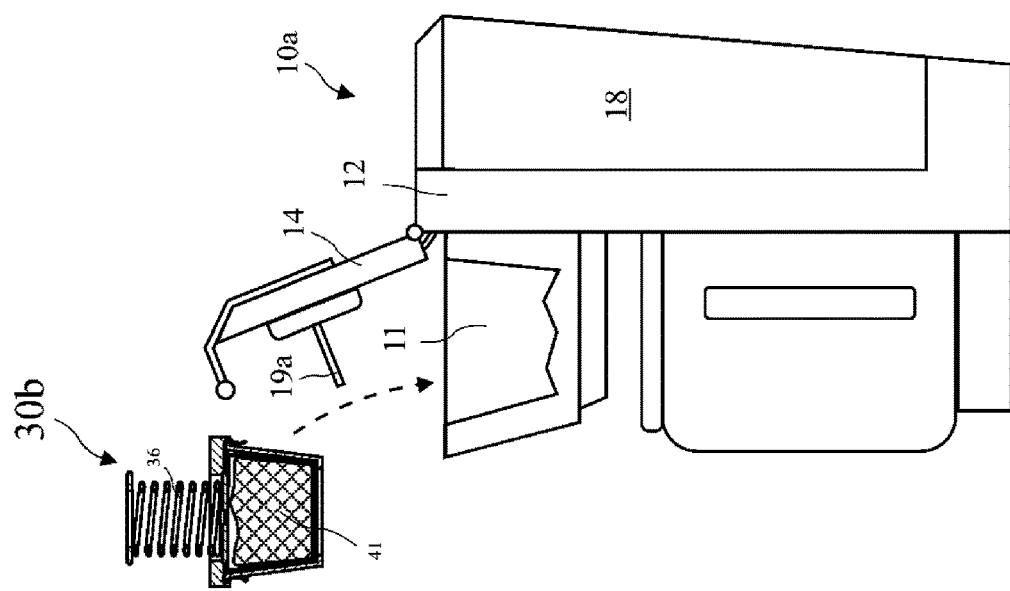

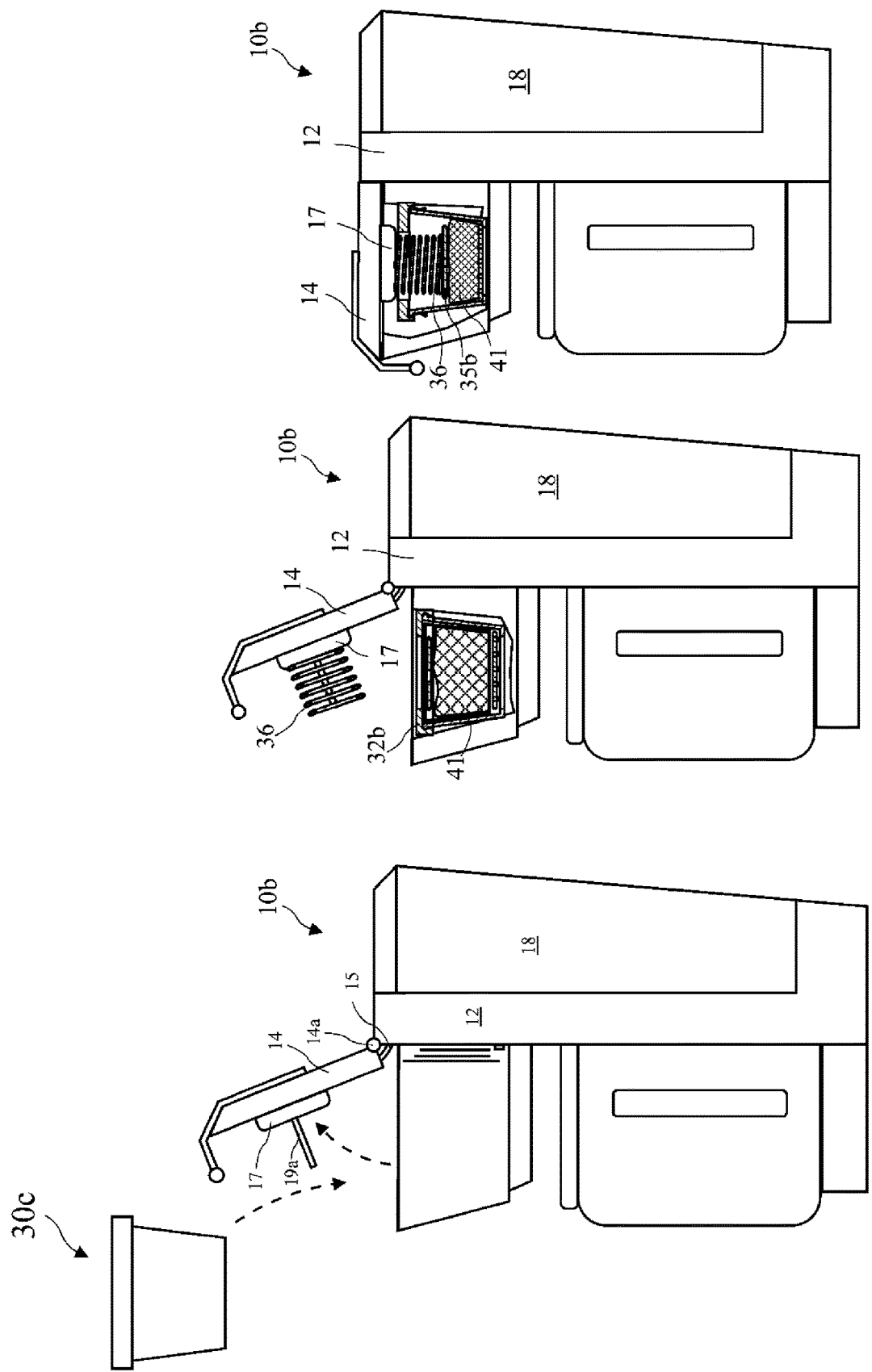

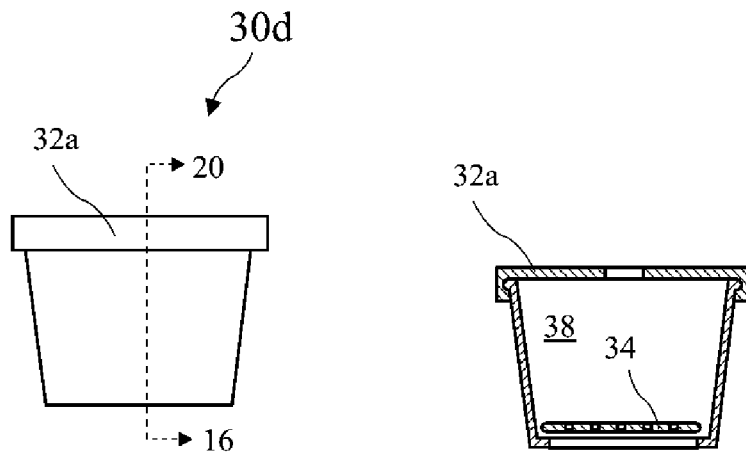
FIG. 19
FIG. 20
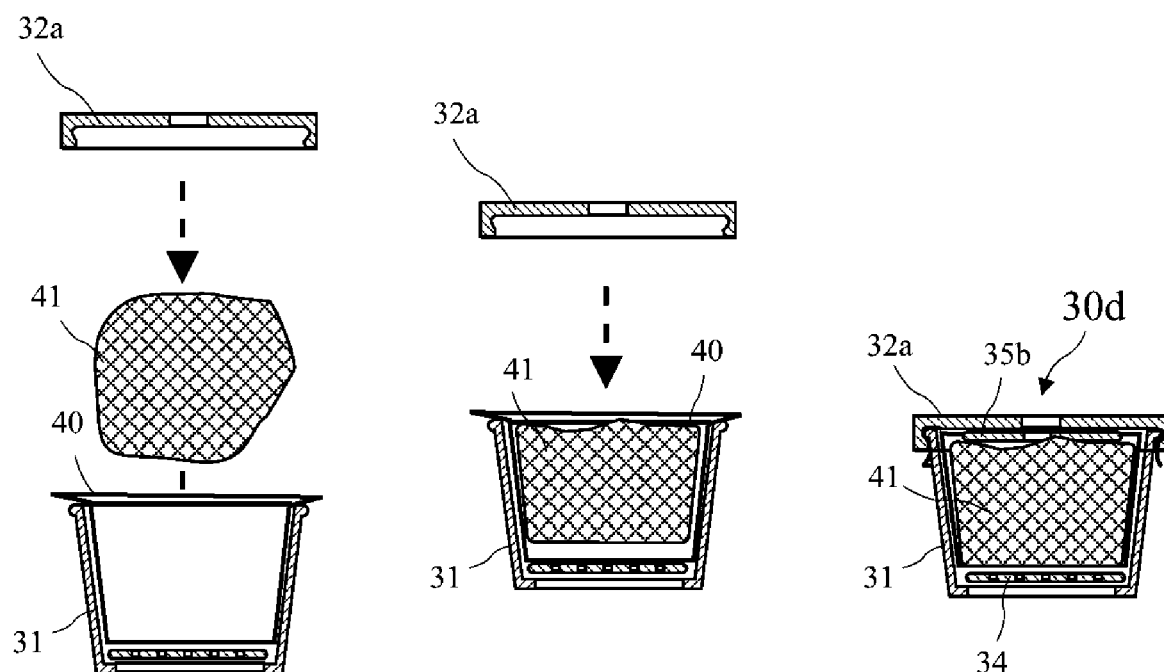
FIG. 21A
FIG. 21B
FIG. 21C

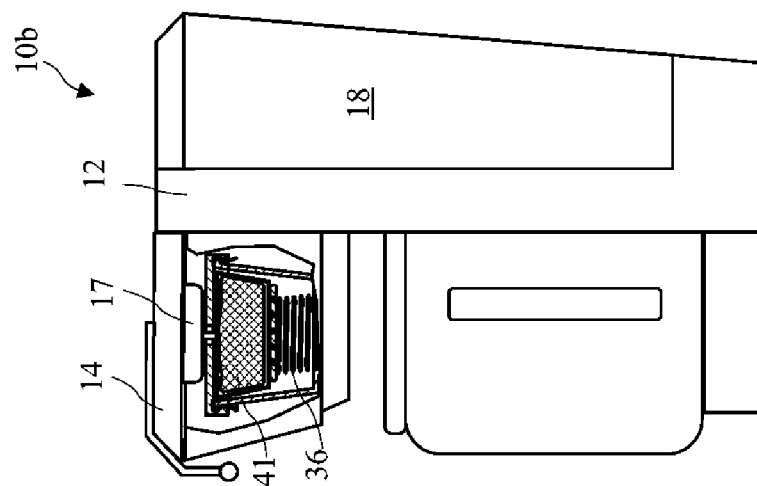
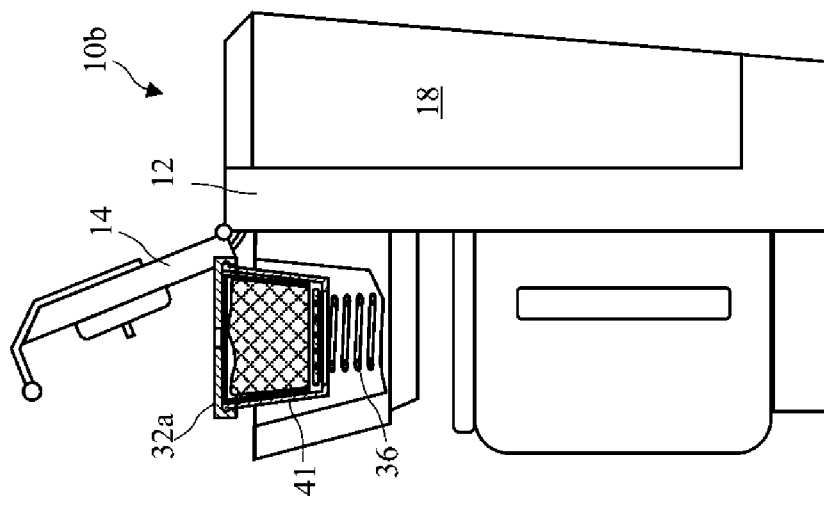
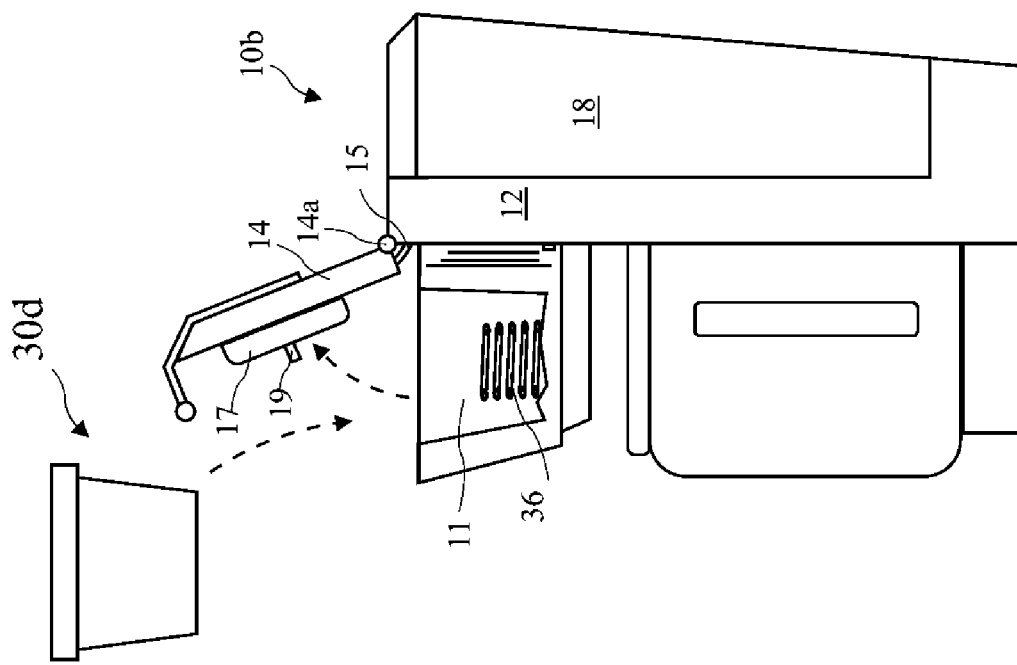

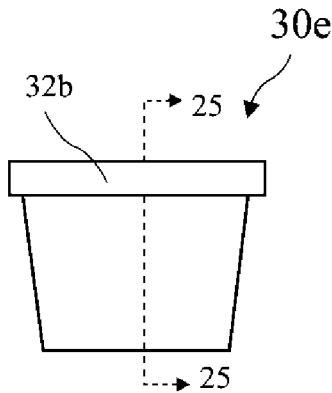
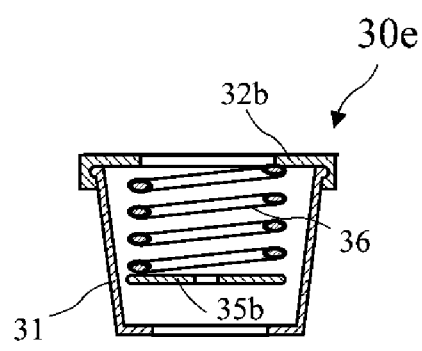
FIG. 24    FIG. 25
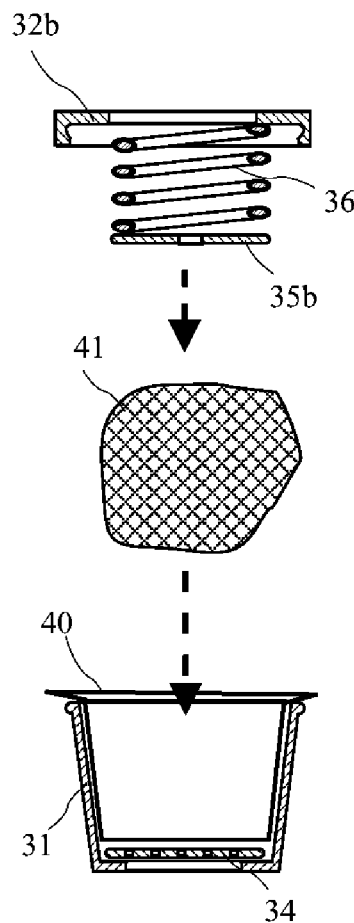
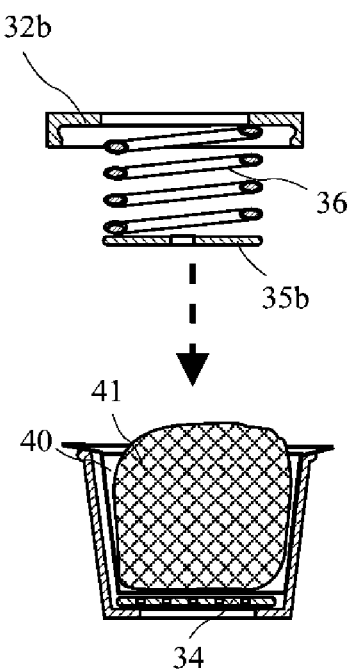
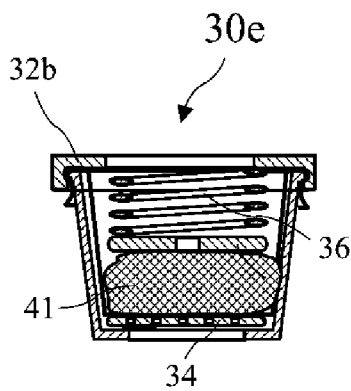
FIG. 26A    FIG. 26B    FIG. 26C

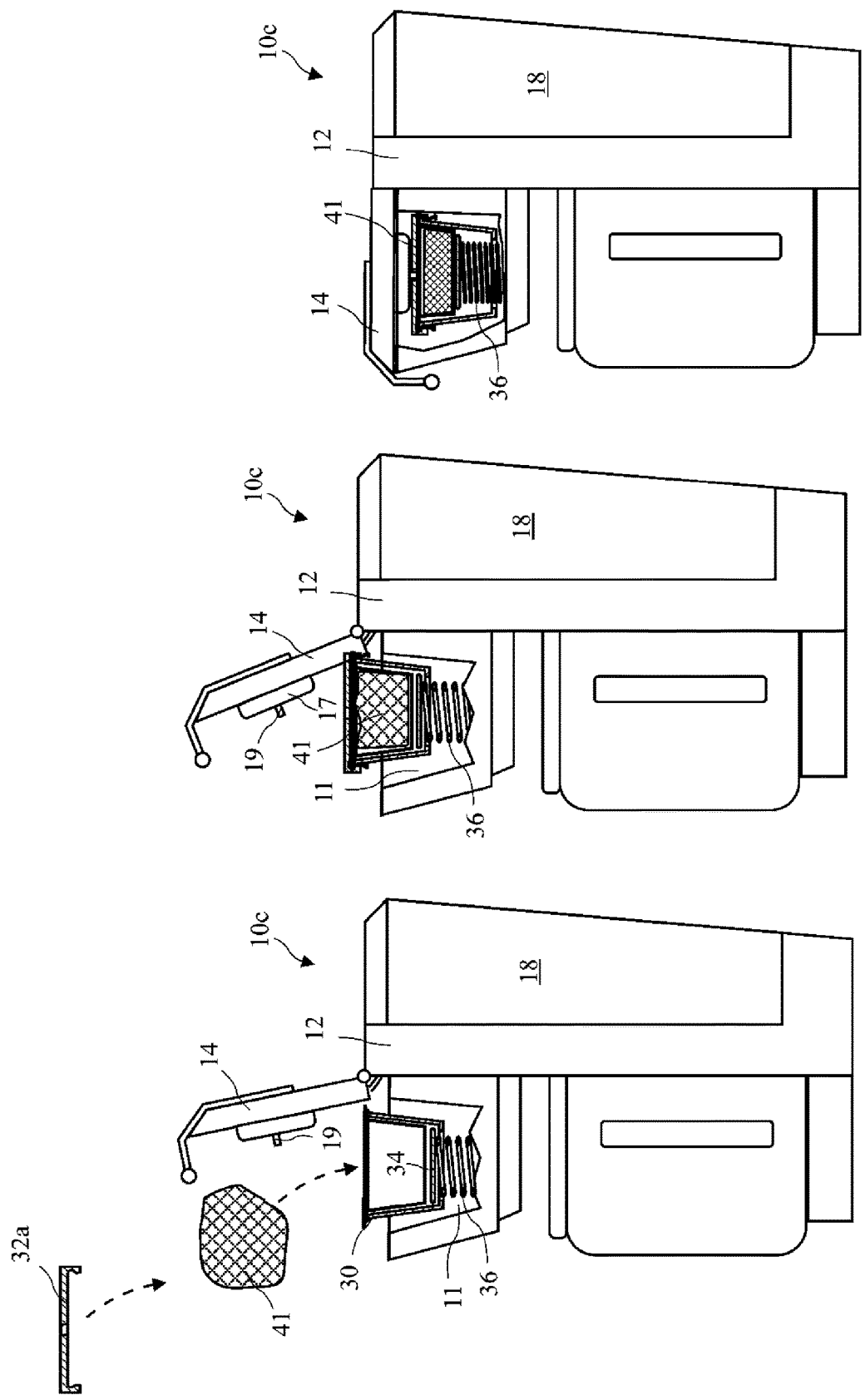

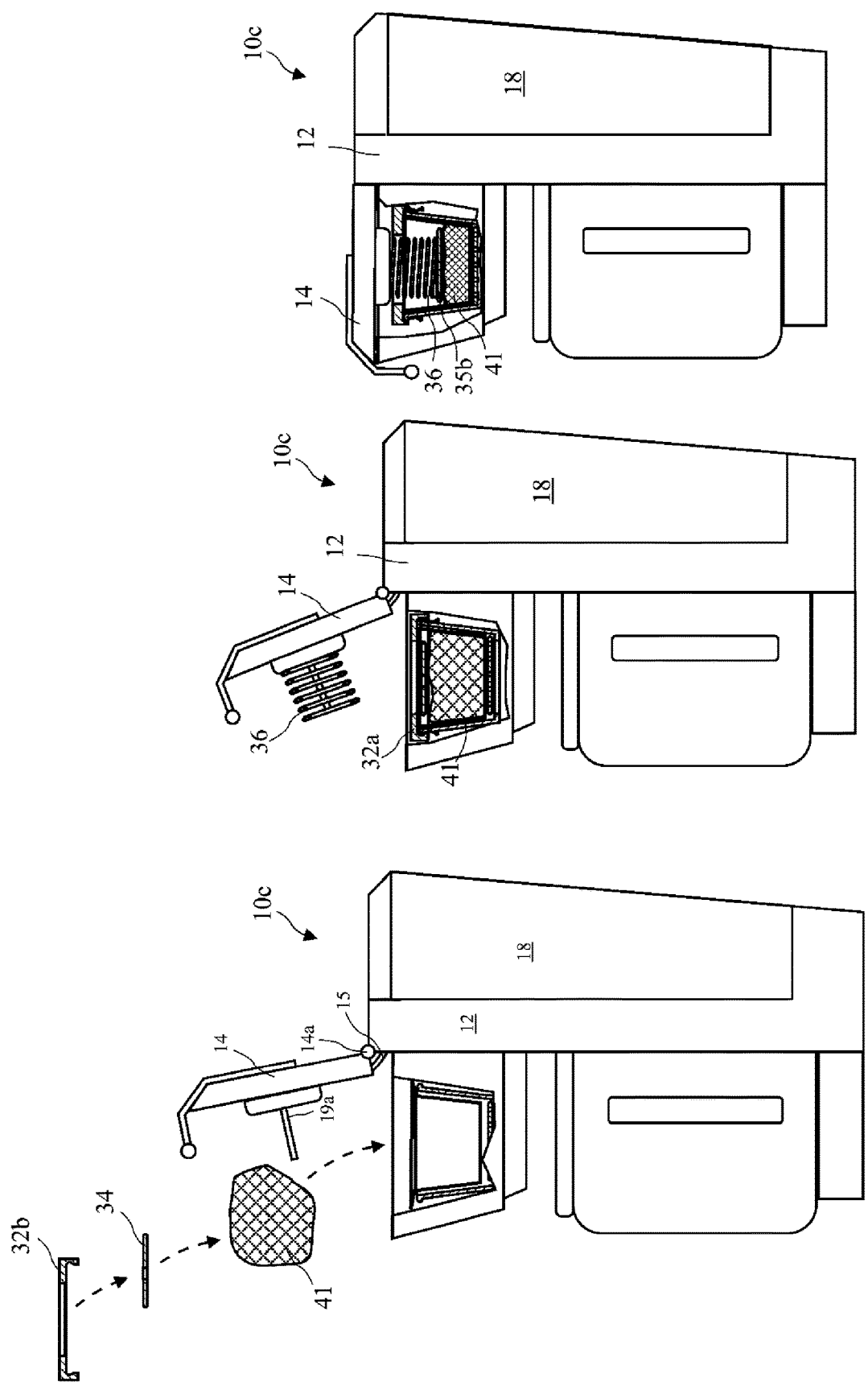

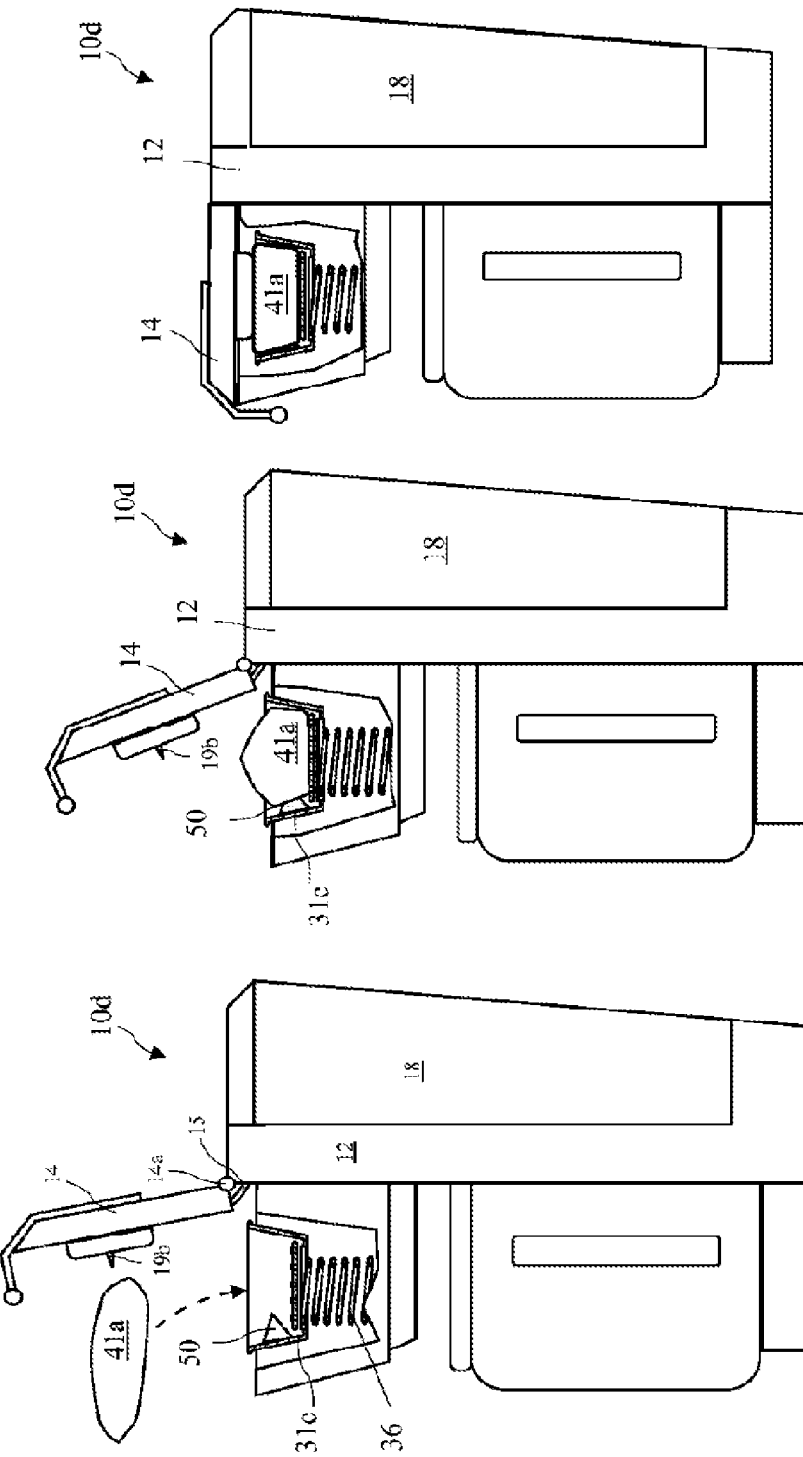

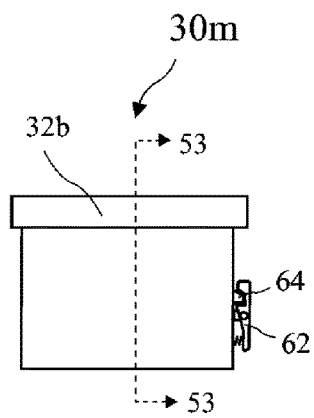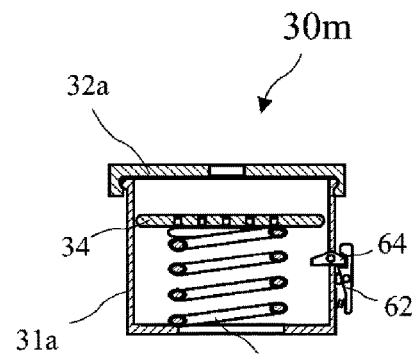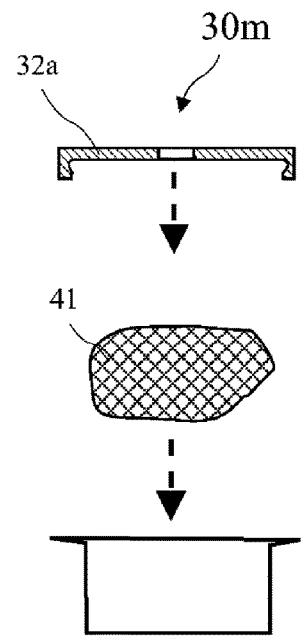
FIG. 52
FIG. 53
FIG. 54A
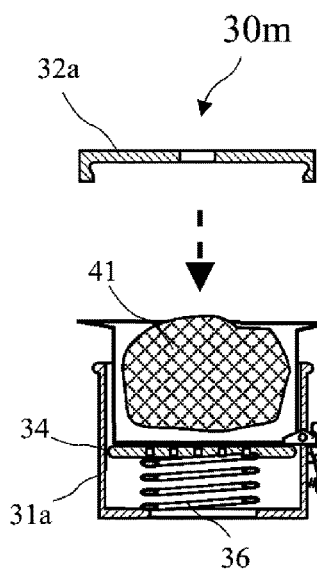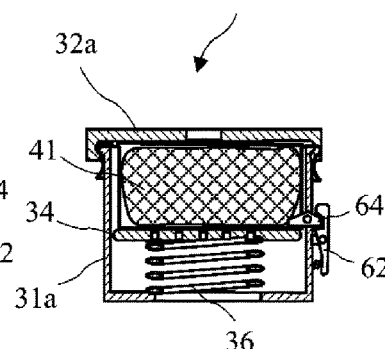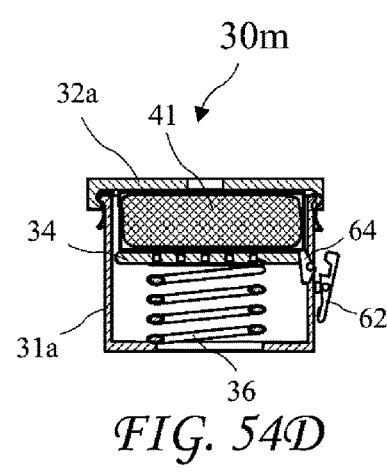
FIG. 54B
FIG. 54C
FIG. 54D

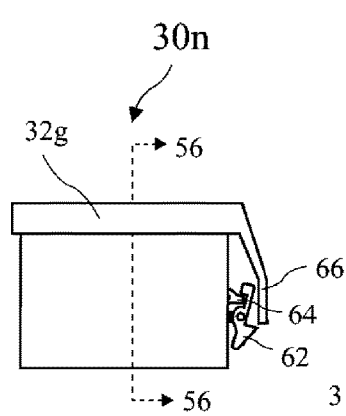
FIG. 55
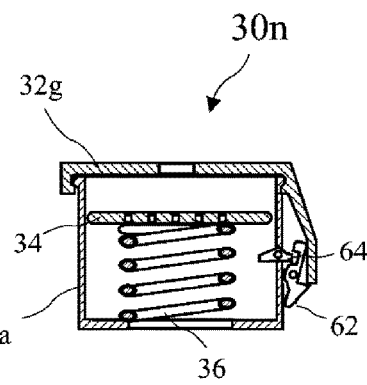
FIG. 56
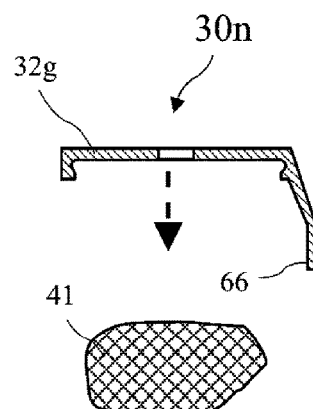
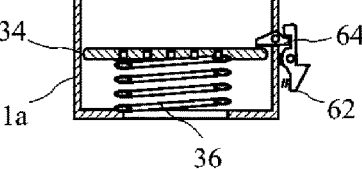
FIG. 57A
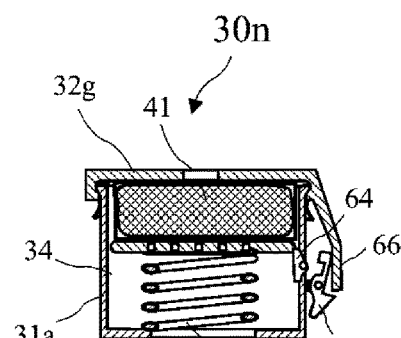
FIG. 57B
FIG. 57C
FIG. 57D

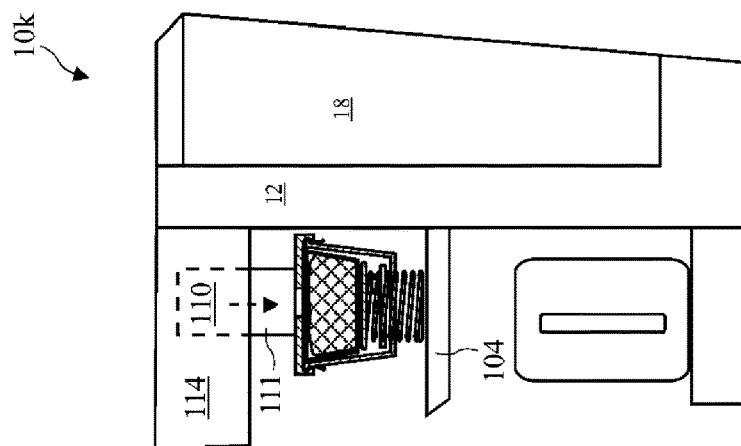
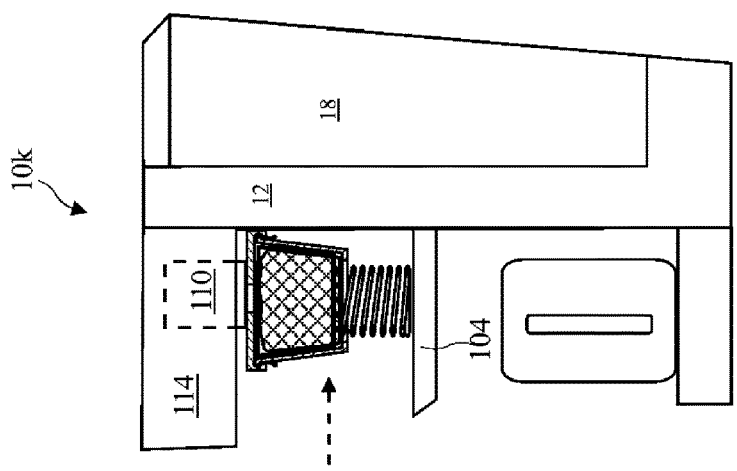
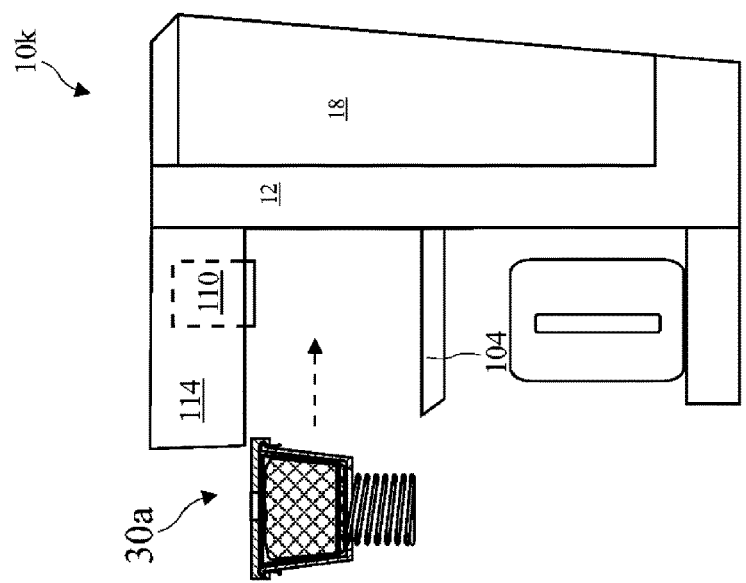

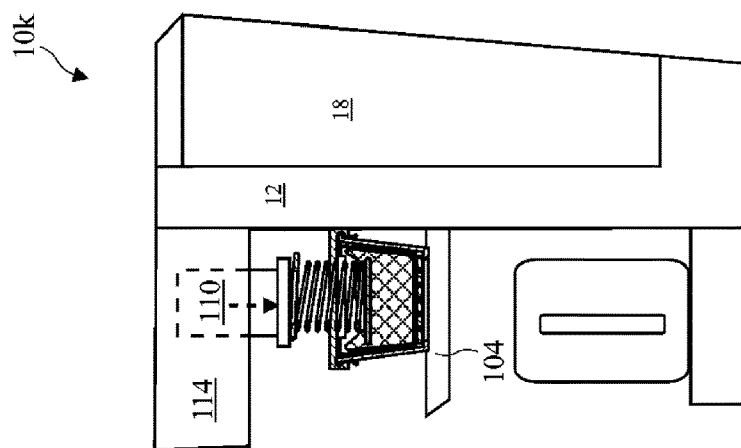
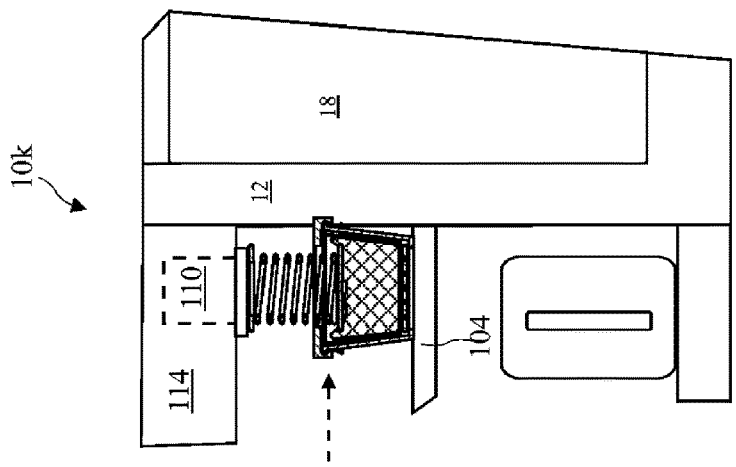
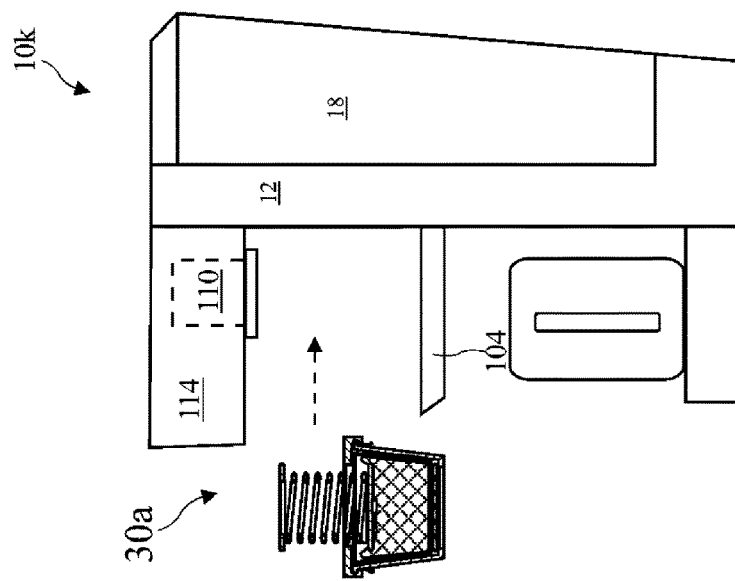

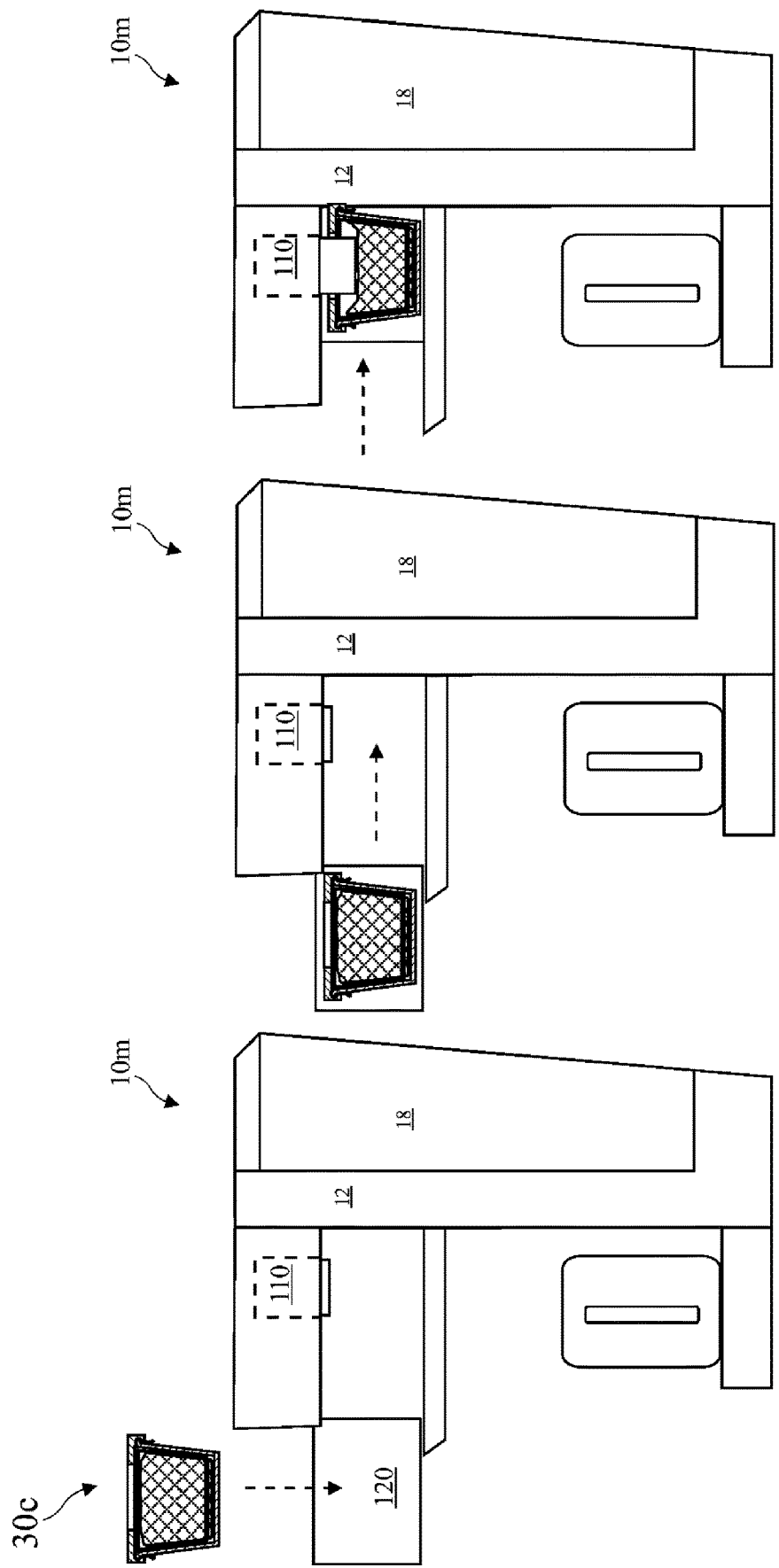

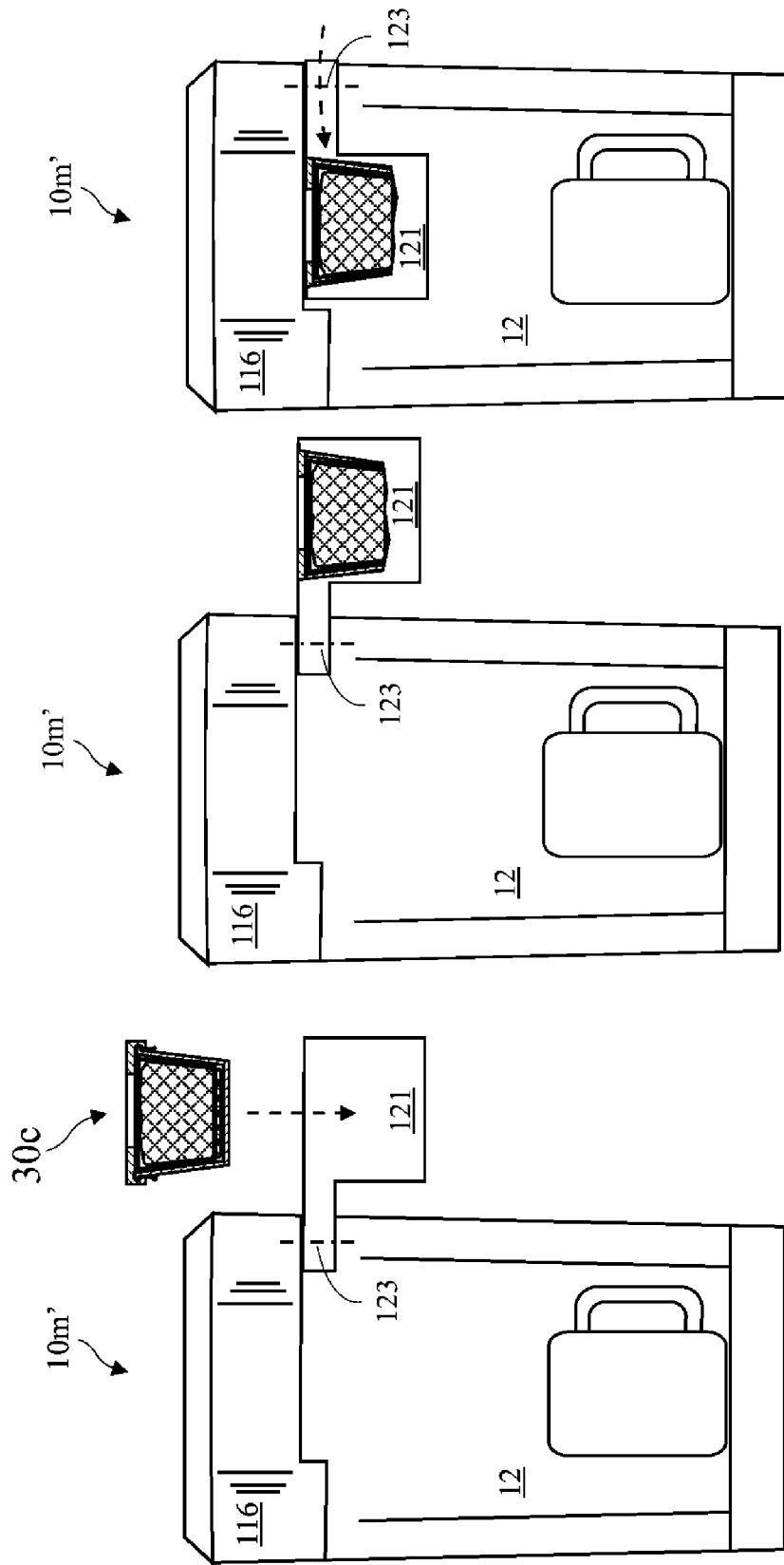

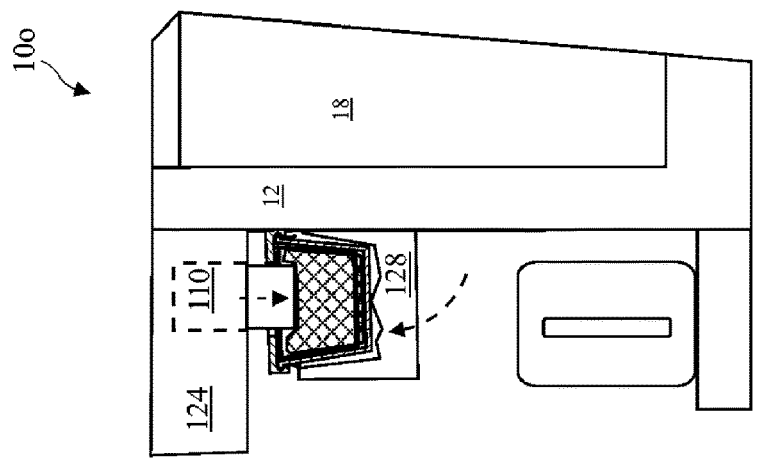
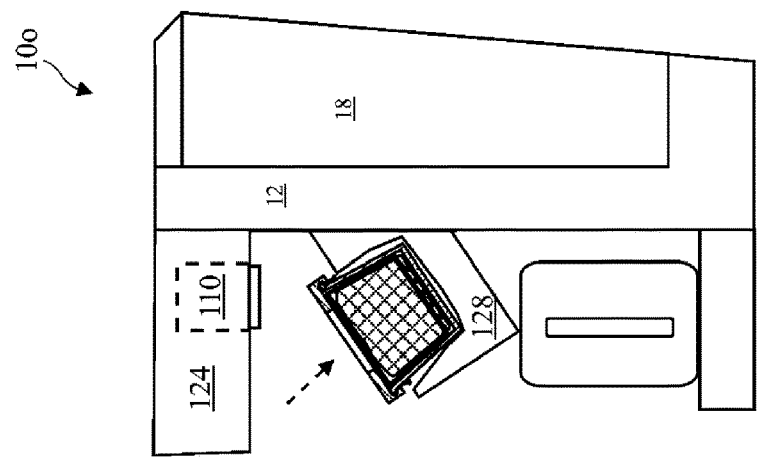
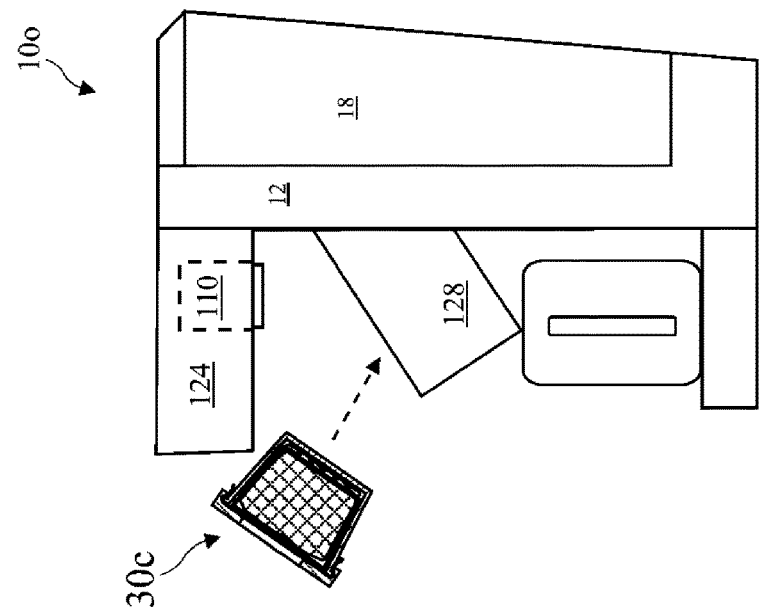

COFFEE HOLDER

CROSS-REFERENCE TO RELATED APPLICATIONS

This is a continuation of U.S. patent application Ser. No. 18/239,093, which was filed on Aug. 28, 2023; which in turn is a continuation of U.S. patent application Ser. No. 16/905,853, which was filed on Jun. 18, 2020, now U.S. patent Ser. No. 11/737,597, which issued on Aug. 29, 2023; which in turn is a continuation of U.S. patent application Ser. No. 13/644,501, which was filed on Oct. 4, 2012; which in turn is a continuation-in-part of U.S. patent application Ser. No. 12/610,181, which was filed on Oct. 30, 2009, a continuation-in-part of U.S. patent application Ser. No. 12/762,262, which was filed on Apr. 16, 2010, and a continuation-in-part of U.S. patent application Ser. No. 12/620,584, which was filed on Nov. 17, 2009; and is related to U.S. patent application Ser. No. 13/436,667, which was filed on Mar. 30, 2012, U.S. patent application Ser. No. 13/436,690, which was filed on Mar. 30, 2012, and U.S. patent application Ser. No. 13/546,875, which was filed on Jul. 11, 2012; the disclosures of which are all incorporated herein in their entireties.

BACKGROUND OF THE INVENTION

The present invention relates to coffee makers and in particular to a coffee maker utilizing a stream of hot water through tamped ground coffee.

Coffee is generally prepared in a coffee maker by measuring an amount of ground coffee into a coffee filter, closing a lid over the ground coffee, and providing a stream of hot water through the loosely packed ground coffee. Unfortunately, water passes freely through the loosely packed ground coffee and does not obtain the full flavor which might otherwise be obtained.

U.S. patent application Ser. No. 12/610,181 filed Oct. 30, 2009 for "Self Tamping Coffee Holder" discloses a coffee making apparatus and methods which provide a tamped packing of loose ground coffee thereby obtaining richer flavor. The coffee maker includes a reservoir, a pump, a heater, and a check valve. Coffee grounds are first loosely deposited in a coffee holder and then tamped onto a compacted state. The coffee holder may be filled loosely with the coffee and then placed into the coffee making apparatus and compacted, or the coffee may be compacted in the coffee holder and then the coffee holder placed into the coffee making apparatus. The compacting may be by a spring or by a resilient solid material and may be part of the coffee holder or part of the coffee making apparatus.

Further, U.S. patent application Ser. No. 12/620,584 filed Nov. 17, 2009 for "Self Tamping Coffee Holder" discloses a self-tamping coffee holder which tamps loose ground coffee obtaining richer flavor. The coffee holder includes a holder base and a holder cap. Coffee is loosely deposited in the coffee holder and the holder cap is attached to the holder base. An internal filter chamber holds the coffee and allows tamping of the coffee into a compacted state. The filter chamber may be formed by a fixed filter or by a removable filter constructed of filter paper, nylon mesh, metal mesh, or any material capable of holding the coffee while allowing a flow of heated water through the coffee. The tamping may be by a spring or by a resilient solid material attached to the coffee holder and may push the coffee down inside the filter or push the filter and the coffee up against the holder lid. While the '181 and '584 applications disclose tamping coffee, they do not disclose a variety of embodiments of cooperating coffee holders and coffee makers for tamping.

BRIEF SUMMARY OF THE INVENTION

The present invention addresses the above and other needs by providing a coffee maker and coffee holder which cooperate to tamp coffee in the coffee holder. The coffee holder may include a top tamping spring, a bottom tamping spring, or a top or bottom passage allowing entry of a tamper into the coffee holder. The coffee maker includes an actuator above or below the coffee holder, or a fixed tamper attached to a ceiling or platform of the coffee maker. The coffee holder may be inserted between the ceiling and platform, or into a moving drawer of the coffee maker. The actuator may be a solenoid actuator, or a hydraulic actuator actuated by water pressure of heated water used for brewing.

BRIEF DESCRIPTION OF THE SEVERAL VIEWS OF THE DRAWING

The above and other aspects, features, and advantages of the present invention will be more apparent from the following more particular description thereof, presented in conjunction with the following drawings wherein:

FIG. 1A is a front view of a coffee maker according to the present invention.

FIG. 1B is a side view of the coffee maker according to the present invention.

FIG. 1C is a top view of the coffee maker according to the present invention.

FIG. 8A shows the first coffee holder ready for insertion into the coffee maker.

FIG. 8B shows the first coffee holder inserted into the coffee maker before tamping the coffee.

FIG. 8C shows the first coffee holder inserted into the coffee maker after tamping the coffee.

FIG. 14A shows the second coffee holder ready for insertion into the coffee maker.

FIG. 14B shows the second coffee holder inserted into the coffee maker before tamping the coffee.

FIG. 14C shows the second coffee holder inserted into the coffee maker after tamping the coffee.

FIG. 18A shows the third coffee holder ready for insertion into a second coffee maker according to the present invention.

FIG. 18B shows the third coffee holder inserted into the coffee maker before tamping the coffee.

FIG. 18C shows the third coffee holder inserted into the coffee maker after tamping the coffee.

FIG. 19 is a side view of a fourth coffee holder according to the present invention.

FIG. 20 is a cross-sectional side view of the fourth coffee holder according to the present invention taken along line 20-20 of FIG. 19.

FIG. 21A is a cross-sectional side view of the fourth coffee holder according to the present invention taken along line 20-20 of FIG. 19 showing the coffee holder with the bottom tamper, a portion of coffee, and the holder lid ready to attach, according to the present invention.

FIG. 21B is a cross-sectional side view of the fourth coffee holder according to the present invention taken along line 20-20 of FIG. 19 showing the coffee holder with the bottom tamper, a portion of coffee in the coffee holder, and the holder lid ready to attach, according to the present invention.

FIG. 21C is a cross-sectional side view of the fourth coffee holder according to the present invention taken along line 20-20 of FIG. 19 showing the coffee holder with the bottom tamper, a portion of coffee in the coffee holder, and the holder lid attached, according to the present invention.

FIG. 22A shows the fourth coffee holder ready for insertion into the coffee maker.

FIG. 22B shows the fourth coffee holder inserted into the coffee maker before tamping the coffee.

FIG. 22C shows the fourth coffee holder inserted into the coffee maker after tamping the coffee.

FIG. 24 is a side view of a fifth coffee holder according to the present invention.

FIG. 25 is a cross-sectional side view of the fifth coffee holder according to the present invention taken along line 25-25 of FIG. 24.

FIG. 26A is a cross-sectional side view of the fifth coffee holder according to the present invention taken along line 25-25 of FIG. 24 showing the portion of coffee above the coffee holder body, and the holder lid with the top tamper and tamping spring, ready to attach to the coffee holder body, according to the present invention.

FIG. 26B is a cross-sectional side view of the fifth coffee holder according to the present invention taken along line 25-25 of FIG. 24 showing the coffee holder with the portion of coffee in the coffee holder, and the holder lid with the top tamper and tamping spring ready to attach to the coffee holder body, according to the present invention.

FIG. 26C is a cross-sectional side view of the fifth coffee holder according to the present invention taken along line 25-25 of FIG. 24 showing the portion of coffee in the coffee holder, and the holder lid with the top tamper and tamping spring attached to the holder body, according to the present invention.

FIG. 37A shows a third coffee maker having a coffee holder for receiving a portion of coffee and tamping spring according to the present invention for tamping the coffee when the coffee maker lid is closed.

FIG. 37B shows the third coffee maker with the coffee holder holding the portion of coffee and the tamping spring under the coffee holder according to the present invention for tamping the coffee when the coffee maker lid is closed.

FIG. 37C shows the third coffee maker with the coffee holder holding the portion of tamped coffee with the coffee maker lid closed for tamping the coffee according to the present invention.

FIG. 38A shows a third coffee maker having a coffee holder for receiving a portion of coffee and tamping spring attached to the coffee maker lid according to the present invention for tamping the coffee when the coffee maker lid is closed.

FIG. 38B shows the third coffee maker with the coffee holder holding the portion of untamped coffee according to the present invention for tamping the coffee when the coffee maker lid is closed.

FIG. 38C shows the third coffee maker with the coffee holder holding the portion of tamped coffee with the coffee maker lid closed to push the tamping spring into the coffee holder for tamping the coffee according to the present invention.

FIG. 39A shows a fourth coffee maker having a coffee holder for receiving a packet containing untamped coffee, a knife for cutting the packet open, and tamping spring attached to the coffee maker lid according to the present invention for tamping the coffee when the coffee maker lid is closed.

FIG. 39B shows the fourth coffee maker with the coffee holder holding the packet of untamped coffee according to the present invention for tamping the coffee when the coffee maker lid is closed.

FIG. 39C shows the fourth coffee maker with the coffee holder holding the packet of tamped coffee with the coffee maker lid closed to push the tamping spring into the coffee holder for tamping the coffee according to the present invention.

FIG. 52 is a side view of a thirteenth coffee holder with a releasable tamping latch according to the present invention.

FIG. 53 is a cross-sectional view of the thirteenth coffee holder taken along line 53-53 of FIG. 52 showing an empty coffee holder.

FIG. 54A is a cross-sectional view of the thirteenth coffee holder taken along line 53-53 of FIG. 52 showing a lid, coffee, a filter paper cup, above the base, and the coffee holder base, with the tamping latch retaining the bottom tamper.

FIG. 54B is a cross-sectional view of the thirteenth coffee holder taken along line 53-53 of FIG. 52 showing the lid, above the coffee and the filter paper cup resting in the coffee holder base, with the tamping latch retaining the bottom tamper.

FIG. 54C is a cross-sectional view of the thirteenth coffee holder taken along line 53-53 of FIG. 52 showing the lid, above the coffee and the filter paper cup resting in the coffee holder base with the tamping latch retaining the bottom tamper.

FIG. 54D is a cross-sectional view of the thirteenth coffee holder taken along line 53-53 of FIG. 52 showing the lid attached to the base with the coffee and the filter paper cup residing in the coffee holder base with tamping latch released and the coffee tamped.

FIG. 55 is a side view of a fourteenth coffee holder with a releasable tamping latch according to the present invention.

FIG. 56 is a cross-sectional view of the fourteenth coffee holder taken along line 56-56 of FIG. 55 showing an empty coffee holder.

FIG. 57A is a cross-sectional view of the fourteenth coffee holder taken along line 56-56 of FIG. 55 showing a lid, coffee, a filter paper cup, above the base, and the coffee holder base, with the tamping latch retaining the bottom tamper.

FIG. 57B is a cross-sectional view of the fourteenth coffee holder taken along line 56-56 of FIG. 55 showing the lid, above the coffee and the filter paper cup resting in the coffee holder base, with the tamping latch retaining the bottom tamper.

FIG. 57C is a cross-sectional view of the fourteenth coffee holder taken along line 56-56 of FIG. 55 showing the lid, above the coffee and the filter paper cup resting in the coffee holder base, with the tamping latch released but just prior to tamping.

FIG. 57D is a cross-sectional view of the fourteenth coffee holder taken along line 56-56 of FIG. 55 showing the lid attached to the base with the coffee and the filter paper cup residing in the coffee holder base with tamping latch released and the coffee tamped.

FIGS. 63A-63C show a ramped lower shelf embodiment of the coffee holder with a bottom tamping spring and coffee maker according to the present invention.

FIGS. 64A-64C show a ramped lower shelf embodiment of the coffee holder with a top tamping spring and coffee maker according to the present invention.

FIGS. 65A-65C show a springed lower shelf embodiment of the coffee holder with a bottom tamping spring and coffee maker according to the present invention.

FIGS. 66A-66C show a springed lower shelf embodiment of the coffee holder with a top tamping spring and coffee maker according to the present invention.

FIGS. 67A-67C show a ramped ceiling embodiment of the coffee holder with a bottom tamping spring and coffee maker according to the present invention.

FIGS. 68A-68C show a ramped ceiling embodiment of the coffee holder with a top tamping spring and coffee maker according to the present invention.

FIGS. 69A-69C show a springed ceiling embodiment of the coffee holder with a bottom tamping spring and coffee maker according to the present invention.

FIGS. 70A-70C show a springed ceiling embodiment of the coffee holder with a top tamping spring and coffee maker according to the present invention.

FIGS. 71A-71C show a bottom solenoid embodiment of the coffee holder with a bottom tamping spring and coffee maker according to the present invention.

FIGS. 72A-72C show a bottom solenoid embodiment of the coffee holder with a top tamping spring and coffee maker according to the present invention.

FIGS. 73A-73C show a top solenoid embodiment of the coffee holder with a bottom tamping spring and coffee maker according to the present invention.

FIGS. 74A-74C show a top solenoid embodiment of the coffee holder with a top tamping spring and coffee maker according to the present invention.

Figure 75C:
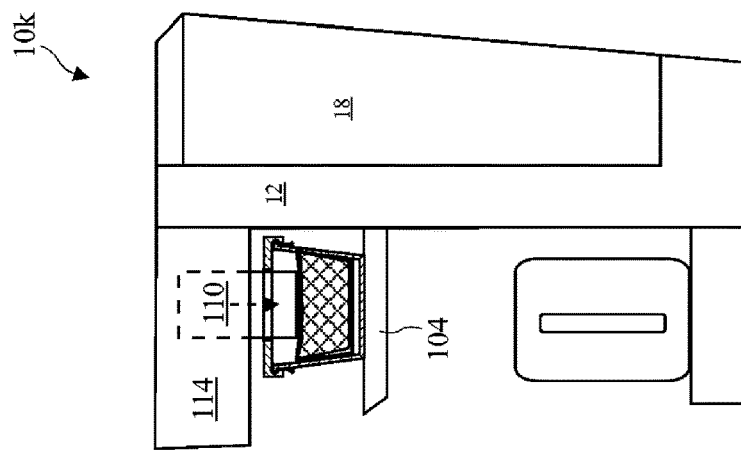
Figure 75B:
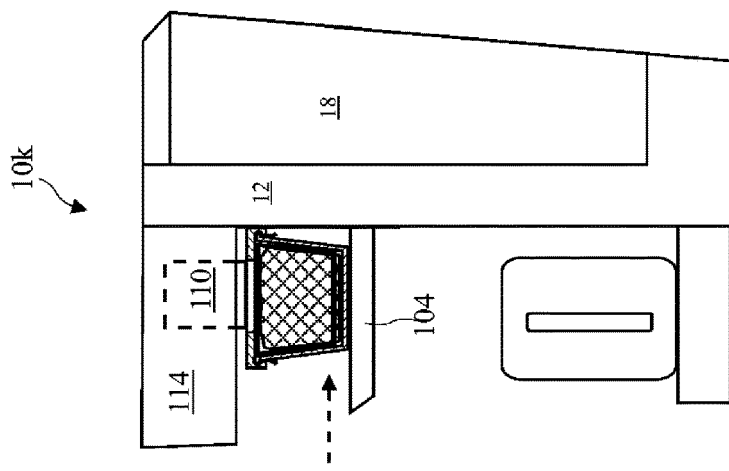
Figure 75A:
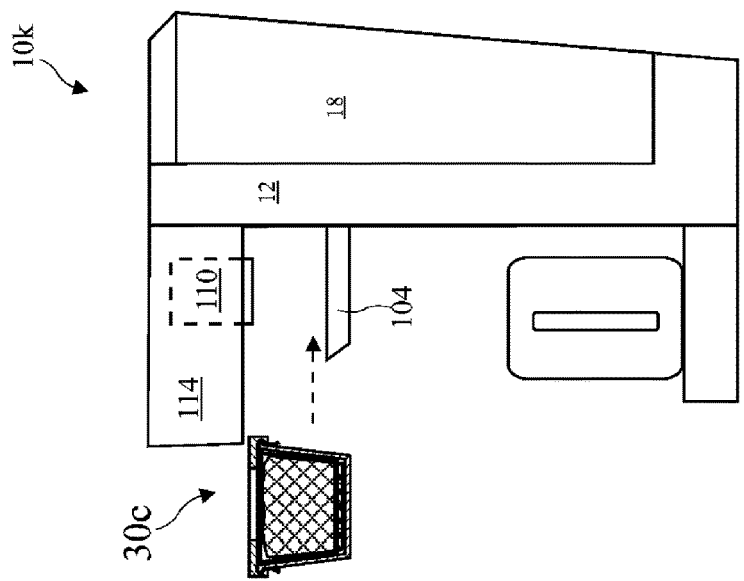

FIGS. 75A-75C show a top solenoid embodiment of the coffee holder and coffee maker wherein the top solenoid presses a tamper into the top of the coffee holder according to the present invention.

Figure 76C:
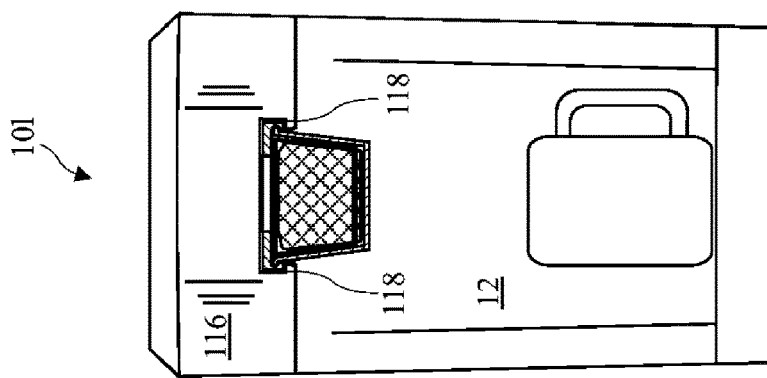
Figure 76B:
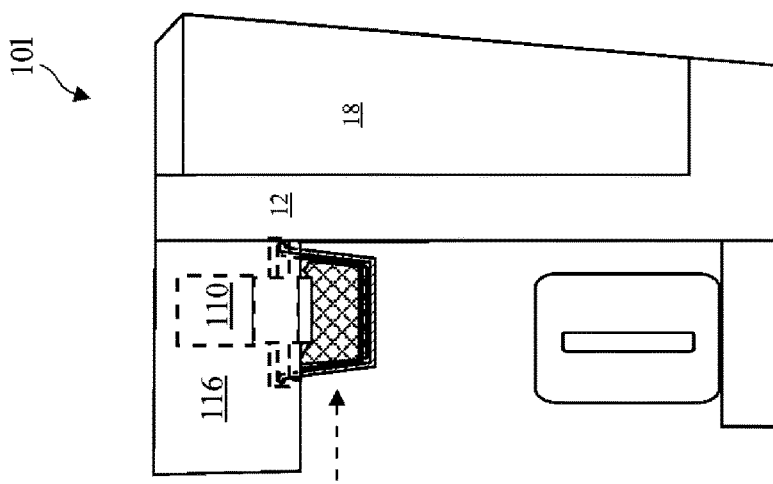
Figure 76A:
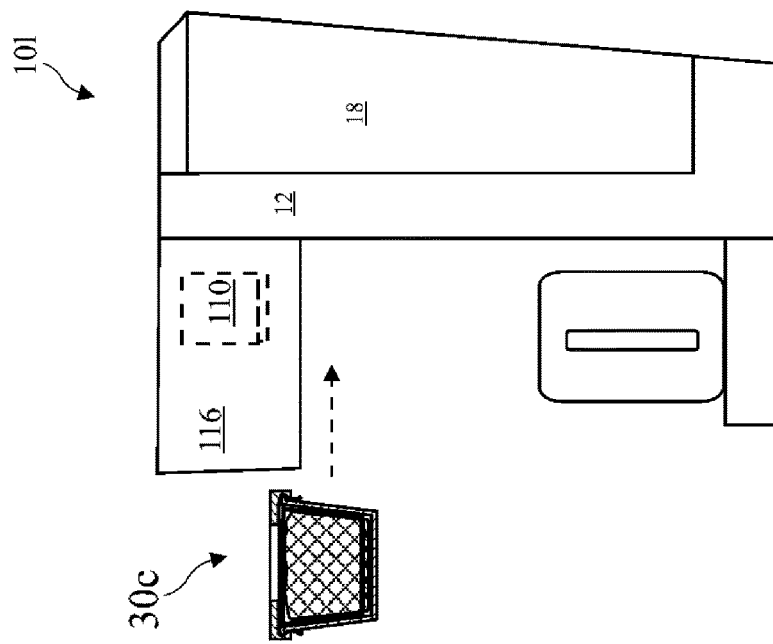

FIGS. 76A-76C show a top solenoid embodiment of the coffee holder and coffee maker wherein a top rim of the holder engages rails in the coffee maker and a top solenoid presses a tamper into the top of the coffee holder according to the present invention.

FIGS. 77A-77C show a top solenoid embodiment of the coffee holder and coffee maker wherein the holder is placed into a drawer of the coffee maker, the drawer slides into a closed position, and a top solenoid presses a tamper into the top of the coffee holder according to the present invention.

FIGS. 78A-78C show a top solenoid embodiment of the coffee holder and coffee maker wherein the holder is placed into a drawer of the coffee maker, the drawer is pivoted into a closed position, and a top solenoid presses a tamper into the top of the coffee holder according to the present invention.

Figure 79C:
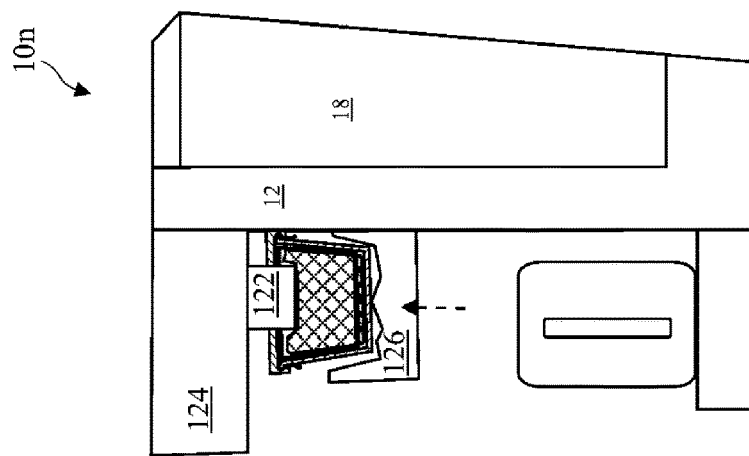
Figure 79B:
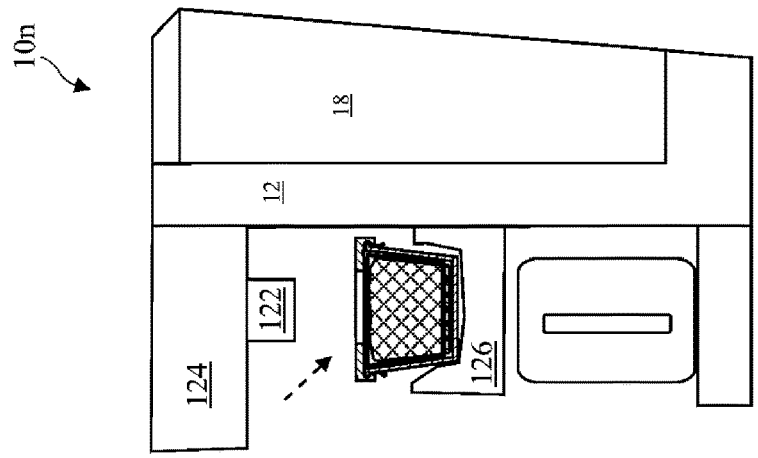
Figure 79A:
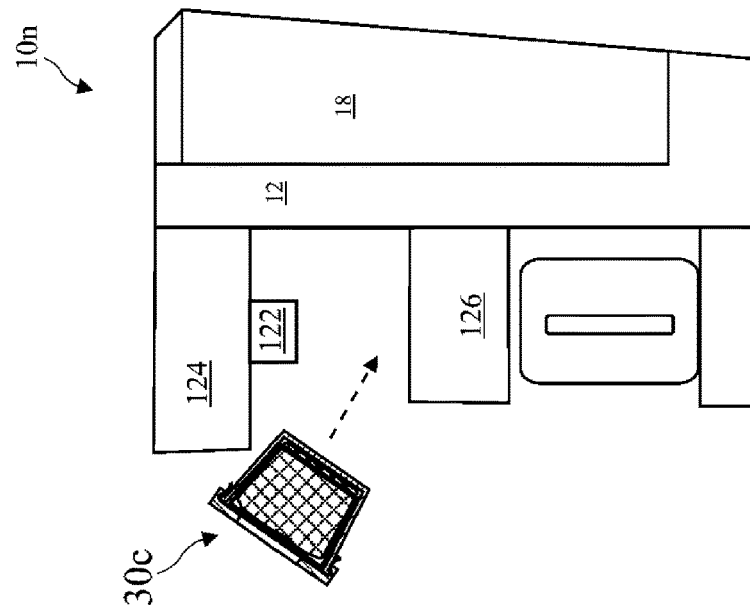

FIGS. 79A-79C show a top solenoid embodiment of the coffee holder and coffee maker wherein the holder is placed on a platform of the coffee maker, the platform is raised, and a top solenoid presses a tamper into the top of the coffee holder according to the present invention.

FIGS. 80A-80C show a top solenoid embodiment of the coffee holder and coffee maker wherein the holder is placed on a platform of the coffee maker, the platform is pivoted upward, and a top solenoid presses a tamper into the top of the coffee holder according to the present invention.

Figure 81C:
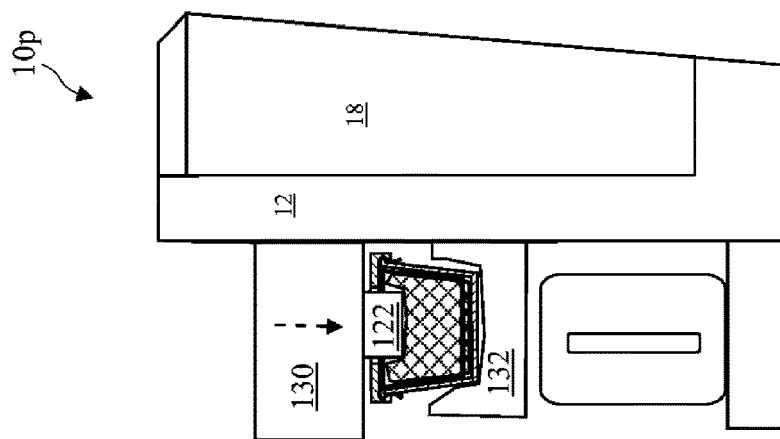
Figure 81B:
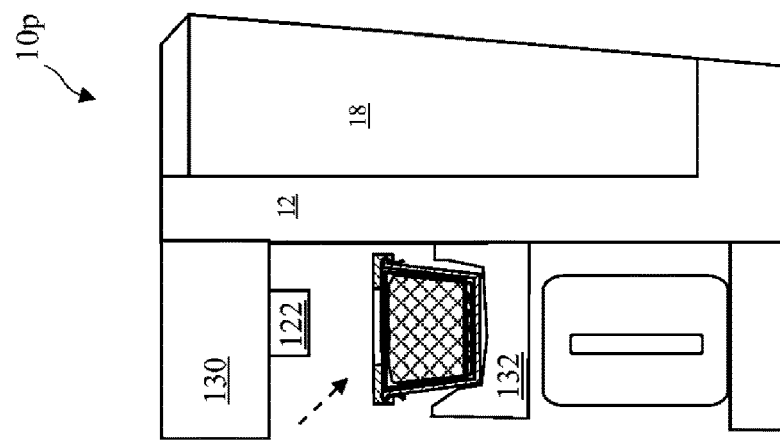
Figure 81A:
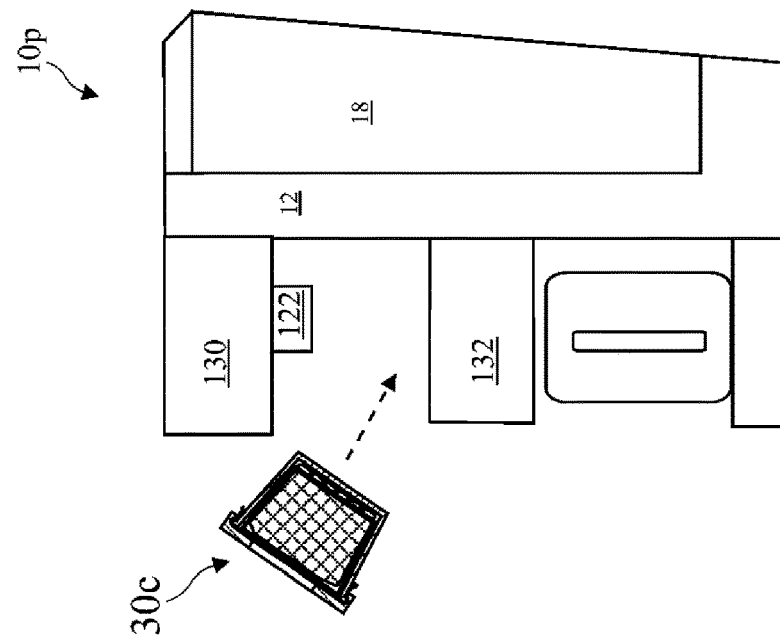

FIGS. 81A-81C show a top solenoid embodiment of the coffee holder and coffee maker wherein the holder is placed on a platform of the coffee maker, a ceiling is lowered, and a tamper attached to the ceiling is pressed into the top of the coffee holder according to the present invention.

Figure 82:
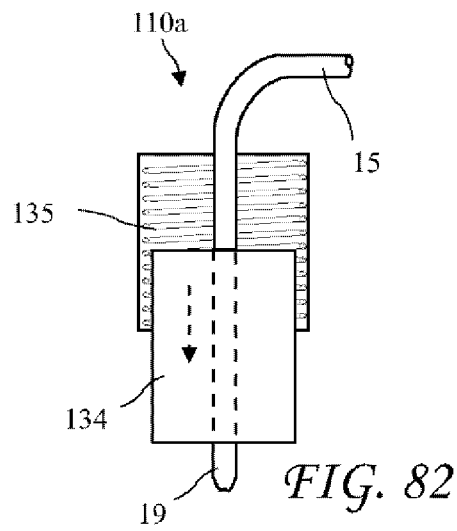

FIG. 82 shows a solenoid according to the present invention.

Figure 83:
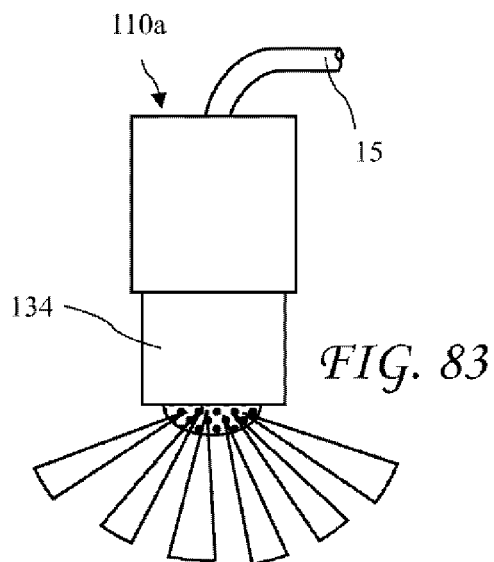

FIG. 83 shows a solenoid with a spray stream head according to the present invention.

Figure 84A:
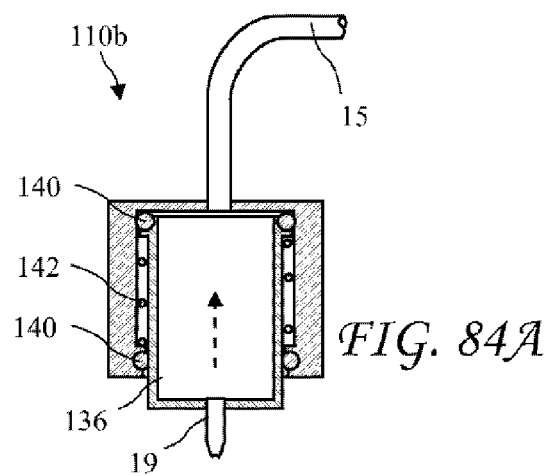

FIG. 84A shows a water pressure actuated tamper according to the present invention in an initial position.

Figure 84B:
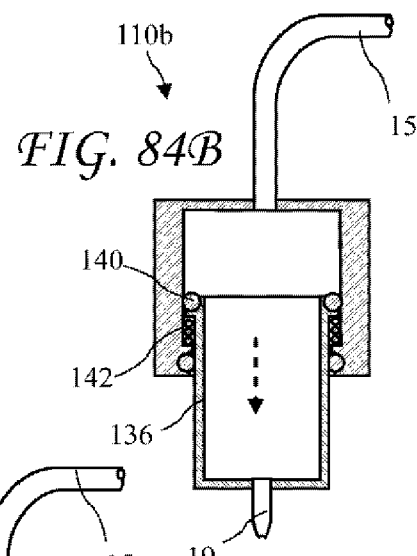

FIG. 84B shows the water pressure actuated tamper according to the present invention in a downward extended tamping position.

Figure 85A:
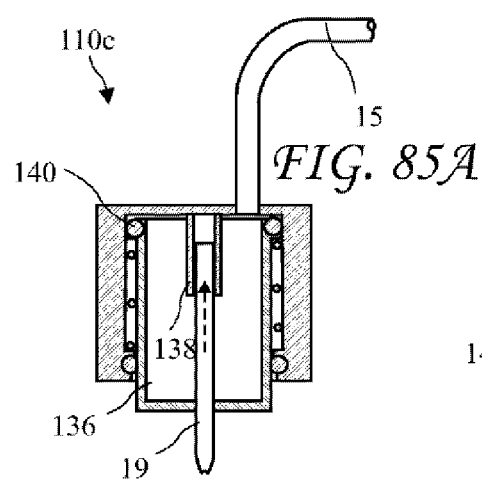

FIG. 85A shows a second water pressure actuated tamper having an anti-leak feature according to the present invention in an initial position.

Figure 85B:
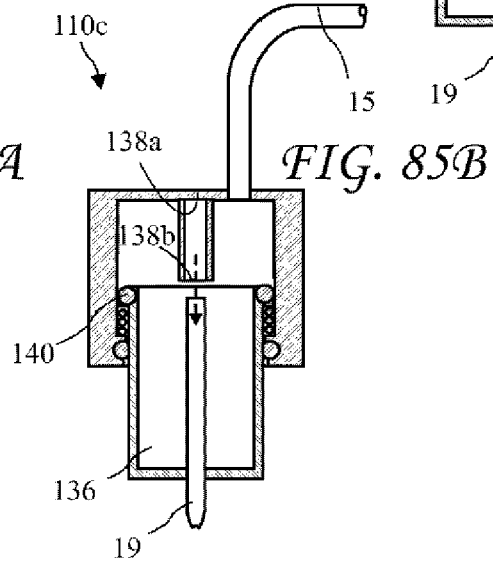

FIG. 85B shows the second water pressure actuated tamper having an anti-leak feature according to the present invention in a downward extended tamping position.

Corresponding reference characters indicate corresponding components throughout the several views of the drawings.

DETAILED DESCRIPTION OF THE INVENTION

The following description is not to be taken in a limiting sense, but is made merely for the purpose of describing one or more preferred embodiments of the invention. The scope of the invention should be determined with reference to the claims.

A front view of a coffee 10 maker according to the present invention is shown in FIG. 1A a side view of the coffee maker 10 is shown in FIG. 1B, and a top view of the coffee maker 10 is shown in FIG. 1C. The coffee maker 10 includes a body 12, an opening lid 14, a lid handle 16, a water container 18, a display 20, controls 22, a platform 24 and a mouth 12a. A coffee pitcher 26 rests on the platform 24 inside the mouth 12a and has a pitcher lid 28. The coffee maker 10 provides a flow of hot water through coffee grounds to produce a coffee drink. The flow of water may be heated by one of any known means, for example, an electrical heating coil or a conductive coating on tubing carrying the water.

Figure 2A:
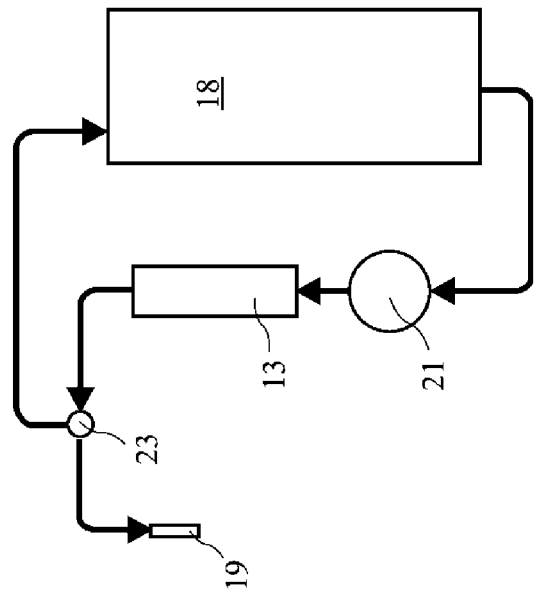
FIG. 2A is a functional diagram of the coffee maker.
Figure 2:
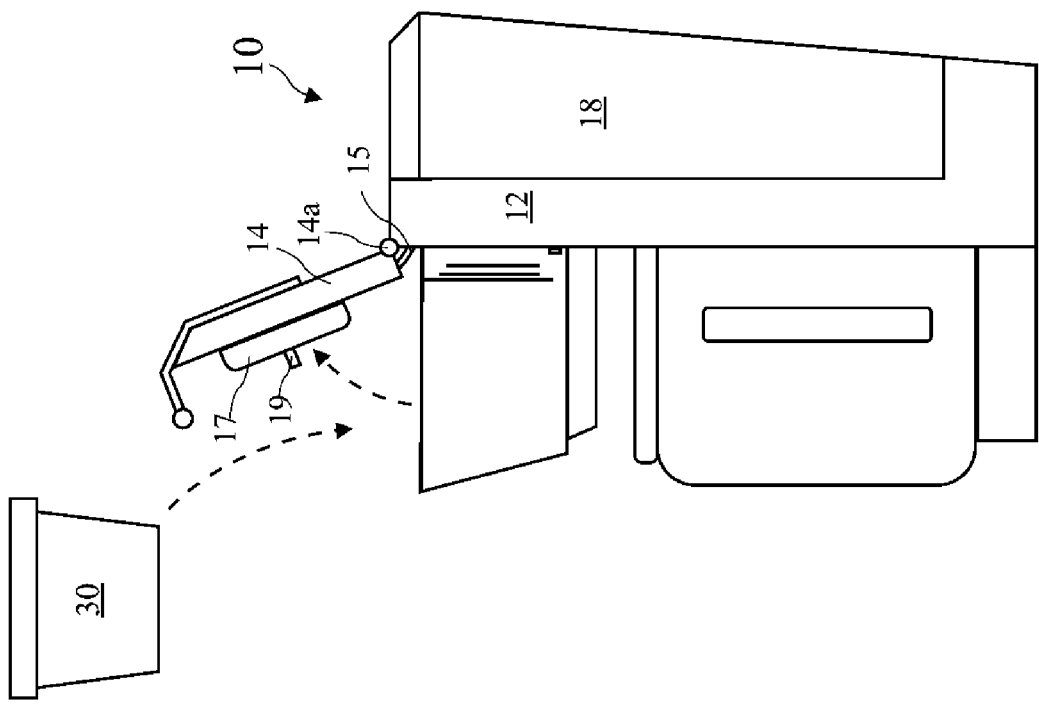
FIG. 2 is a side view of the coffee maker with an open lid allowing placement of a coffee holder according to the present invention inside the coffee maker.

A side view of the coffee maker 10 with an open lid 14 allowing placement of a coffee holder 30 according to the present invention inside the coffee maker 10 is shown in FIG. 2. The lid 14 includes a lid hinge 14a and a water tube 15 carries heated water into the lid 14. A pad 17 resides on a bottom surface of the lid 14 and presses against the coffee holder 30 when the lid 14 is closed, and in cooperation with other means discloses hereafter, tamps coffee contained in the coffee holder 30. A nozzle 19 extending down from the closed lid 14 directs the flow of hot water into the coffee holder 30.

A functional diagram of the coffee maker 10 is shown in FIG. 2A. The preferred coffee maker 10 includes the water tank 18, water pump 21, a heater 13, check valve 23 and the nozzle 18. The pump 21 preferably provides at least one PSI water pressure. The water heater 13 may include a heating coil or a resistive coating or any other means for heating water. The check valve 23 limits the water pressure at the nozzle 19 by returning some of the water flow to the water tank 18. While a the water pump 21 is a preferred method for providing a flow of water to the nozzle 19, other methods include pressuring the water in the water tank 18, and a coffee maker using any means to provide a forced flow of water is intending to within the scope of the present invention.

Figure 3:
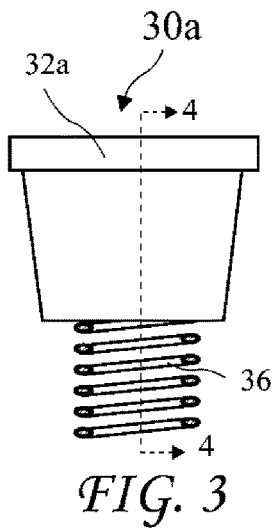
FIG. 3 is a side view of a first coffee holder according to the present invention.
Figure 4:
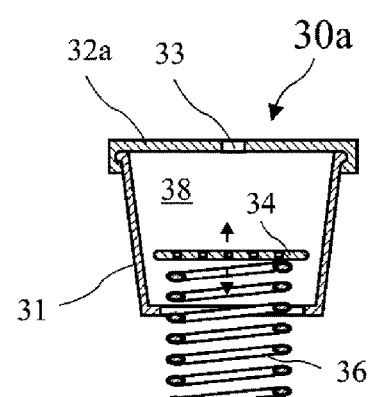
FIG. 4 is a cross-sectional side view of the first coffee holder according to the present invention taken along line 4-4 of FIG. 3.

A side view of a first coffee holder 30a according to the present invention is shown in FIG. 3 and a cross-sectional side view of the first coffee holder 30a including a holder body 31, a first holder lid 32a, a bottom tamper 34, and a tamping spring 36 according to the present invention taken along line 4-4 of FIG. 3 is shown in FIG. 4. A volume (or coffee holder interior) 38 is provided inside the coffee holder 30a to receive loose coffee 41. A passage 33 in the lid 32a is provided for the nozzle 19 (see FIG. 2).

Figure 5A:
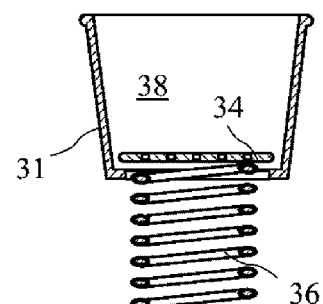
FIG. 5A is a cross-sectional side view of the first coffee holder according to the present invention taken along line 4-4 of FIG. 3 showing an empty coffee holder with the tamping spring and the bottom tamper according to the present invention.
Figure 5B:
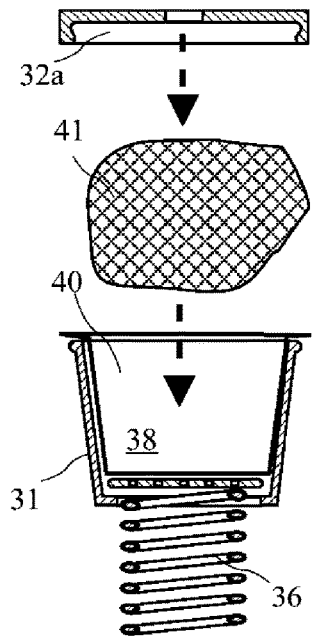
FIG. 5B is a cross-sectional side view of the first coffee holder according to the present invention taken along line 4-4 of FIG. 3 showing the coffee holder with the tamping spring and bottom tamper, a portion of coffee, and the holder lid ready to attach to a holder body according to the present invention.
Figure 5C:
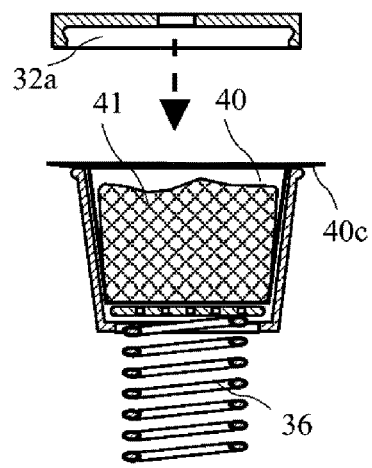
FIG. 5C is a cross-sectional side view of the first coffee holder according to the present invention taken along line 4-4 of FIG. 3 showing the coffee holder with the tamping spring and bottom tamper, the portion of coffee in the coffee holder, and the holder lid ready to attach to the holder body according to the present invention.
Figure 5D:
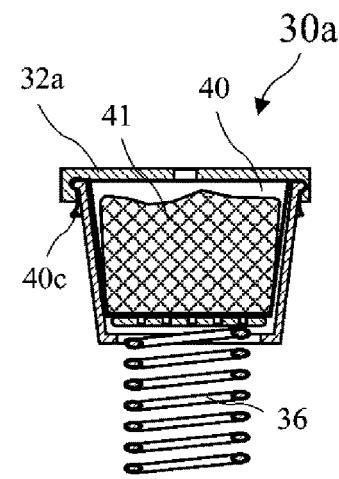
FIG. 5D is a cross-sectional side view of the first coffee holder according to the present invention taken along line 4-4 of FIG. 3 showing the coffee holder with the tamping spring and bottom tamper, the portion of coffee in the coffee holder, and the holder lid attached to the coffee holder body, according to the present invention.

A cross-sectional side view of the first coffee holder 30a taken along line 4-4 of FIG. 3 showing an empty coffee holder 30a with the tamping spring 36 and the bottom tamper 34 ready for filling are shown in FIG. 5A. A cross-sectional side view of the first coffee holder 30a taken along line 4-4 of FIG. 3 showing the coffee holder 30*a* with the tamping spring 36 and bottom tamper 34, a portion of loose coffee 41, and the holder lid 32*a* ready to attach is shown in FIG. 5B. A cross-sectional side view of the first coffee holder 30*a* taken along line 4-4 of FIG. 3 showing the coffee holder 30*a* with the tamping spring 36 and bottom tamper 34, a portion of coffee in the volume 38, and the holder lid 32*a* ready to attach is shown in FIG. 5C. A cross-sectional side view of the first coffee holder 30*a* taken along line 4-4 of FIG. 3 showing the coffee holder 30*a* with the tamping spring 36 and bottom tamper 34, a portion of loose coffee 41 in the volume 38, and the holder lid 32*a* attached to the coffee holder 30*a*, is shown in FIG. 5D.

Figure 6:
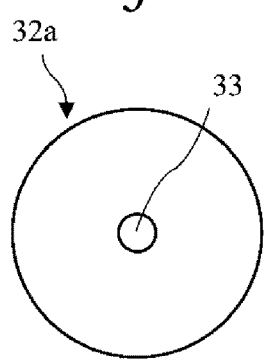
FIG. 6 is a top view of the first holder lid.

A top view of the first holder lid 32*a* showing the passage 33 provided for the nozzle 19 (see FIG. 2) is shown in FIG. 6.

Figure 7A:
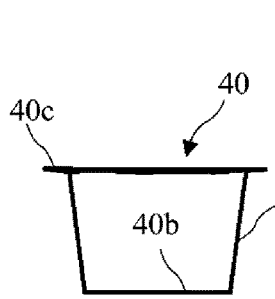
FIG. 7A is a side view of a filter paper cup according to the present invention.
Figure 7B:
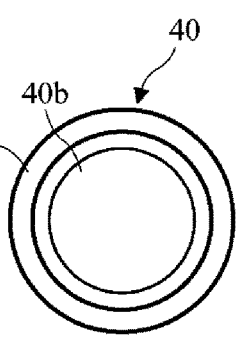
FIG. 7B is a top view of the filter paper cup according to the present invention.

A side view of a filter paper cup 40 according to the present invention is shown in FIG. 7A and a top view of the filter paper cup 40 is shown in FIG. 7B. The filter paper cup 40 includes a bottom 40*b*, sides 40*a*, and a rim 40*c*. The rim 40*c* rests on a top edge of the holder body 31 and is held between the holder cap and body when the cap is placed on the body, thereby preventing or restricting the escape of coffee 41 from the cup 40 when hot water flows into the coffee holder 30*a*.

Figure 7C:
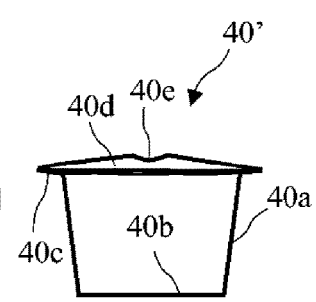
FIG. 7C is a second embodiment of the filter paper cup with a lid.

A second embodiment of the filter paper cup 40' with a folding paper lid 40*d* is shown in FIG. 7C. The lid 40*d* of the filter paper cup 40' may be folded over the cup 40' after loose coffee is poured into the cup. The lid 40*d* preferably includes a perforation 40*e* centered on the lid 40*d* allowing the nozzle 19 to enter and/or inject the hot flow of water into the tamped coffee 41.

The filter cups may be made from several materials including filter paper, nylon mesh, steel mesh, or any material suitable for filtration.

The first coffee holder 30*a* is shown ready for insertion into a first coffee maker 10*a* in FIG. 8A, the first coffee holder 30*a* is shown inserted into the coffee maker 10 before tamping the coffee 41 in FIG. 8B, and the first coffee holder 30*a* is shown in the coffee maker 10 after tamping the coffee 41 in FIG. 8C. The coffee maker includes a cavity 11 for accepting the coffee holder and has walls 11*a* for aligning the coffee holder in the coffee maker. When the lid 14 is closed, the pad 17 on the bottom of the lid 14 and/or arms 25 attached to the bottom of the lid 25, push the coffee holder 30*a* down over the tamping spring 36 and the coffee 41 is tamped between the lid 32*a* and the bottom tamper 34. The arms 25 push the coffee holder 30*a* down ahead of the nozzle 19 thereby seating the coffee holder 30*a* in the cavity 11 for alignment of the nozzle 10 with the passage 33 in the lid 32*a*.

Figure 9:
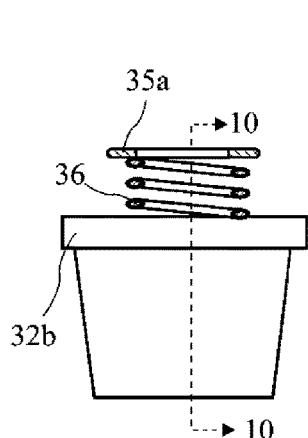
FIG. 9 is a side view of a second coffee holder according to the present invention.
Figure 10:
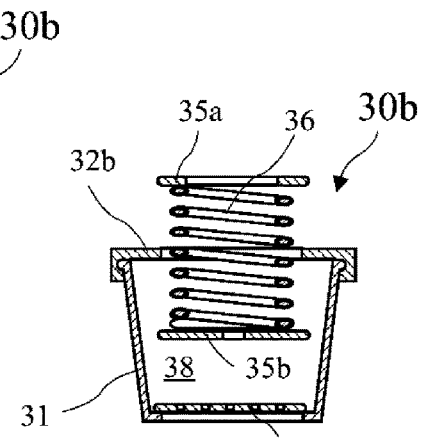
FIG. 10 is a cross-sectional side view of the second coffee holder according to the present invention taken along line 10-10 of FIG. 9.

A side view of a second coffee holder 30*b* according to the present invention is shown in FIG. 9 and a cross-sectional side view of the second coffee holder 30*b* taken along line 10-10 of FIG. 9 is shown in FIG. 10. The coffee holder 30*b* includes the holder body 31, a second holder lid 32*b*, a tamping spring 36, a spring washer 35*a*, and a top tamper 35*b*.

Figure 11A:
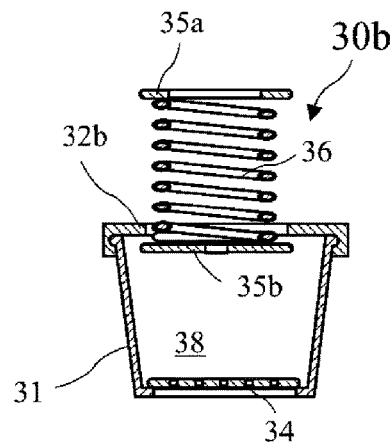
FIG. 11A is a cross-sectional side view of the second coffee holder according to the present invention taken along line 10-10 of FIG. 9 showing an empty coffee holder with the tamping spring and the top tamper according to the present invention.
Figure 11B:
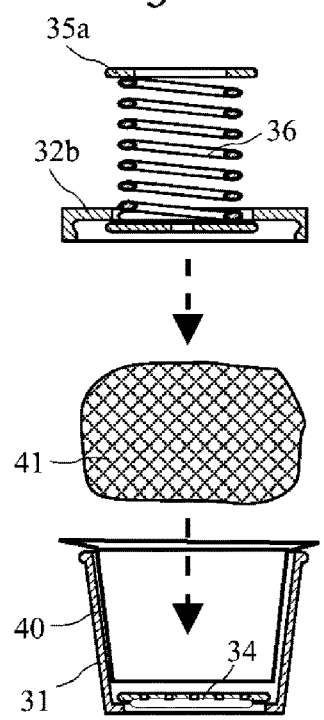
FIG. 11B is a cross-sectional side view of the second coffee holder according to the present invention taken along line 10-10 of FIG. 9 showing the coffee holder with the holder lid, tamping spring and top tamper, and a portion of coffee, ready to attach according to the present invention.
Figure 11C:
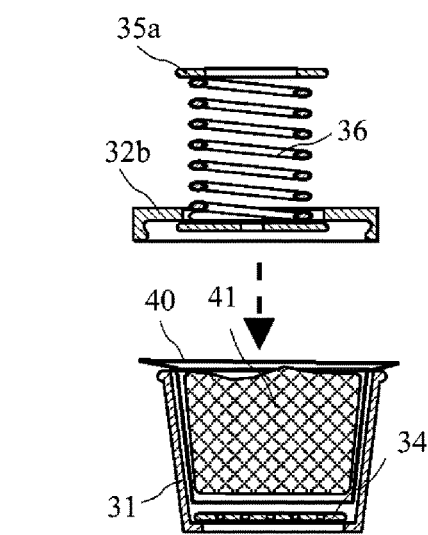
FIG. 11C is a cross-sectional side view of the second coffee holder according to the present invention taken along line 10-10 of FIG. 9 showing the portion of untamped coffee in the coffee holder, and the holder lid, tamping spring and top tamper, ready to attach to the holder base, according to the present invention.
Figure 11D:
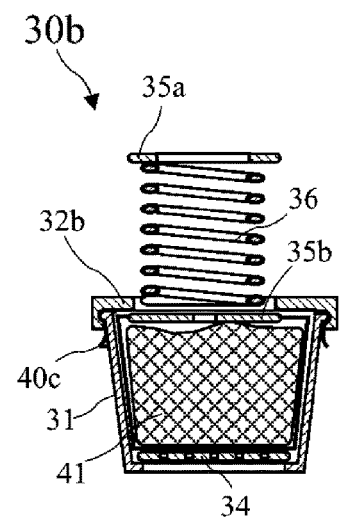
FIG. 11D is a cross-sectional side view of the second coffee holder according to the present invention taken along line 10-10 of FIG. 9 showing the portion of coffee in the coffee holder and the tamping spring, top tamper, and the holder lid attached to the coffee holder, according to the present invention.

A cross-sectional side view of the second coffee holder 30*b* taken along line 10-10 of FIG. 9 showing an empty coffee holder 30*b* is shown in FIG. 11A. A cross-sectional side view of the second coffee holder 30*b* taken along line 10-10 of FIG. 9 showing the holder lid 32*b* and a loose portion of coffee 41 above the empty coffee holder 30*b* is shown in FIG. 11B. A cross-sectional side view of the second coffee holder 30*b* taken along line 10-10 of FIG. 9 showing the holder lid 32*b* above the coffee holder 30*b* with the portion of loose coffee 41 in the coffee holder 32*b* is shown in FIG. 11C. A cross-sectional side view of the second coffee holder 32*b* taken along line 10-10 of FIG. 9 showing the coffee holder with the holder lid 32*b* attached to the coffee holder 30*b* and a portion of loose coffee 41 in the coffee holder 30*b* is shown in FIG. 11D. The tamping spring 36 extends upward out of the coffee holder 30*b* for tamping the loose coffee as disclosed hereafter.

Figure 12:
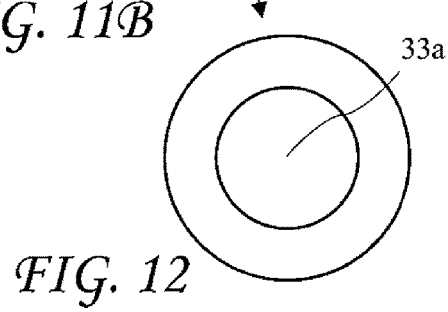
FIG. 12 is a top view of the second holder lid.

A top view of the second holder lid 32*b* is shown in FIG. 12. The holder lid 32*b* includes a larger passage 33*a* allowing passage of the tamping spring 36 through the holder lid 32*b*.

Figure 13:
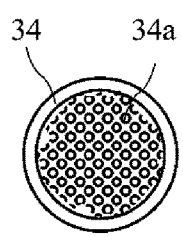
FIG. 13 is a top view of the bottom tamper.

A top view of the bottom tamper 34 is shown in FIG. 13. The bottom tamper 34 includes perforations 34*a* to allow coffee drink to pass through the bottom tamper 34.

The second coffee holder 30*b* is shown ready for insertion into the coffee maker 10 in FIG. 14A, the second coffee holder 30*b* is shown inserted into the coffee maker 10 before tamping the coffee 41 in FIG. 14B, and the second coffee holder 30*b* is shown in the coffee maker 10 after tamping the coffee 41 in FIG. 14C. The coffee maker 10 may include a long nozzle 19*a* to reach the top tamper 35*b* for "injection" of the heated water into the tamped coffee, but may also include the nozzle 19 and the heated water may pass through the coffee 41 under the pull of gravity.

Figure 15:
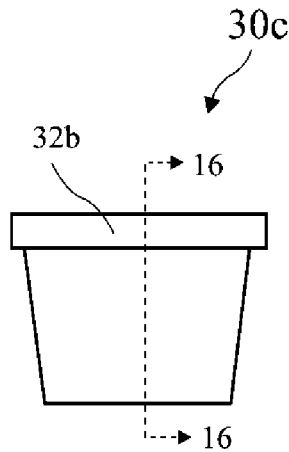
FIG. 15 is a side view of a third coffee holder according to the present invention.
Figure 16:
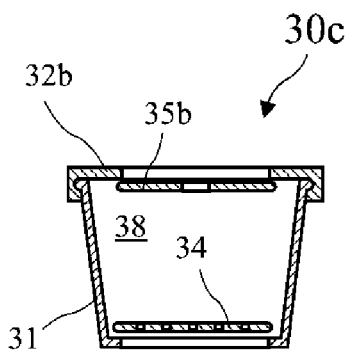
FIG. 16 is a cross-sectional side view of the third coffee holder according to the present invention taken along line 16-16 of FIG. 15.

A side view of a third coffee holder 30*c* according to the present invention is shown in FIG. 16 and a cross-sectional side view of the third coffee holder 30*c* taken along line 16-16 of FIG. 15 is shown in FIG. 16. The coffee holder 30*c* includes the holder body 31, the second holder lid 32*b*, the bottom tamper 34, and the top tamper 35*b*.

Figure 17A:
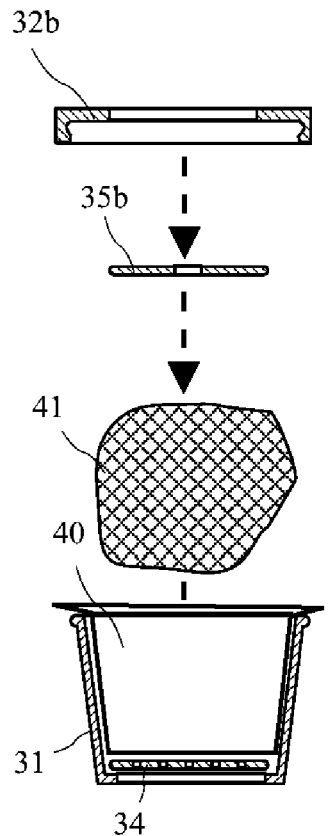
FIG. 17A is a cross-sectional side view of the third coffee holder according to the present invention taken along line 16-16 of FIG. 15 showing the portion of coffee above the coffee holder and the top tamper and the holder lid ready to attach to the coffee holder, according to the present invention.
Figure 17B:
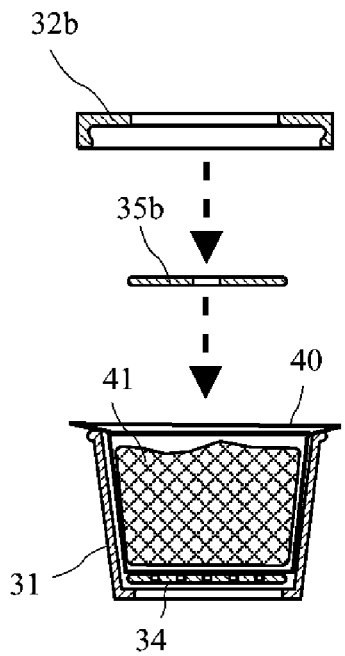
FIG. 17B is a cross-sectional side view of the third coffee holder according to the present invention taken along line 16-16 of FIG. 15 showing the portion of coffee in the coffee holder, and the top tamper and the holder lid ready to attach to the coffee holder, according to the present invention.
Figure 17C:
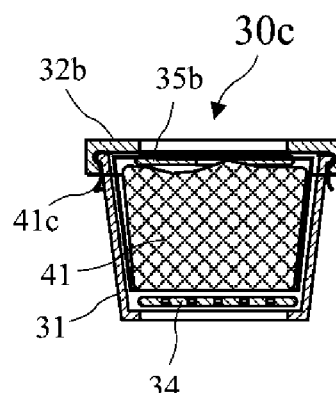
FIG. 17C is a cross-sectional side view of the third coffee holder according to the present invention taken along line 16-16 of FIG. 15 showing the portion of coffee in the coffee holder, and the bottom tamper, the top tamper, and the holder lid attached to the coffee holder, according to the present invention.

A cross-sectional side view of the third coffee holder 30*c* taken along line 16-16 of FIG. 15 showing the coffee holder 30*c* with the holder lid 32*b*, the top tamper 35*b*, and a portion of coffee, ready to attach to the holder 31, is shown in FIG. 17A. A cross-sectional side view of the third coffee holder taken along line 16-16 of FIG. 15 showing the coffee holder 30*c* with the holder lid 32*b* and the top tamper ready to attach, and a portion of coffee 41 in the coffee holder, is shown in FIG. 17B. A cross-sectional side view of the third coffee holder 30*c* taken along line 16-16 of FIG. 15 showing the coffee holder with the holder lid and the top tamper attached and a loose portion of coffee 41 in the coffee holder is shown in FIG. 17C. The coffee holder 30*c* is configured to use with a coffee maker 10*b* (see FIGS. 18A-18C) including apparatus for entering the coffee holder for tamping the loose coffee 41.

The third coffee holder 30*c* ready for insertion into a second coffee maker 10*b* in FIG. 18A, the third coffee holder 30*c* is shown residing in the coffee maker 10*b* before tamping the coffee 41 in FIG. 18B, and the third coffee holder 30*c* is shown residing in the coffee maker 10*b* after tamping the coffee 41 in FIG. 18C. The coffee maker 10*b* includes the tamping spring 36 attached to the pad 17 on the bottom of the lid 14. When the lid 14 is closed the tamping spring 36 enters the coffee holder 30*c* through the lid passage 33*a* (see FIG. 12) and pushes the top tamper 35*b* against the coffee 41 to tamp the coffee 41.

A side view of a fourth coffee holder 30*d* according to the present invention is shown in FIG. 19 and a cross-sectional side view of the fourth coffee holder 30*d* taken along line 20-20 of FIG. 19 is shown in FIG. 20. The coffee holder 30*d* includes the holder body 31, the first holder lid 32*a*, and the bottom tamper 34.

A cross-sectional side view of the fourth coffee holder 30*d* taken along line 20-20 of FIG. 19 showing the coffee holder with the bottom tamper 34, and a portion of coffee 41 and the holder lid ready to attach is shown in FIG. 21A. A cross-sectional side view of the fourth coffee holder 30*d* taken along line 20-20 of FIG. 19 showing the coffee holder 30*d* with the bottom tamper 34, the portion of coffee 41 in the coffee holder 30*d*, and the holder lid 32*a* ready to attach is shown in FIG. 21B. A cross-sectional side view of the fourth coffee holder 30*d* taken along line 20-20 of FIG. 19 showing the coffee holder 30*d* with the bottom tamper 34, a portion of coffee in the coffee holder 41, and the holder lid 32*a* is shown in FIG. 21C.

The fourth coffee holder 30*d* ready for insertion into another embodiment of the second coffee maker 10*b* in FIG. 22A, the fourth coffee holder 30*d* is shown residing in the coffee maker 10*b* before tamping the coffee 41 in FIG. 22B, and the fourth coffee holder 30*d* is shown residing in the coffee maker 10*b* after tamping the coffee 41 in FIG. 22C. The coffee maker 10*b* may include the tamping spring 36 residing in the bottom of the coffee holder cavity 11. When the lid 14 is closed, the pad 17 pushed the coffee holder 30*d* down over the tamping spring 36 and the tamping spring 36 enters the coffee holder 30*c* through the bottom of the holder body 31 and pushes the bottom tamper 34 against the coffee 41 to tamp the coffee 41.

Figure 23C:
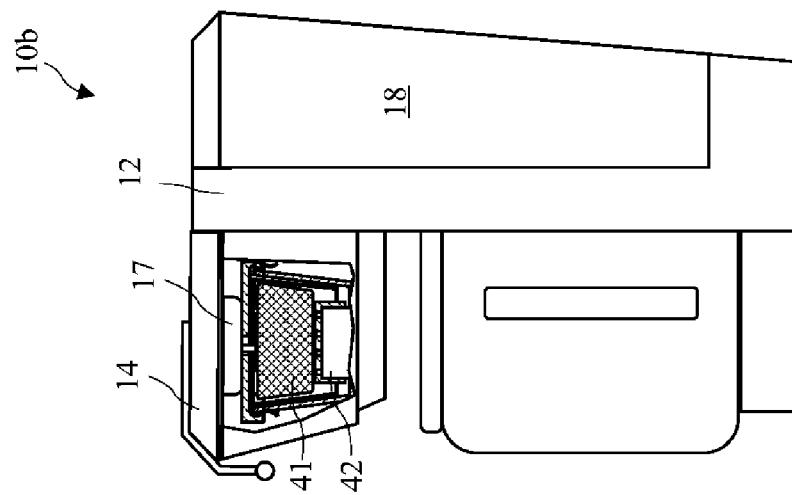
FIG. 23C shows the fourth coffee holder inserted into the coffee maker having the tamping block after tamping the coffee.
Figure 23B:
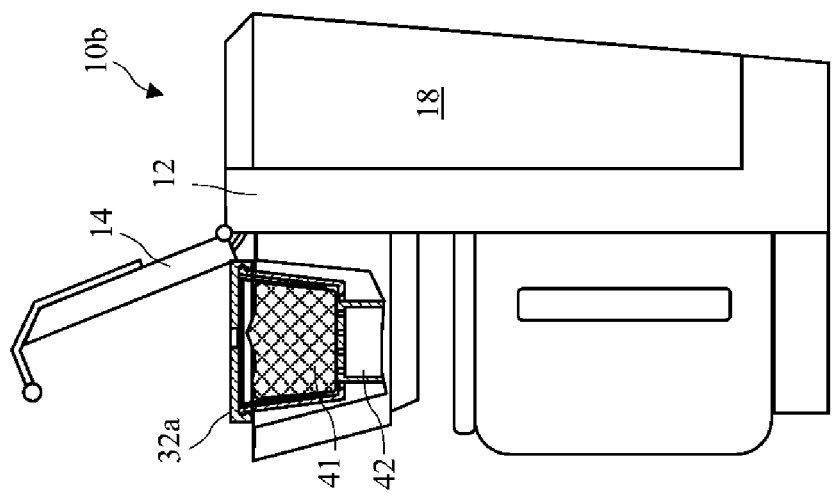
FIG. 23B shows the fourth coffee holder inserted into the coffee maker having the tamping block before tamping the coffee.
Figure 23A:
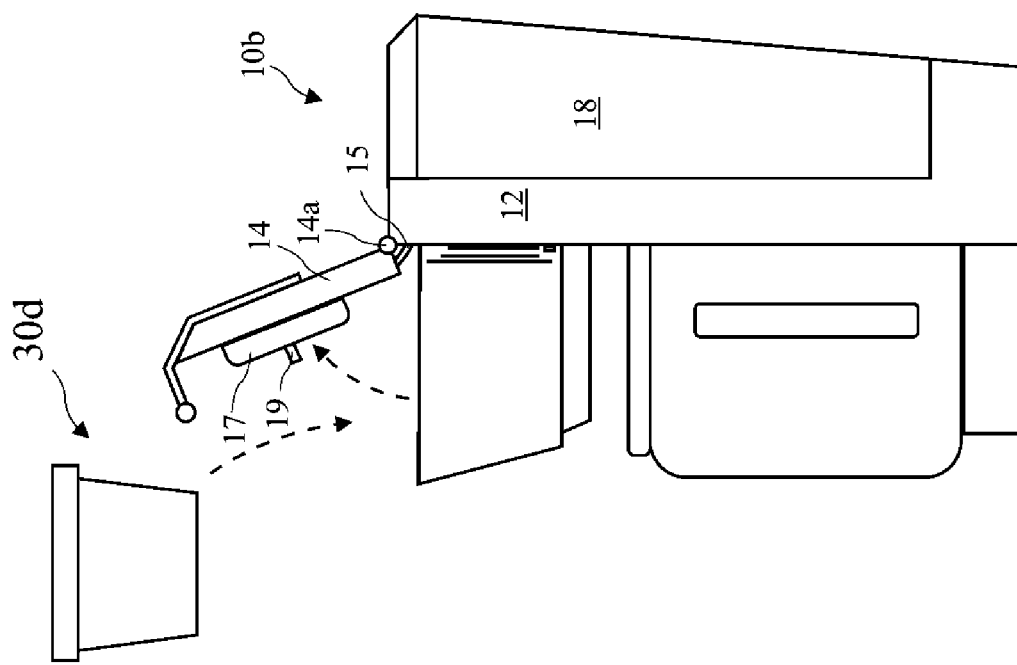
FIG. 23A shows the fourth coffee holder ready for insertion into the coffee maker having a tamping block according to the present invention.

The fourth coffee holder 30*d* ready for insertion into another embodiment of the second coffee maker 10*b* in FIG. 23A, the fourth coffee holder 30*d* is shown residing in the coffee maker 10*b* before tamping the coffee 41 in FIG. 23B, and the fourth coffee holder 30*d* is shown residing in the coffee maker 10*b* after tamping the coffee 41 in FIG. 23C. The coffee maker 10*b* may include a resilient solid block 42 residing in the bottom of the coffee holder cavity 11. When the lid 14 is closed, the pad 17 pushed the coffee holder 30*d* down over the resilient solid block 42 and the resilient solid block 42 enters the coffee holder 30*c* through the bottom of the holder body 31 and pushes the bottom tamper 34 against the coffee 41 to tamp the coffee 41.

A side view of a fifth coffee holder 30*e* according to the present invention is shown in FIG. 24 and a cross-sectional side view of the fifth coffee holder 30*e* taken along line 25-25 of FIG. 24 is shown in FIG. 25. The fifth coffee holder 30*e* includes the holder body 31, the holder lid 32*b*, the tamping spring 36 and the top tamper 35*b* attached to the holder lid 32*a*.

A cross-sectional side view of the fifth coffee holder 30*e* taken along line 25-25 of FIG. 24 showing the coffee holder 30*e* with a portion of coffee 41, and the holder lid 32*b* with the top tamper 35*b* and tamping spring 36 attached, above the holder body 31, is shown in FIG. 26A. A cross-sectional side view of the fifth coffee holder 30*e* taken along line 25-25 of FIG. 24 showing the coffee holder with the portion of coffee 41 in the coffee holder, and the holder lid 32*b* with the top tamper 35*b* and tamping spring 36 attached, above the holder body 31, is shown in FIG. 26B. A cross-sectional side view of the fifth coffee holder 30*e* taken along line 25-25 of FIG. 24 showing the coffee holder 30*e* with the portion of coffee 41 in the coffee holder 30*e*, and the holder lid 32*b* with the top tamper 35*b* and tamping spring 36 attached to the holder base 31 is shown in FIG. 26D. The tamping spring 36 and top tamper 35*b* tamp the coffee 41 to provide a tamped coffee when the holder lid 32*b* is attached to the holder base 31.

Figures 27, 28:
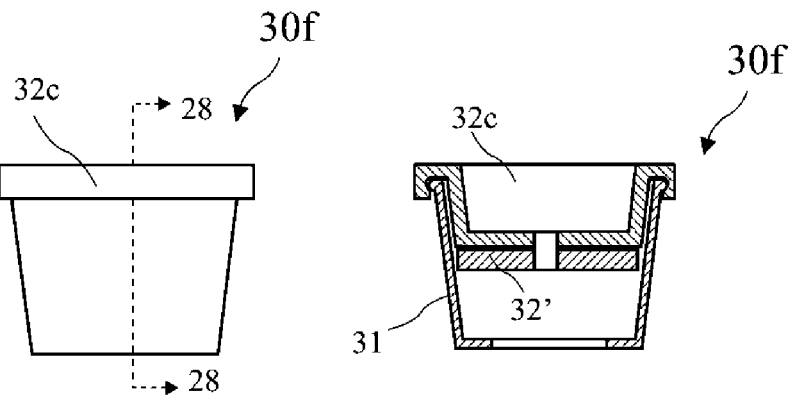
FIG. 27 is a side view of a sixth coffee holder according to the present invention.
FIG. 28 is a cross-sectional side view of the sixth coffee holder according to the present invention taken along line 28-28 of FIG. 27.

A side view of a sixth coffee holder 30*f* according to the present invention is shown in FIG. 27 and a cross-sectional side view of the sixth coffee holder 30*f* taken along line 28-28 of FIG. 27 is shown in FIG. 28. The sixth coffee holder 30*f* includes the holder body 31 and a third holder lid 32*c*. The third holder lid 32*c* includes a recessed portion 32' which reaches into the interior of the sixth coffee holder 30*f*. The recessed portion 32' is preferably a solid resilient material.

Figures 29A, 29B, 29C:
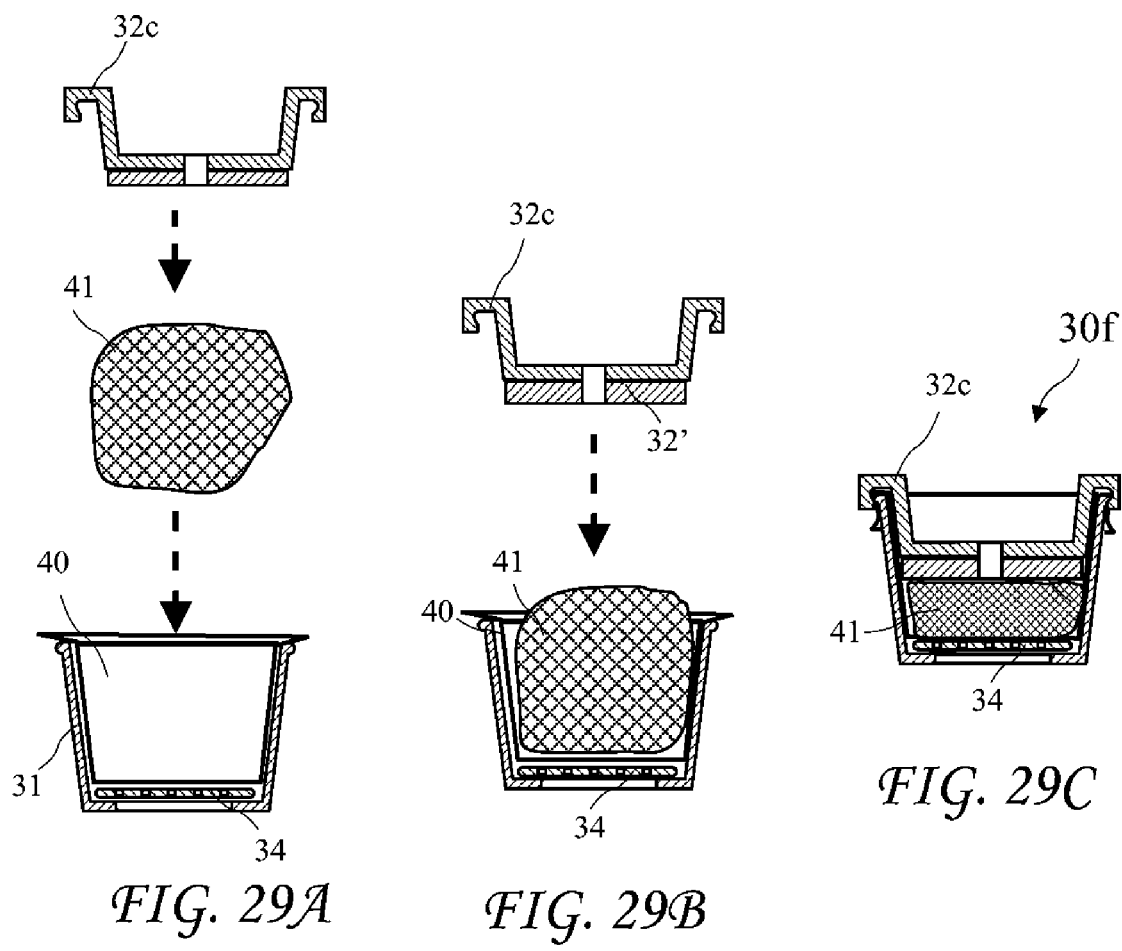
FIG. 29A is a cross-sectional side view of the sixth coffee holder according to the present invention taken along line 28-28 of FIG. 27 showing the portion of coffee above the coffee holder, and the holder lid ready to attach to the holder body, according to the present invention.
FIG. 29B is a cross-sectional side view of the sixth coffee holder according to the present invention taken along line 28-28 of FIG. 27 showing the portion of coffee in the coffee holder, and the holder lid ready to attach to the holder body, according to the present invention.
FIG. 29C is a cross-sectional side view of the sixth coffee holder according to the present invention taken along line 28-28 of FIG. 27 showing the portion of coffee in the coffee holder, and the holder lid attached and tamping the coffee, according to the present invention.

A cross-sectional side view of the sixth coffee holder 30*f* taken along line 28-28 of FIG. 27 showing the sixth coffee holder 30*f* with a portion of coffee 41, and the holder lid 32*c*, above the holder body 31, is shown in FIG. 29A. A cross-sectional side view of the sixth coffee holder 30*f* taken along line 28-28 of FIG. 27 showing the coffee holder with the portion of coffee 41 in the coffee holder, and the holder lid 32*c* above the holder body 31, is shown in FIG. 29B. A cross-sectional side view of the sixth coffee holder 30*f* along line 28-28 of FIG. 27 showing the sixth coffee holder 30*f* with the portion of coffee 41 in the coffee holder 30*e*, and the holder lid 32*e* attached to the holder base 31 is shown in FIG. 26D. A cushion 32" tamps the coffee 41 to provide a tamped coffee when the holder lid 32*e* is attached to the holder base 31. The cushion 32" is preferably made from a resilient material to cushion the tamping of the loose coffee.

Figure 30:
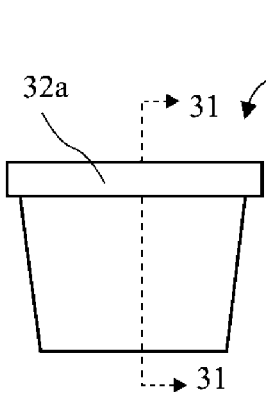
FIG. 30 is a side view of a seventh coffee holder according to the present invention.
Figure 31:
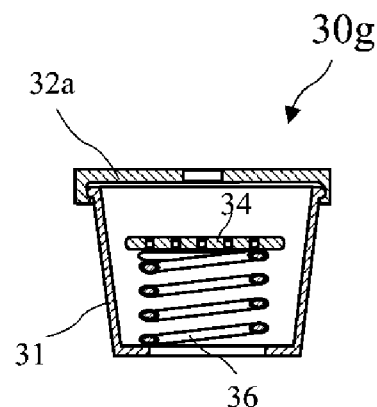
FIG. 31 is a cross-sectional side view of the seventh coffee holder according to the present invention taken along line 31-31 of FIG. 30.
Figure 32A:
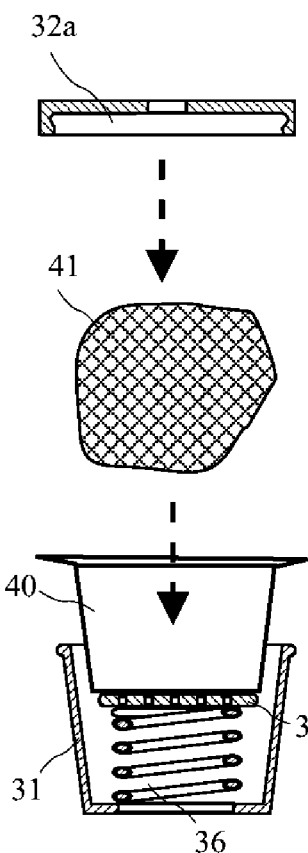
FIG. 32A is a cross-sectional side view of the seventh coffee holder according to the present invention taken along line 31-31 of FIG. 30 showing the portion of coffee above the coffee holder, and the holder lid ready to attach to the holder body, according to the present invention.
Figure 32B:
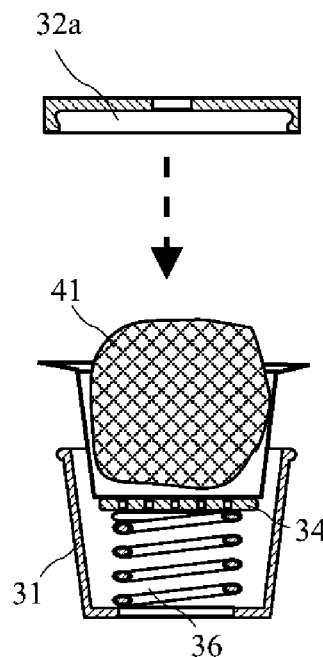
FIG. 32B is a cross-sectional side view of the seventh coffee holder according to the present invention taken along line 31-31 of FIG. 30 showing the portion of coffee in the coffee holder, and the holder lid ready to attach to the holder body, according to the present invention.
Figure 32C:
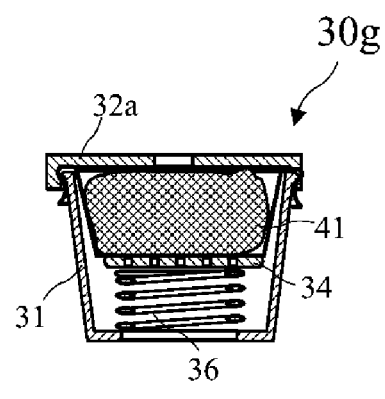
FIG. 32C is a cross-sectional side view of the seventh coffee holder according to the present invention taken along line 31-31 of FIG. 30 showing the portion of coffee in the coffee holder, and the holder lid attached to the holder body and the coffee tamped between the bottom tamper and spring and the holder lid, according to the present invention.

A side view of a seventh coffee holder 30*g* according to the present invention is shown in FIG. 30 and a cross-sectional side view of the seventh coffee holder 30*g* taken along line 31-31 of FIG. 30 is shown in FIG. 31. The seventh coffee holder 30*g* includes the holder body 31, the holder lid 32*b*, the tamping spring 36, and the bottom tamper 34 inside the holder base 31.

A cross-sectional side view of the seventh coffee holder 30*g* taken along line 31-31 of FIG. 30 showing the seventh coffee holder 30*g* with a portion of coffee 41 and the holder lid 32*a* above the holder body 31, and with the bottom tamper 34 and tamping spring 36 inside the holder base 31, is shown in FIG. 26A. A cross-sectional side view of the seventh coffee holder 30*g* taken along line 31-31 of FIG. 30 showing the coffee holder with the portion of coffee 41 in the filter paper 40 in the holder base 31 resting on the bottom tamper 34 supported by the tamping spring 36, and the holder lid 32*a* above the holder body 31, is shown in FIG. 26B. A cross-sectional side view of the seventh coffee holder 30*g* taken along line 31-31 of FIG. 30 showing the seventh coffee holder 30*g* with the portion of coffee 41 in the coffee holder 30*e*, and the holder lid 32*a* attached to the holder base 31, is shown in FIG. 26D. The tamping spring 36 and bottom tamper 34 tamp the coffee 41 upward against the tamper lid 32*a* to provide a tamped coffee when the holder lid 32*a* is attached to the holder base 31.

Figures 33, 34A, 34B:
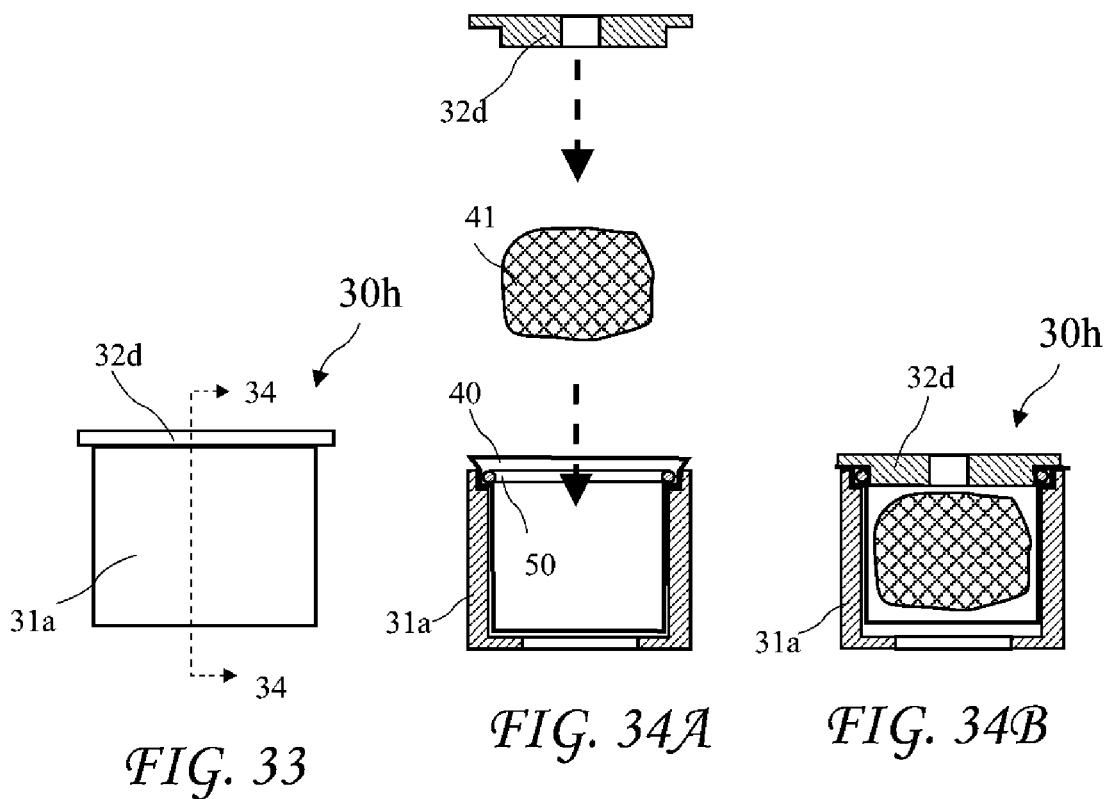
FIG. 33 is a side view of an eighth coffee holder according to the present invention.
FIG. 34A is a cross-sectional side view of the eighth coffee holder taken along line 34-34 of FIG. 33 showing a portion of coffee for placing inside the coffee holder and the holder lid with an insertable portion and an O-ring inside the coffee holder for sealing according to the present invention.
FIG. 34B is a cross-sectional side view of the eighth coffee holder taken along line 34-34 of FIG. 33 showing the portion of coffee inside the coffee holder and the holder lid with the insertable portion inserted into the coffee holder and cooperating with the O-Ring inside the coffee holder for sealing.

A side view of an eighth coffee holder 30*h* according to the present invention is shown in FIG. 33, a cross-sectional side view of the eighth coffee holder 30*h* taken along line 34-34 of FIG. 33 showing a portion of coffee 41 for placing inside the coffee holder and a fourth holder lid 32*d* with an insertable portion and an O-Ring 50 inside the coffee holder for sealing is shown in FIG. 34A, and a cross-sectional side view of the eighth coffee holder taken along line 34-34 of FIG. 33 showing the portion of coffee 41 inside the coffee holder 30*h* and the holder lid 32*d* with the insertable portion inserted into the coffee holder base 31*a* is shown in FIG. 34B. The filter paper 40 extends up above the O-ring 50 and the O-Ring 50 cooperates with the holder lid 32*d* to sandwich the top edge of the filter paper 40 for sealing the filter paper 40 to reduce or prevent the coffee 41 from escaping when the flow of hot water is provided to the coffee holder 30*h*. The holder base 31*a* is preferably cylindrical but may also be conical in shape.

Figures 35, 36A, 36B:
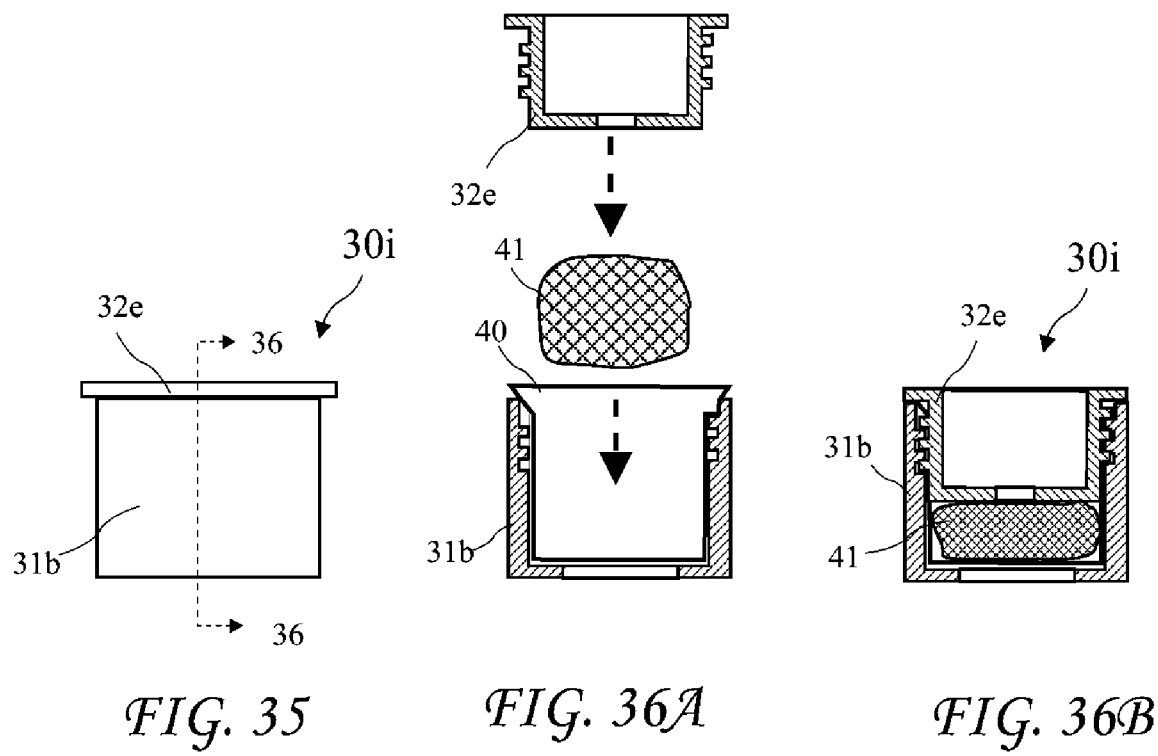
FIG. 35 is a side view of a ninth coffee holder according to the present invention.
FIG. 36A is a cross-sectional side view of the ninth coffee holder taken along line 36-36 of FIG. 35 showing a portion of coffee for placing inside the coffee holder and a holder lid with a threaded portion for screwing inside the holder body for sealing according to the present invention.
FIG. 36B is a cross-sectional side view of the ninth coffee holder taken along line 36-36 of FIG. 35 showing the portion of coffee inside the coffee holder and a holder lid with the threaded portion screwed into the holder body and tamping the coffee according to the present invention.

A side view of a ninth coffee holder 30*i* according to the present invention is shown in FIG. 35, a cross-sectional side view of the ninth coffee holder 30*i* taken along line 36-36 of FIG. showing a portion of coffee 41 for placing inside the coffee holder and a fifth holder lid 32e with a threaded portion for screwing inside the holder base 31b for sealing is shown in FIG. 36A, and a cross-sectional side view of the ninth coffee holder 30i taken along line 36-36 of FIG. 35 showing the portion of coffee 41 inside the coffee holder and the holder lid 32e with the threaded portion screwed into the coffee holder and tamping the coffee 41 is shown in FIG. 36B. The threads both provide tamping and sealing the coffee to reduce or prevent the coffee 41 from escaping when the flow of hot water is provided to the coffee holder 30h. The holder base 31b is preferably cylindrical to facilitate having internal threads, and at least the threaded portion is preferably cylindrical.

A third coffee maker 10c having a coffee holder 30 according to the present invention for receiving a portion of coffee and a tamping spring 36 for tamping the coffee is shown in FIG. 37A, the third coffee maker 10c with the coffee holder 30 holding the portion of coffee 41 is shown in FIG. 37B, and the third coffee maker 10c with the coffee holder 30 holding the portion of coffee 41 with the coffee maker lid 14 closed for tamping the coffee 41 is shown in FIG. 37C. When the lid 14 is closed, the pad 17 pushes the coffee holder 30 down and the tamping spring 36 enters the bottom of the coffee holder 30 to tamp the coffee 41. While attaching the lid 32a to the holder 30 is preferred in order to prevent coffee grounds from escaping the holder 30, the coffee maker 10c may also be used without the lid 32a and the pad 17 may serve to seal the coffee 41 in the holder 30. In this instance, the coffee maker lid 14 serves as a coffee holder lid.

A third coffee maker 10c having a coffee holder for receiving a portion of coffee and tamping spring 36 attached to the coffee maker lid 14 according to the present invention for tamping the coffee 41 when the coffee maker lid 14 is closed is shown in FIG. 38A, the third coffee maker with the coffee holder 30 holding the portion of coffee 41 is shown in FIG. 38B, and the third coffee maker 10c with the coffee holder 30 holding the portion of coffee 41 with the coffee maker lid 14 closed to push the tamping spring 36 into the coffee holder 30 for tamping the coffee 41 is shown in FIG. 38C.

A fourth coffee maker 10d having a third holder base 31c for receiving a packet 41a containing untamped coffee, a knife 50 for cutting the packet 41a open, and tamping spring 36 under the holder base 31c according to the present invention for tamping the coffee when the coffee maker lid is closed is shown in FIG. 39A, the fourth coffee maker 10d with the holder base 31c holding the packet 41a of untamped coffee is shown in FIG. 39B, and fourth coffee maker with the holder base 31c holding the packet of tamped coffee 41c with the coffee maker lid 14 closed to push the holder base down over the tamping spring 36 for tamping the coffee is shown in FIG. 39C. The coffee maker 10d includes a somewhat pointed nozzle 19a to puncture the packet 41a to provide the flow of hot water to the tamped coffee in the packet 41a. Known coffee packets include internal filters to allow a flow of hot water through the packet to make the coffee drink while preventing coffee grounds from escaping. The cut in the packet 41a made by the knife 50 allows the coffee drink to escape from the packet while filter material in the packet 41a prevent coffee grounds from escaping. The tamping spring 36 may also be attached to the lid 14 as in FIGS. 38A-38C.

The packet 41a may be an air tight pod containing coffee in filter paper and positioning the knife on the side of the holder base 31c results in less likelihood of the knife 50 cutting the filter paper. The packet 41a is preferably airtight to maintain coffee freshness and may be plastic, metal foil, or other airtight material which is sufficiently flexible to allow the coffee contained in the packet 41a to be tamped. Alternatively, the knife 50 may be eliminated when the packet 41a is configured to burst under pressure to expose the coffee, for example, when the coffee maker tamps the coffee, the packet 41a also bursts. In one embodiment, filter paper 41 is inserted into the holder base 31c without the knife 50, and the packet 41a bursts during compacting to release the coffee into the filter paper.

Known coffee makers use a sealed cup or capsule having a somewhat ridged cup with a foil cover. Such cups might be compressible and used in the coffee maker 10d, however, a similar cup or capsule having a less ridged cup which may be compressed in the coffee maker 10d are more suitable for use in the coffee maker 10d to allow tamping of the coffee contained in the cup or capsule.

Figure 40C:
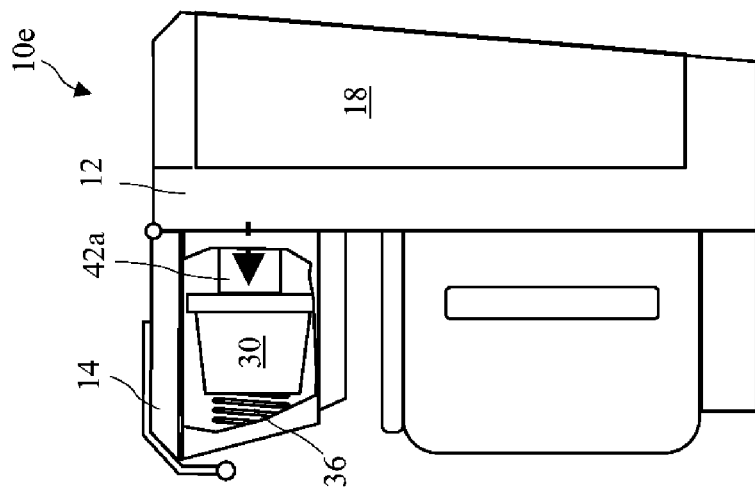
FIG. 40C shows the fifth coffee maker with the coffee holder residing horizontally in the coffee holder cavity with the coffee maker lid closed and the coffee holder pushed against the tamping spring for tamping the coffee, according to the present invention.
Figure 40B:
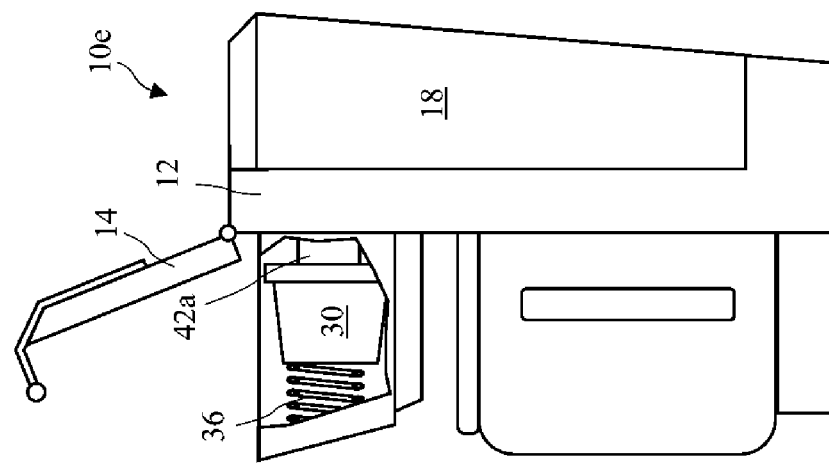
FIG. 40B shows the fifth coffee maker with the coffee holder residing horizontally in the coffee holder cavity according to the present invention for tamping the coffee when the coffee maker lid is closed.
Figure 40A:
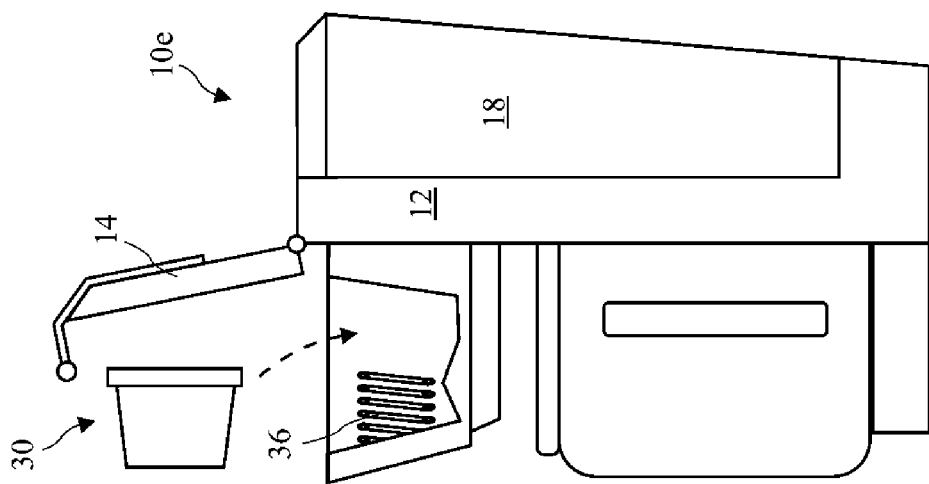
FIG. 40A shows a fifth coffee maker accepting a horizontal coffee holder and tamping spring residing horizontally in a coffee holder cavity according to the present invention for tamping the coffee when the coffee maker lid is closed.

A fifth coffee maker 10e for horizontally receiving the coffee holder 30 is shown in FIG. 40A, the fifth coffee maker with the coffee holder 30 residing in the coffee maker is shown in FIG. 40B, and the fifth coffee maker with the coffee maker lid 14 closed and the tamping spring 36 entering the coffee holder 30 for tamping the coffee 41 is shown in FIG. 40C. The fifth coffee maker 10d may alternatively include a tamping spring entering the coffee holder top, or a resilient solid block pushed into the coffee holder 30 to tamp the coffee. Preferably, a horizontal ram 42a is actuated when the lid 14 is closed and pushed the coffee holder 30 against the spring 36 to tamp the coffee. The horizontal ram 42a may actuated by an electrical solenoid, by pressure, or by mechanical levers connected to the lid 14. The fifth coffee maker 10e may further include any of the features described above for other embodiments of the coffee maker according to the present invention and may be configured to use any of the coffee holders described above according to the present invention.

Figure 41:
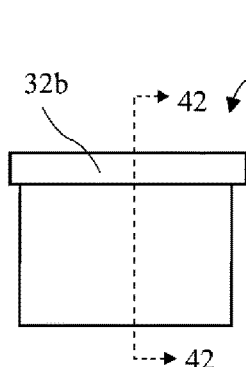
FIG. 41 is a side view of a tenth coffee holder with straight walls according to the present invention.
Figure 42:
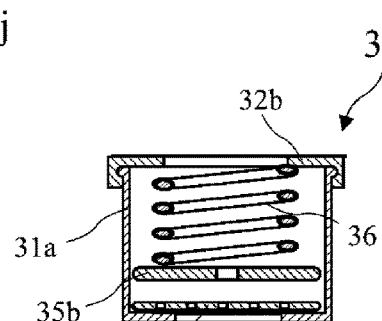
FIG. 42 is a cross-sectional view of the tenth coffee holder taken along line 42-42 of FIG. 41 showing an empty coffee holder.

A side view of a tenth coffee holder 30j with straight walls according to the present invention is shown in FIG. 41, and a cross-sectional view of the tenth coffee holder 30j taken along line 42-42 of FIG. 41 showing an empty coffee holder is shown in FIG. 42. The coffee holder 30j provides straight cylindrical inside walls allowing a better fit between the top tamper 35b and the inside walls to reduce or eliminate coffee 41 escaping past the top tamper 35b during tamping.

Figure 43:
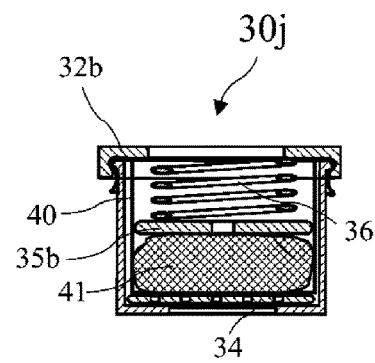
FIG. 43 is a cross-sectional view of the tenth coffee holder taken along line 42-42 of FIG. 41 showing a full and tamped coffee holder.

A cross-sectional view of the tenth coffee holder 30j taken along line 42-42 of FIG. 41 showing a full and tamped coffee holder is shown in FIG. 43. The tamping spring 36 has been pushed down by the lid 32b to tamp the coffee 41.

Figure 44:
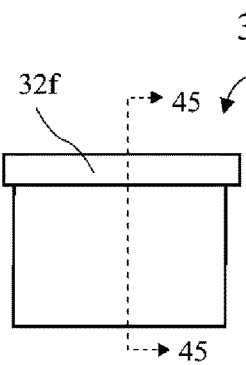
FIG. 44 is a side view of an eleventh coffee holder with straight walls according to the present invention.
Figure 45:
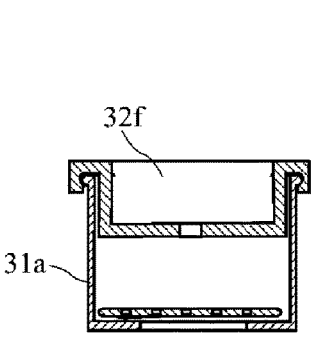
FIG. 45 is a cross-sectional view of the eleventh coffee holder taken along line 45-45 of FIG. 44 showing an empty coffee holder.
Figure 46:
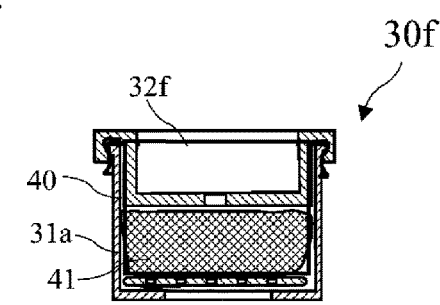
FIG. 46 is a cross-sectional view of the eleventh coffee holder taken along line 45-45 of FIG. 41 showing a full and tamped coffee holder.

A side view of an eleventh coffee holder 30k with straight walls according to the present invention is shown in FIG. 44, a cross-sectional view of the eleventh coffee holder 30k taken along line 45-45 of FIG. 44 showing an empty coffee holder is shown in FIG. 45, and a cross-sectional view of the eleventh coffee holder 30k taken along line 45-45 of FIG. 41 showing a full and tamped coffee holder. As with the coffee holder 30j, the coffee holder 30k provides straight cylindrical inside walls allowing a better fit between the lid 32f and the inside walls to reduce or eliminate coffee 41 escaping past the lid 32f during tamping. The lid 32f may be used with or without the top tamper 35b.

Figure 47B:
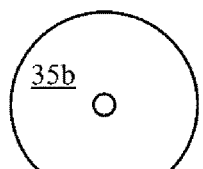
FIG. 47B is a top view of the top tamper.
Figure 47D:
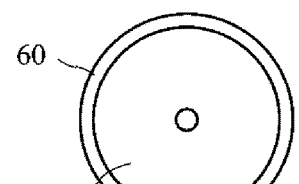
FIG. 47D is a top view of the top tamper with a seal.
Figure 47A:
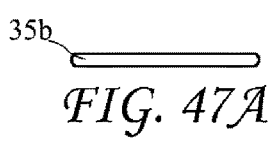
FIG. 47A is a side view of a top tamper.
Figure 47C:
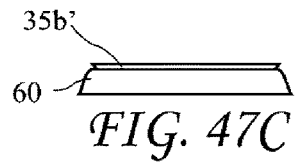
FIG. 47C is a side view of a top tamper with a seal according to the present invention.

A side view of a top tamper 35b is shown in FIG. 47A and a top view of the top tamper 35B is shown in FIG. 47B. A side view of a top tamper 35b' with a seal 60 according to the present invention is shown in FIG. 47C and a top view of the top tamper 35b' with the seal 60 is shown in FIG. 47D. In some instances, for example with a very fine ground coffee, an amount of coffee may escape past the top tamper 35b. In such instances, a user may prefer to use the top tamper 35b' with the seal 60 to reduce or eliminate the escape of the coffee.

Figure 48:
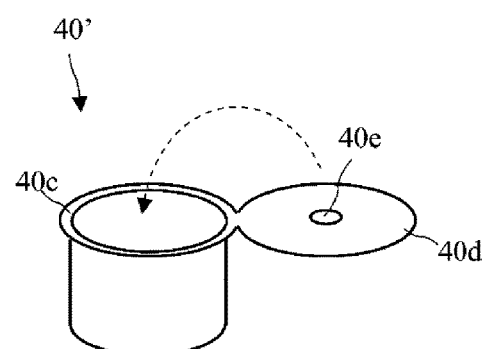
FIG. 48 is a perspective view of a filter paper cup with a folding cup lid.

A perspective view of a filter paper cup 40' with a folding cup lid 40d is shown in FIG. 48 (also see FIG. 7C). The cup lid 40d may be folded over the rim 40c to reduce or prevent coffee from escaping during tamping of subsequent processing. The lid 40d may also include a perforation 40e centered on the lid 40d allowing the nozzle 19 to enter and/or inject the hot flow of water into the tamped coffee 41, but in some embodiments, the lid 40d does not include the perforation 40e. The filter paper cup 40' may be used in the coffee containers described herein, and may able be used in a coffee machine having a cavity for receiving the filter paper cup 40'. While the cup 40' is preferably made from filter paper, the cup may also be made from a reusable mesh.

Figure 49:
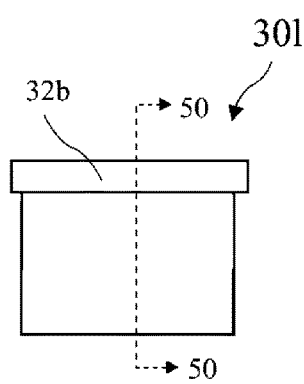
FIG. 49 is a side view of an twelfth coffee holder with straight walls according to the present invention.
Figure 50:
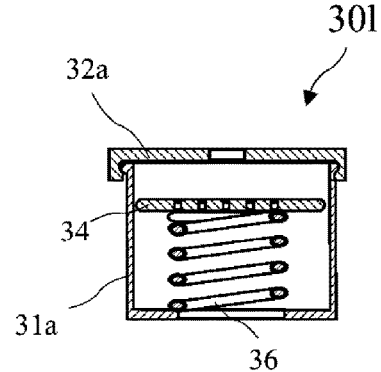
FIG. 50 is a cross-sectional view of the twelfth coffee holder taken along line 50-50 of FIG. 49 showing an empty coffee holder.

A side view of an twelfth coffee holder 30l with straight walls according to the present invention is shown in FIG. 49, and a cross-sectional view of the twelfth coffee holder 30l taken along line 50-50 of FIG. 49 showing an empty coffee holder is shown in FIG. 50. The twelfth coffee holder 30l includes a straight walled base and the tamping spring below the coffee, and additionally uses a filter paper cup 40' with the folding lid 40d.

Figure 51A:
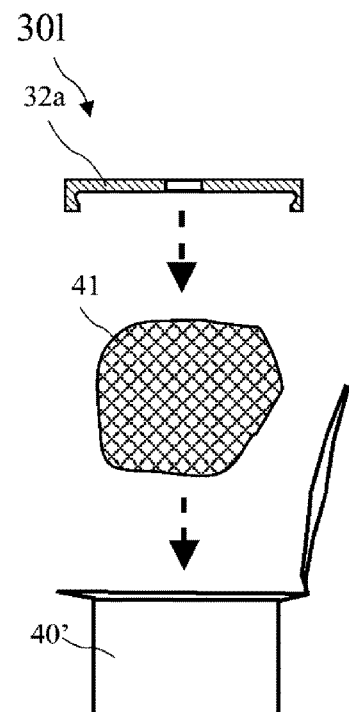
FIG. 51A is a cross-sectional view of the twelfth coffee holder taken along line 50-50 of FIG. 49 showing a lid, coffee, a filter paper cup, above the base, and the coffee holder base.
Figure 51B:
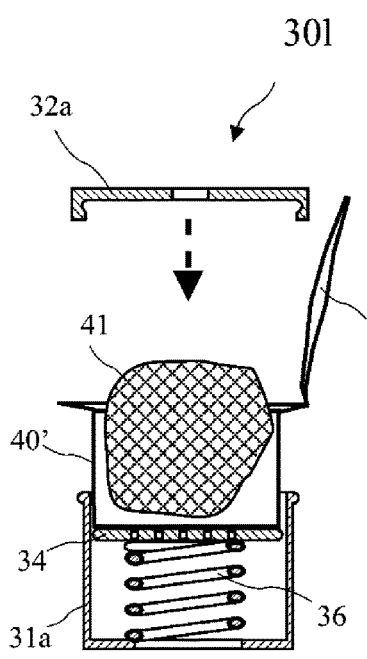
FIG. 51B is a cross-sectional view of the twelfth coffee holder taken along line 50-50 of FIG. 49 showing the lid, above the coffee and the filter paper cup resting in the coffee holder base.
Figure 51C:
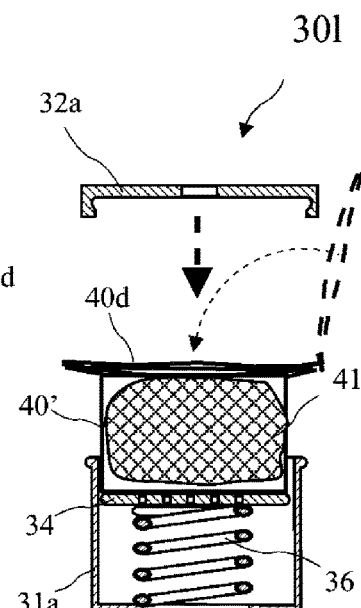
FIG. 51C is a cross-sectional view of the twelfth coffee holder taken along line 50-50 of FIG. 49 showing the lid, above the coffee and the filter paper cup resting in the coffee holder base with a filter paper cover folded over the coffee in the filter paper cup.
Figure 51D:
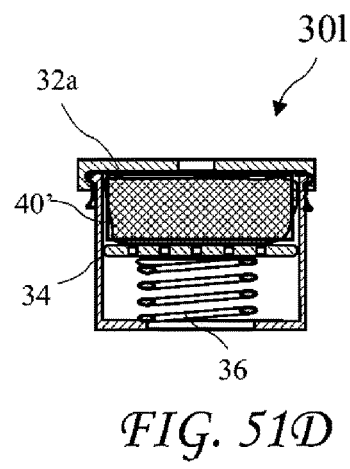
FIG. 51D is a cross-sectional view of the twelfth coffee holder taken along line 50-50 of FIG. 49 showing the lid attached to the base with the coffee and the filter paper cup residing in the coffee holder base with the coffee tamped.

A cross-sectional view of the twelfth coffee holder 30l taken along line 50-50 of FIG. 49 showing the lid 32a, coffee 41, the filter paper cup 40' with lid 40d, above the coffee holder base 31a is shown in FIG. 51A, a cross-sectional view of the twelfth coffee holder 30l taken along line 50-50 of FIG. 49 showing the lid 32a, above the coffee 41 and the filter paper cup 40' resting in the coffee holder base 31a is shown in FIG. 51B, a cross-sectional view of the twelfth coffee holder 30l taken along line 50-50 of FIG. 49 showing the lid 32a, above the coffee 41 and the filter paper cup 40' resting in the coffee holder base 31a with the filter paper cover 40d folded over the coffee 41 in the filter paper cup 40' is shown in FIG. 51C, and a cross-sectional view of the twelfth coffee holder 30l taken along line 50-50 of FIG. 49 showing the lid 32a attached to the base 31a with the coffee 41 and the filter paper cup 40' residing in the coffee holder base 31a with the coffee 41 tamped is shown in FIG. 51D. In embodiments with the coffee 41 partially exposed above the base 31a, some coffee 41 may escape during tamping. Using the filter paper cup 40' having the fold over paper lid 40d reduces or eliminates such escape of coffee 41.

A side view of a thirteenth coffee holder 30m with a releasable tamping latch 64 according to the present invention is shown in FIG. 52 and a cross-sectional view of the thirteenth coffee holder 30m taken along line 53-53 of FIG. 52 showing an empty coffee holder is shown in FIG. 53. The latch 64 is held in a latched position by a spring loaded lever 62 on the exterior of the base 31a.

A cross-sectional view of the thirteenth coffee holder 30m taken along line 53-53 of FIG. 52 showing the lid 32a, coffee 41, the filter paper cup 40, above the base 31a, and the coffee holder base 31a, with the tamping latch 64 retaining the bottom tamper 34 is shown in FIG. 54A, a cross-sectional view of the thirteenth coffee holder 30m taken along line 53-53 of FIG. 52 showing the lid 32a above the coffee 41 and the filter paper cup 40 resting in the coffee holder base 31a, with the tamping latch 64 retaining the bottom tamper 34 is shown in FIG. 54B, a cross-sectional view of the thirteenth coffee holder 30m taken along line 53-53 of FIG. 52 showing the lid 32a, above the coffee 41 and the filter paper cup 40 resting in the coffee holder base 31a with the tamping latch 64 retaining the bottom tamper 34 is shown in FIG. 54C, and a cross-sectional view of the fourteenth coffee holder 30m taken along line 53-53 of FIG. 52 showing the lid 32a attached to the base 31a with the coffee 41 and the filter paper cup 40 residing in the coffee holder base 31a with tamping latch 64 released and the coffee 41 tamped is shown in FIG. 54D. The lever 62 thus holds the latch 64 until the lever 62 is pushed to release the latch 62 to release the bottom tamper 34 to tamp the coffee 41.

A side view of a fourteenth coffee holder 30n with a releasable tamping latch 64 according to the present invention is shown in FIG. 55 and a cross-sectional view of the fourteenth coffee holder taken along line 56-56 of FIG. 55 showing an empty coffee holder is shown in FIG. 56. The lever 62 holds the latch 64 until the arm 66 attached to the lid 32g pushes the lever 62 to release the latch 64.

A cross-sectional view of the fourteenth coffee holder 30n taken along line 56-56 of FIG. 55 showing the lid 32g, coffee 41, and the filter paper cup 40, above the coffee holder base 31a, with the tamping latch 64 retaining the bottom tamper 34 is shown in FIG. 57A, a cross-sectional view of the fourteenth coffee holder 30n taken along line 56-56 of FIG. 55 showing the lid 32g above the coffee 41 and the filter paper cup 40 resting in the coffee holder base 31a, with the tamping latch 64 retaining the bottom tamper 34 is shown in FIG. 57B, a cross-sectional view of the fourteenth coffee holder 30n taken along line 56-56 of FIG. 55 showing the lid 32g, above the coffee 41 and the filter paper cup 40 resting in the coffee holder base 31a with the tamping latch 64 released but just prior to tamping (the bottom tamper has been released but has not moved upward against the coffee 41) is shown in FIG. 57C, and a cross-sectional view of the fourteenth coffee holder 30n taken along line 56-56 of FIG. 55 showing the lid 32g attached to the base with the coffee 41 and the filter paper cup 40 residing in the coffee holder base 31a with tamping latch 64 released and the coffee 41 tamped is shown in FIG. 57D. The lever 62 thus holds the latch 64 until the lever 62 is pushed by the arm 66 to release the latch 62 to release the bottom tamper 34 to tamp the coffee 41.

Figure 58:
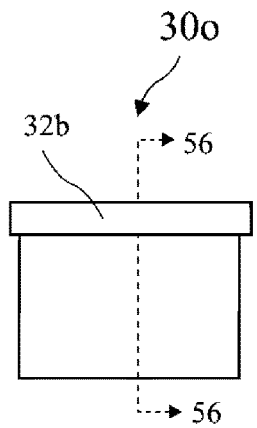
FIG. 58 is a side view of a fifteenth coffee holder with a releasable tamping lock according to the present invention.
Figure 59:
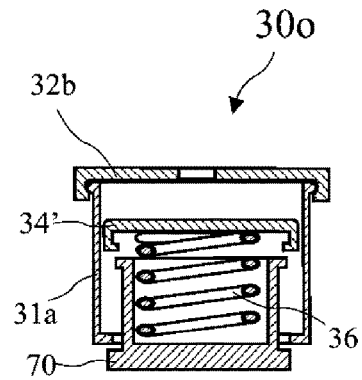
FIG. 59 is a cross-sectional view of the fifteenth coffee holder taken along line 59-59 of FIG. 58 showing an empty coffee holder.

A side view of a fourteenth coffee holder 30o with a releasable tamping lock according to the present invention is shown in FIG. 58 and a cross-sectional view of the fourteenth coffee holder 30o taken along line 59-59 of FIG. 58 showing an empty coffee holder is shown in FIG. 59. The coffee holder 30o includes a tamping lock 70 which engages a second bottom tamper 34' to hold the second bottom tamper in a down position for filling the coffee holder with coffee and releases the bottom tamper 34' to be pushed upwards by the tamping spring 36 to tamp the coffee after the holder lid 32b is attached to the base 31a.

Figure 60A:
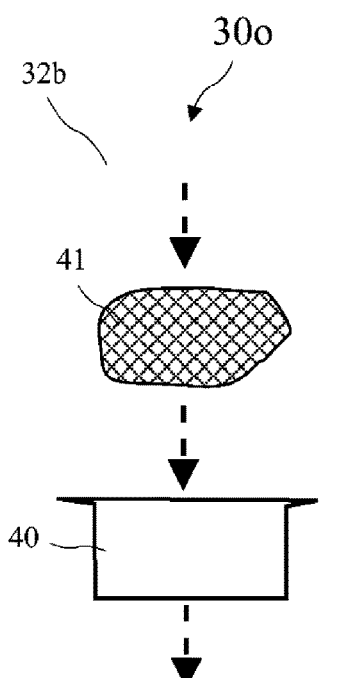
FIG. 60A is a cross-sectional view of the fifteenth coffee holder taken along line 59-59 of FIG. 58 showing a lid, coffee, a filter paper cup, above the base, and the coffee holder base, with the tamping lock retaining the bottom tamper.
Figure 60B:
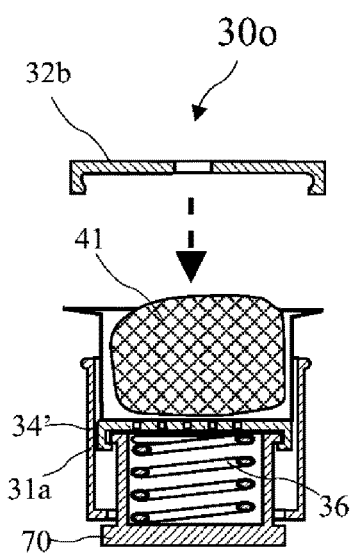
FIG. 60B is a cross-sectional view of the fifteenth coffee holder taken along line 59-59 of FIG. 58 showing the lid, above the coffee and the filter paper cup resting in the coffee holder base, with the tamping lock retaining the bottom tamper.
Figure 60C:
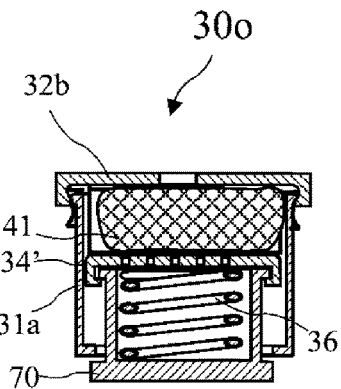
FIG. 60C is a cross-sectional view of the fifteenth coffee holder taken along line 59-59 of FIG. 58 showing the lid, above the coffee and the filter paper cup resting in the coffee holder base prior to tamping.
Figure 60D:
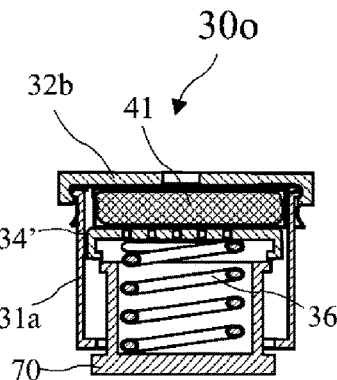
FIG. 60D is a cross-sectional view of the fifteenth coffee holder taken along line 59-59 of FIG. 58 showing the lid attached to the base with the coffee and the filter paper cup residing in the coffee holder base with tamping lock released and the coffee tamped.

A cross-sectional view of the fourteenth coffee holder 30o taken along line 59-59 of FIG. 58 showing a lid 32b, coffee 41, a filter paper cup 40, above the coffee holder base 31, with the tamping lock 70 retaining the bottom tamper 34' is shown in FIG. FIG. 60A, cross-sectional view of the fourteenth coffee holder taken along line 59-59 of FIG. 58 showing the lid, above the coffee and the filter paper cup resting in the coffee holder base, with the tamping latch retaining the bottom tamper 34' is shown in FIG. FIG. 60B, a cross-sectional view of the fourteenth coffee holder taken along line 59-59 of FIG. 58 showing the lid, above the coffee and the filter paper cup resting in the coffee holder base prior to tamping is shown in FIG. 60A, and a cross-sectional view of the fourteenth coffee holder taken along line 59-59 of FIG. 58 showing the lid 32b attached to the base 31a with the coffee 41 and the filter paper cup 41 residing in the coffee holder base 31a with tamping lock released and the coffee tamped is shown in FIG. 60D.

Figure 61:
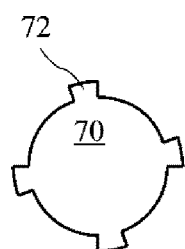
FIG. 61 is a top view of a lock according to the present invention.
Figure 62:
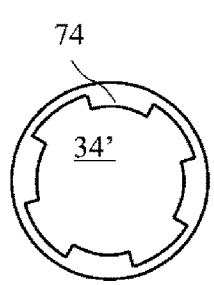
FIG. 62 is a bottom view of a second bottom tamper with cooperates with the tamping lock according to the present invention.

A top view of a tamping lock 70 according to the present invention is shown in FIG. 61 and a bottom view of a second bottom tamper 34' which cooperates with the tamping lock 70 according to the present invention is shown ion FIG. 62. The tamping lock 70 includes teeth 72 which are inserted between and turned to engage lips 74 on the bottom of the bottom tamper 34' to hold the bottom tamper in the down position for filling the coffee holder 30o with coffee 41. After the coffee holder 30o is filled with coffee and the holder lid 32b attached, the tamping lock is twisted to release the bottom tamper 32b to tamp the coffee.

Figure 63C:
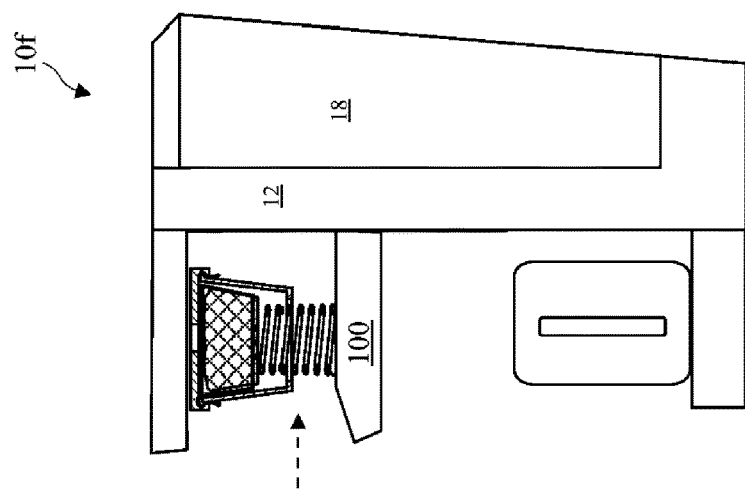
Figure 63B:
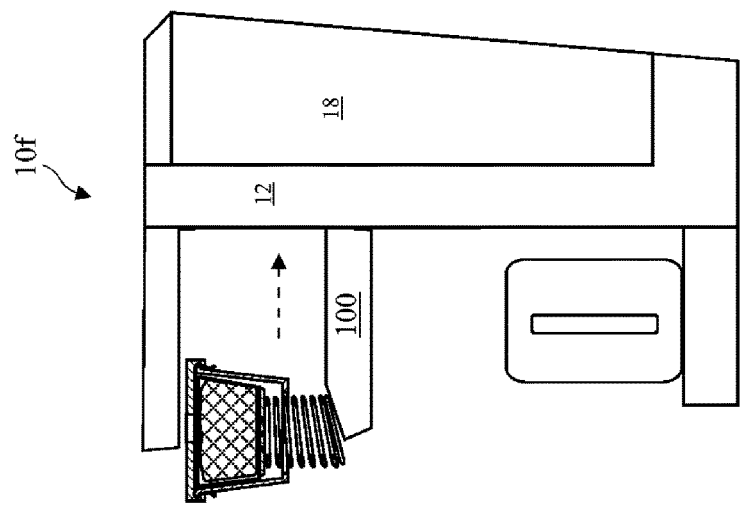
Figure 63A:
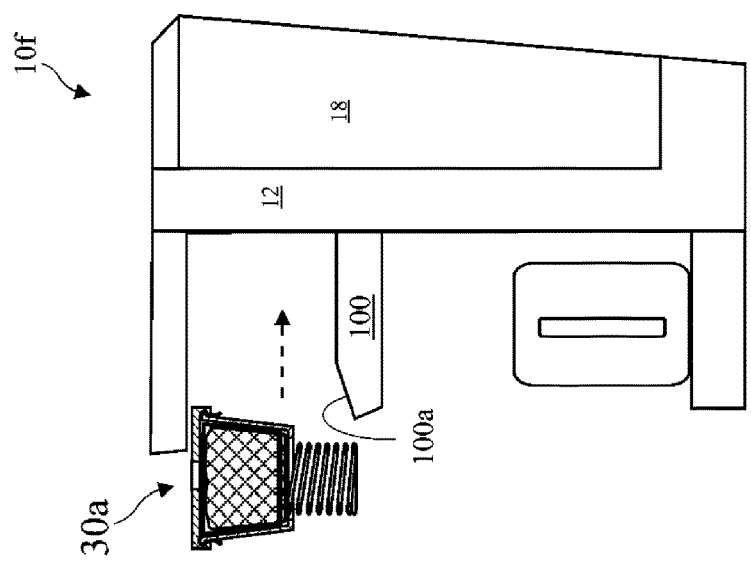

FIGS. 63A-63C show an embodiment of the coffee holder 10f having a ramped lower shelf 100. The coffee holder 30a (see FIGS. 3-5D) with the bottom tamping spring 36 may be horizontally disposed into the coffee maker 10f, sliding up a ramp 100a, and thereby pushing the spring 36 upward into the holder 30a to tamp the coffee 41 in the coffee holder 30a. The coffee maker 10f may also include a shelf and ramp rotated 90 degrees allowing the coffee holder 30a to be vertically disposed into the coffee maker to tamp the coffee 41.

Figure 64C:
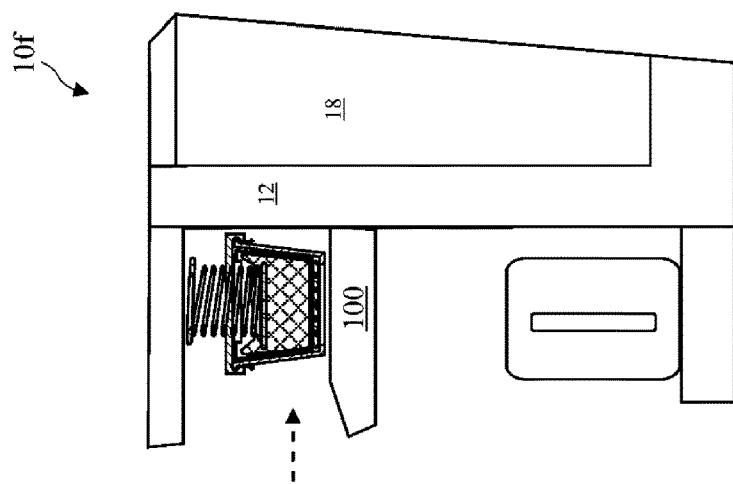
Figure 64B:
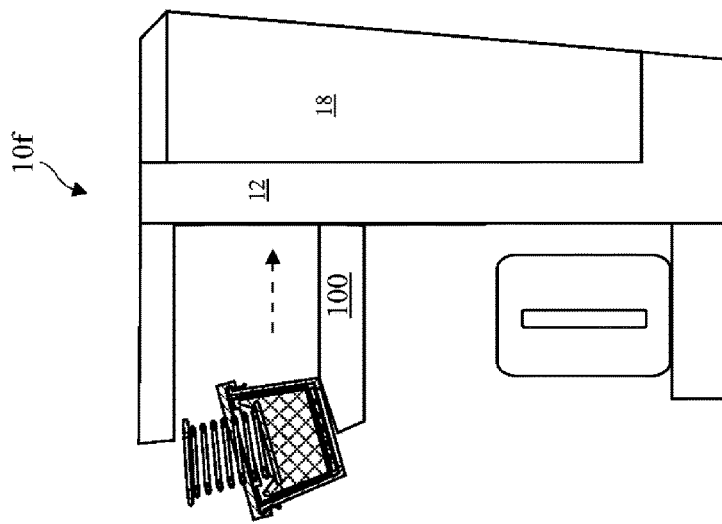
Figure 64A:
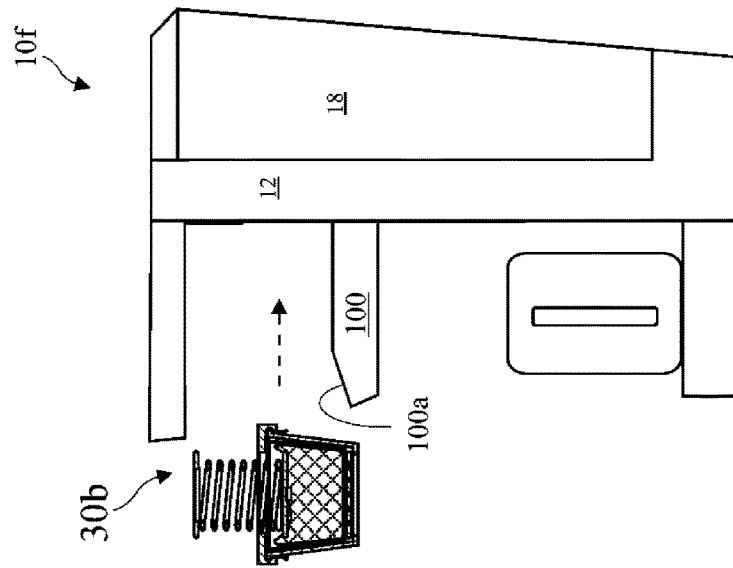

FIGS. 64A-64C show the coffee holder 10f having the ramped lower shelf 100. The coffee holder 30b (see FIGS. 9-11D) with the top tamping spring 36 may be horizontally disposed into the coffee maker 10f, sliding up a ramp 100a, and thereby pushing the spring 36 downward into the holder 30b to tamp the coffee 41 in the coffee holder 30b. The coffee maker 10f may also include a shelf and ramp rotated 90 degrees allowing the coffee holder 30b to be vertically disposed into the coffee maker to tamp the coffee 41.

Figure 65C:
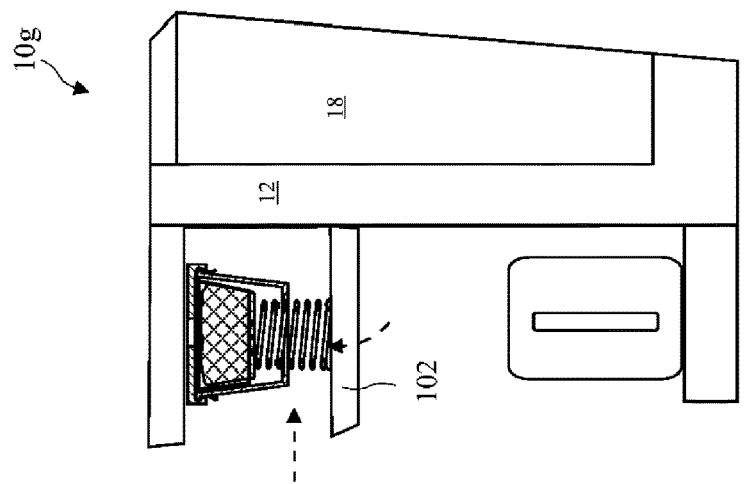
Figure 65B:
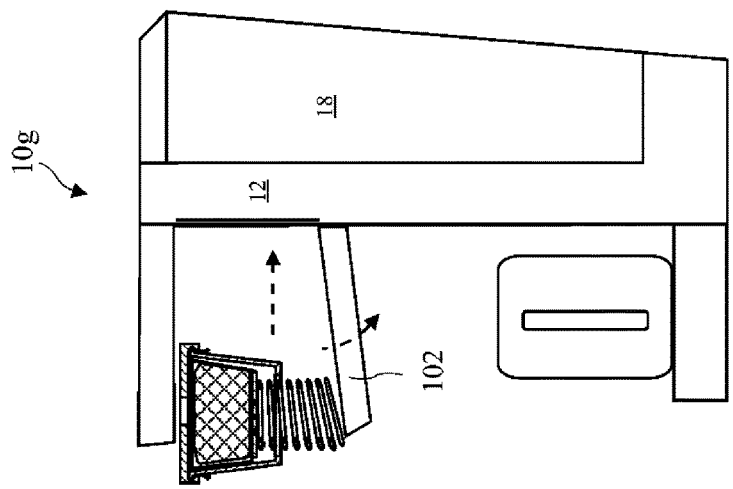
Figure 65A:
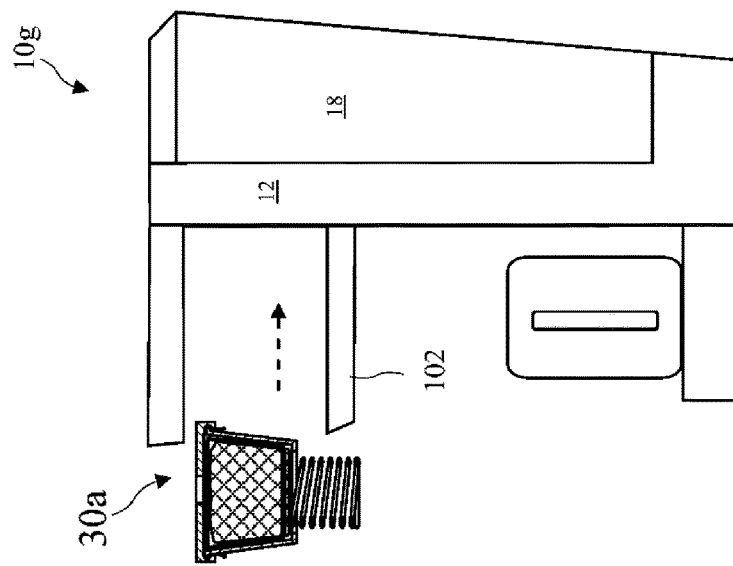

FIGS. 65A-65C show an embodiment of the coffee holder 10g having a springed (or spring biased) lower shelf 102. The coffee holder 30a (see FIGS. 3-5D) with the bottom tamping spring 36 may be horizontally disposed into the coffee maker 10f, pushing the springed lower shelf 102 downward, and upon releasing the coffee holder 30a, the springed lower shelf 102 returns towards an original position, thereby pushing the spring 36 upward into the holder 30a to tamp the coffee 41 in the coffee holder 30a. The coffee maker 10f may also include a shelf and springed shelf rotated 90 degrees allowing the coffee holder 30a to be vertically disposed into the coffee maker to tamp the coffee 41. The springed shelf may pivot as shown in FIGS. 65B and 65C, or may translate vertically, or may have a combination of pivoting and translating.

Figure 66C:
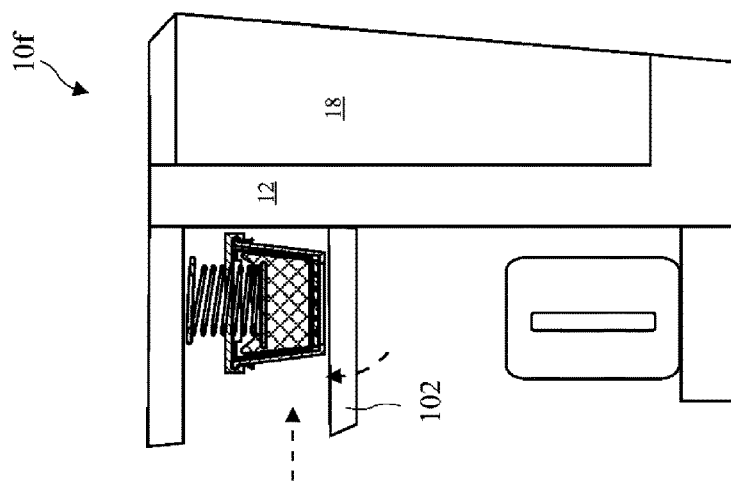
Figure 66B:
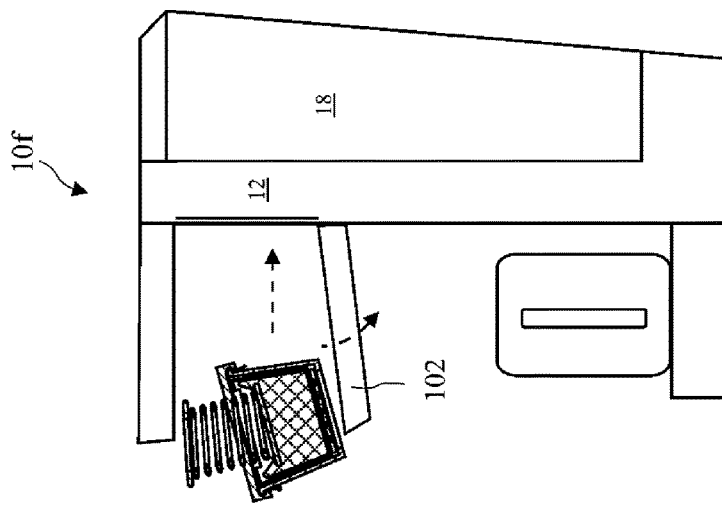
Figure 66A:
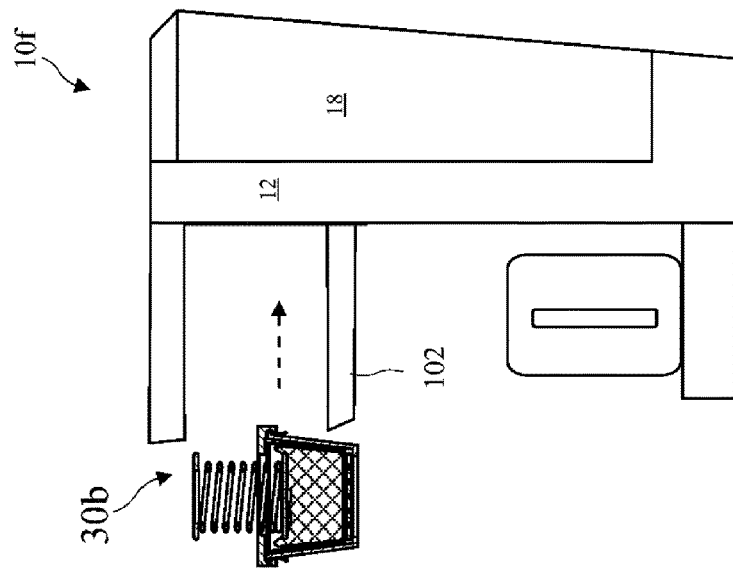

FIGS. 66A-66C show the coffee holder 10g having the springed lower shelf 102. The coffee holder 30b (see FIGS. 9-11D) with the top tamping spring 36 may be horizontally disposed into the coffee maker 10f, pushing the springed lower shelf 102 downward, and upon releasing the coffee holder 30b, the springed lower shelf 102 returns towards an original position, thereby pushing the spring 36 downward into the holder 30b to tamp the coffee 41 in the coffee holder 30b. The coffee maker 10f may also include a shelf and springed shelf rotated 90 degrees allowing the coffee holder 30b to be vertically disposed into the coffee maker to tamp the coffee 41. The springed shelf may pivot as shown in FIGS. 66B and 66C, or may translate vertically, or may have a combination of pivoting and translating.

Figure 67C:
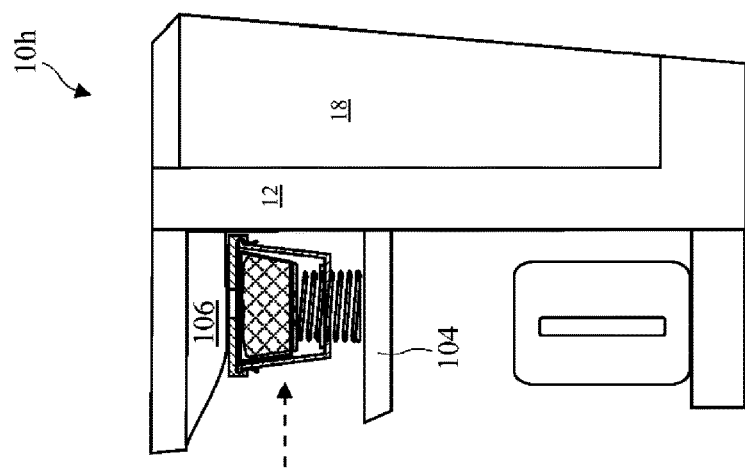
Figure 67B:
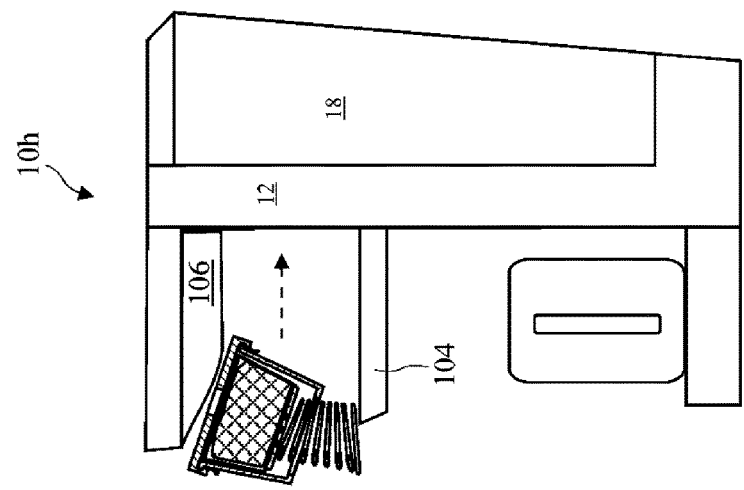
Figure 67A:
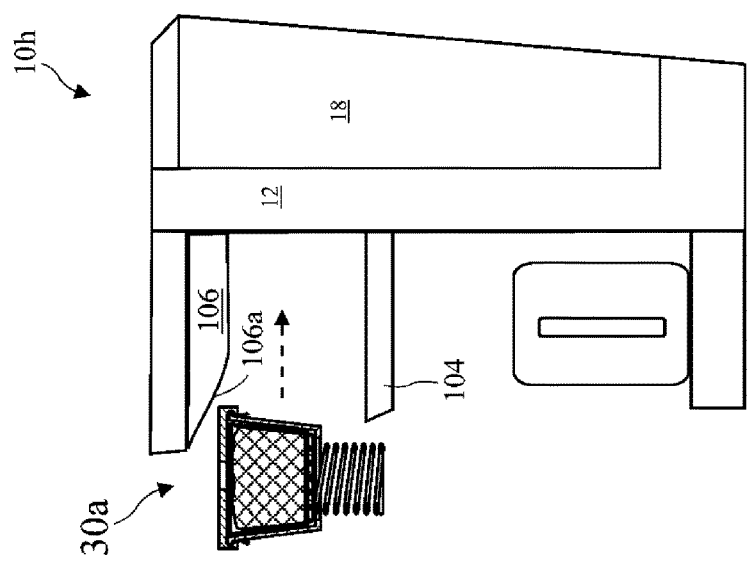

FIGS. 67A-67C show an embodiment of the coffee holder 10h having a ramped upper shelf 106. The coffee holder 30a (see FIGS. 3-5D) with the bottom tamping spring 36 may be horizontally disposed into the coffee maker 10h, between a lower shelf 104 and the upper shelf 106, the top of the coffee housing 30a sliding down a ramp 106a, and thereby pushing the spring 36 upward into the holder 30a to tamp the coffee 41 in the coffee holder 30a. The coffee maker 10h may also include a shelf and ramp rotated 90 degrees allowing the coffee holder 30a to be vertically disposed into the coffee maker to tamp the coffee 41.

Figure 68C:
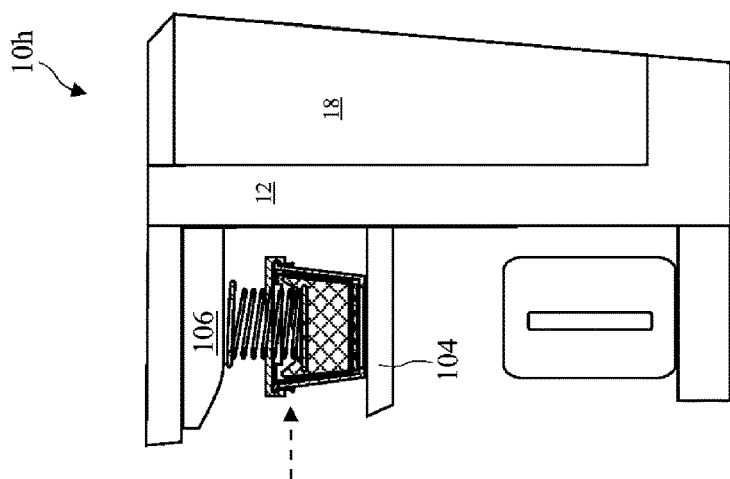
Figure 68B:
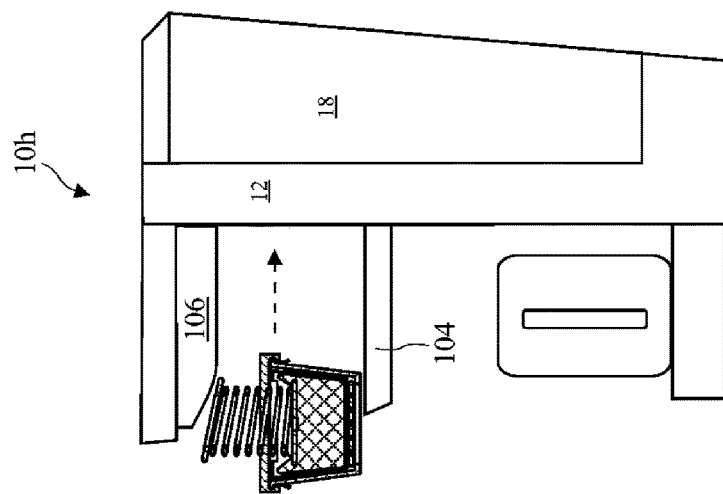
Figure 68A:
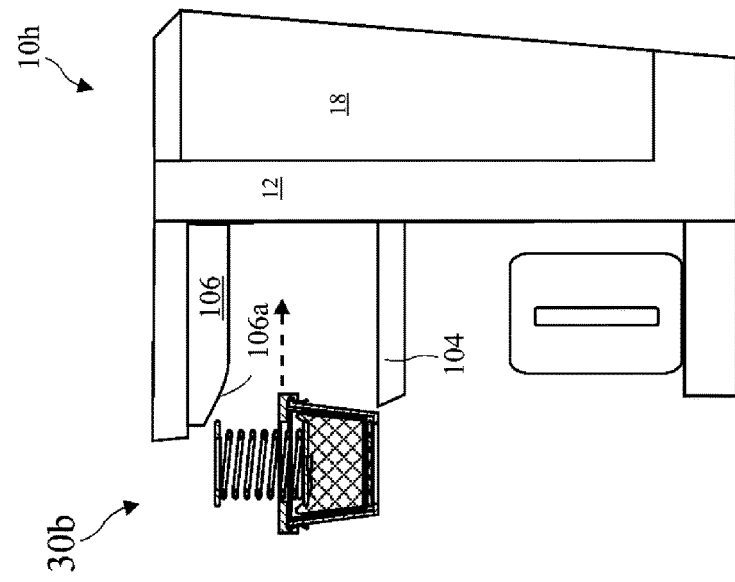

FIGS. 68A-68C show an embodiment of the coffee holder 10h having the ramped upper shelf 106. The coffee holder 30b (see FIGS. 8-11D) with the top tamping spring 36 may be horizontally disposed into the coffee maker 10h between the lower shelf 104 and the upper shelf 106, the spring 36 sliding down a ramp 106a, and thereby pushing the spring 36 downward into the holder 30b to tamp the coffee 41 in the coffee holder 30b. The coffee maker 10h may also include a shelf and ramp rotated 90 degrees allowing the coffee holder 30b to be vertically disposed into the coffee maker to tamp the coffee 41.

Figure 69C:
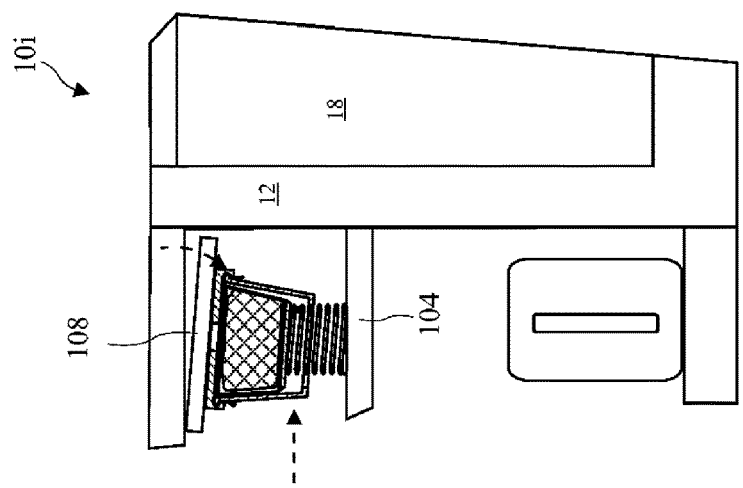
Figure 69B:
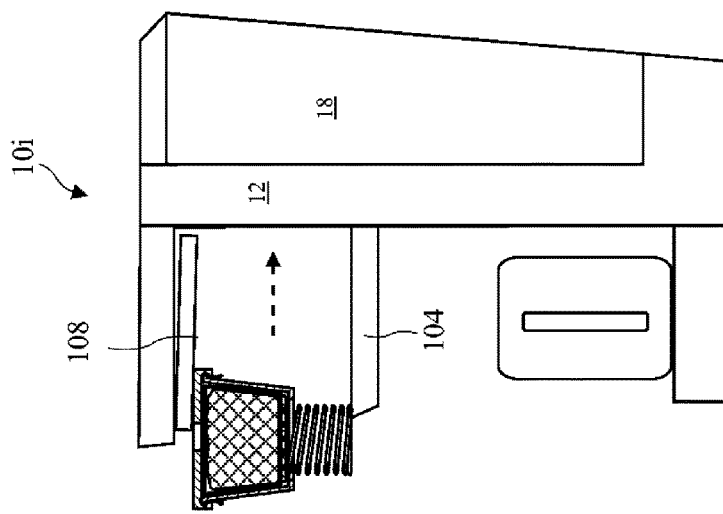
Figure 69A:
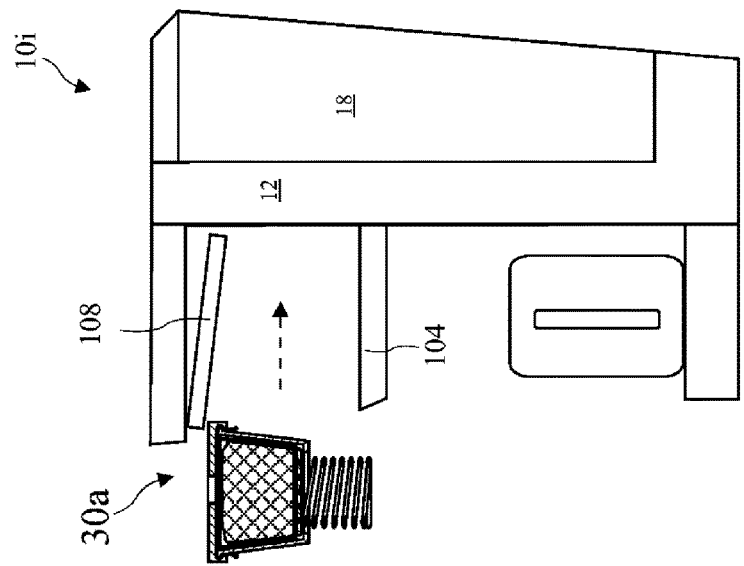

FIGS. 69A-69C show an embodiment of the coffee holder 10i having a springed (or spring biased) upper shelf 108. The coffee holder 30a (see FIGS. 3-5D) with the bottom tamping spring 36 may be horizontally disposed into the coffee maker 10i, pushing the springed upper shelf 108 upward, and upon releasing the coffee holder 30a, the springed upper shelf 108 returns towards an original position, thereby pushing the spring 36 upward into the holder 30a to tamp the coffee 41 in the coffee holder 30a. The coffee maker 10i may also include a shelf and springed shelf rotated 90 degrees allowing the coffee holder 30a to be vertically disposed into the coffee maker to tamp the coffee 41. The springed shelf may pivot as shown in FIGS. 69B and 69C, or may translate vertically, or may have a combination of pivoting and translating.

Figure 70C:
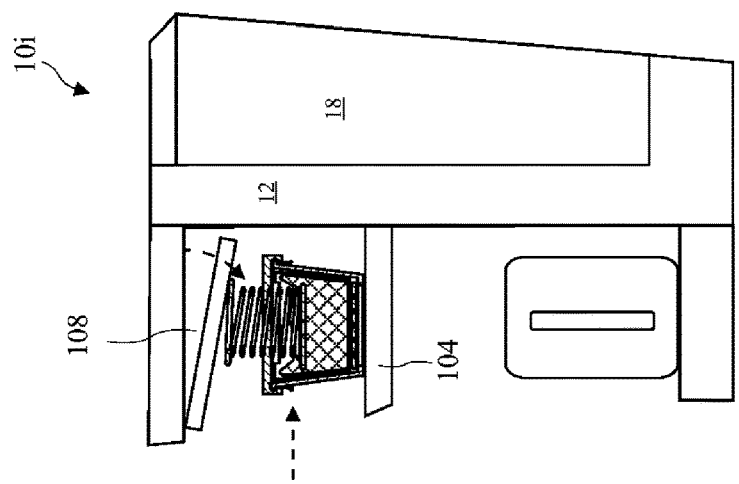
Figure 70B:
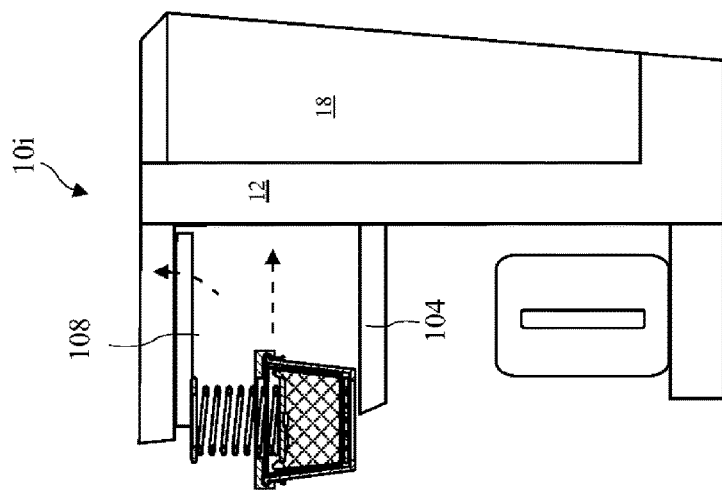
Figure 70A:
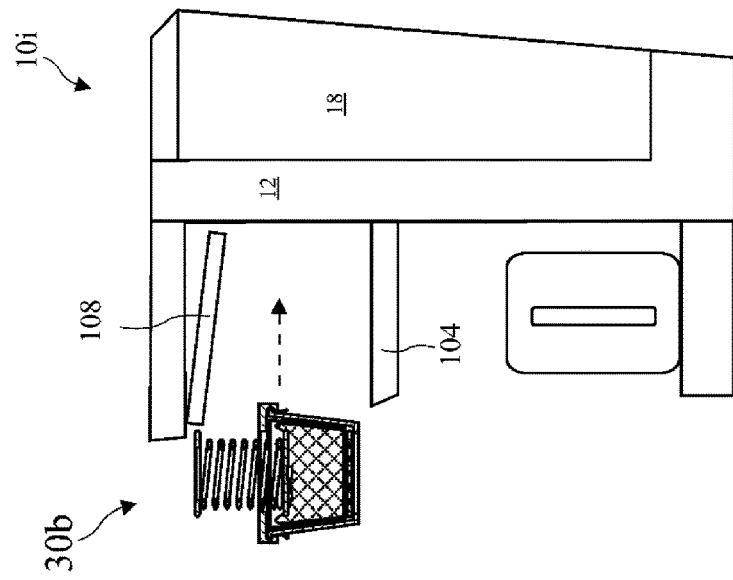

FIGS. 70A-70C show the coffee holder 10i having the springed (or spring biased) upper shelf 108. The coffee holder 30b (see FIGS. 8-11D) with the top tamping spring 36 may be horizontally disposed into the coffee maker 10i, pushing the springed upper shelf 108 upward, and upon releasing the coffee holder 30b, the springed upper shelf 108 returns towards an original position, thereby pushing the spring 36 downward into the holder 30b to tamp the coffee 41 in the coffee holder 30a. The coffee maker 10i may also include a shelf and springed shelf rotated 90 degrees allowing the coffee holder 30b to be vertically disposed into the coffee maker to tamp the coffee 41. The springed shelf may pivot as shown in FIGS. 69B and 69C, or may translate vertically, or may have a combination of pivoting and translating.

Figure 71C:
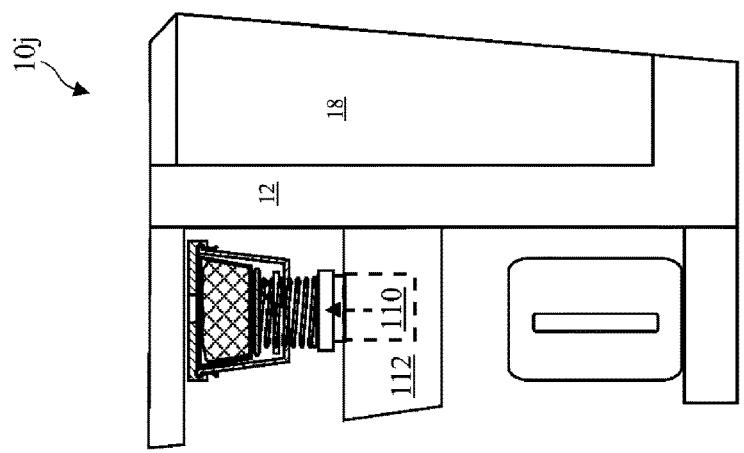
Figure 71B:
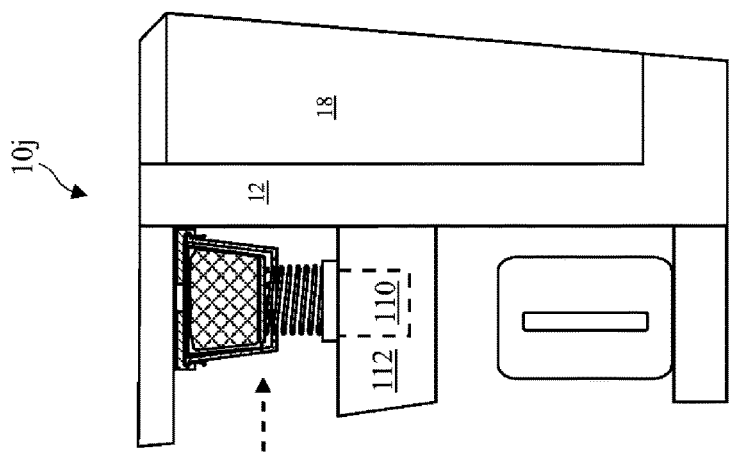
Figure 71A:
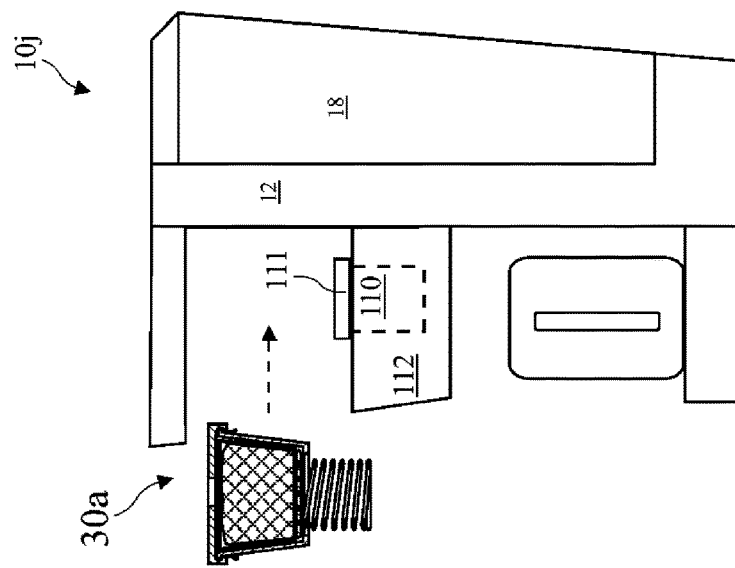

FIGS. 71A-71C show an embodiment of the coffee holder 10j having a linear actuator 110 residing in a lower shelf 112. A vertically moving member 111 of the actuator 110 movable upwards from an initial position to an actuated position. The coffee holder 30a (see FIGS. 3-5D) with the bottom tamping spring 36 may be horizontally disposed into the coffee maker 10j, onto the actuator 110. When the coffee making is initiated, the actuator pushes the spring 36 upward into the holder 30a to tamp the coffee 41 in the coffee holder 30a. The coffee maker 10j may also include a shelf and actuator rotated 90 degrees allowing the coffee holder 30a to be vertically disposed into the coffee maker to tamp the coffee 41. The linear actuator 110 may be electrical (e.g., a solenoid or linear motor), or may be hydraulic or pneumatic.

Figure 72C:
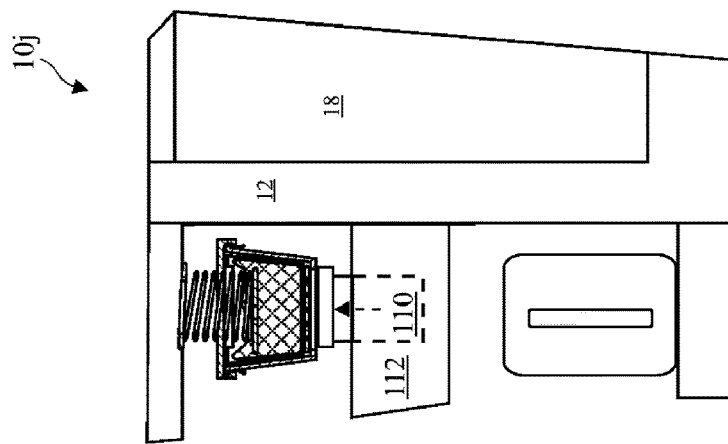
Figure 72B:
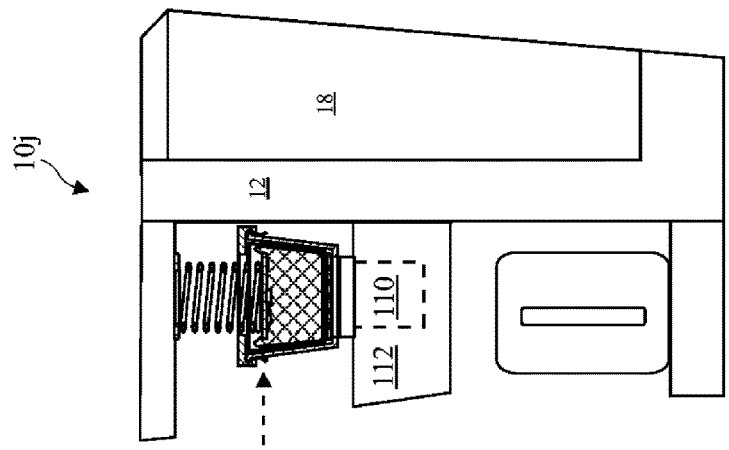
Figure 72A:
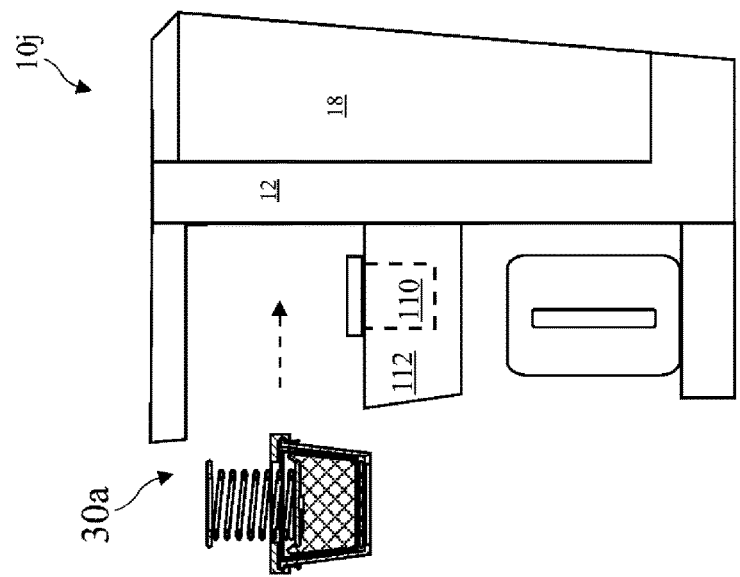

FIGS. 72A-72C show the coffee holder 10j having the linear actuator 110 residing in a lower shelf 112. The coffee holder 30b (see FIGS. 8-11D) with the top tamping spring 36 may be horizontally disposed into the coffee maker 10j, onto the actuator 110. When the coffee making is initiated, the actuator pushes the coffee holder 30b upward causing the spring 36 to reach downward into the holder 30b to tamp the coffee 41 in the coffee holder 30b. The coffee maker 10j may also include a shelf and actuator rotated 90 degrees allowing the coffee holder 30*b* to be vertically disposed into the coffee maker to tamp the coffee 41.

FIGS. 73A-73C show an embodiment of the coffee holder 10*k* having the linear actuator 110 residing in an upper shelf 114. The coffee holder 30*a* (see FIGS. 3-5D) with the bottom tamping spring 36 may be horizontally disposed into the coffee maker 10*k*, under the actuator 110. When the coffee making is initiated, the actuator pushes the coffee holder 30*a* downward and thus the spring 36 upward into the holder 30*a* to tamp the coffee 41 in the coffee holder 30*a*. The coffee maker 10*k* may also include a shelf and actuator rotated 90 degrees allowing the coffee holder 30*a* to be vertically disposed into the coffee maker to tamp the coffee 41.

FIGS. 74A-74C show the coffee holder 10*k* having the linear actuator 110 residing in the upper shelf 114. The coffee holder 30*b* (see FIGS. 8-11D) with the top tamping spring 36 may be horizontally disposed into the coffee maker 10*k*, under the actuator 110. When the coffee making is initiated, the actuator pushes the spring 36 downward into the holder 30*a* to tamp the coffee 41 in the coffee holder 30*b*. The coffee maker 10*k* may also include a shelf and actuator rotated 90 degrees allowing the coffee holder 30*b* to be vertically disposed into the coffee maker to tamp the coffee 41.

FIGS. 75A-75C show an embodiment of the coffee holder 10*k* having the linear actuator 110 residing in the upper shelf 114. The coffee holder 30*c* (see FIGS. 15-17C) may be horizontally disposed into the coffee maker 10*k*, under the actuator 110. When the coffee making is initiated, the actuator pushes downward into the holder 30*c* to tamp the coffee 41 in the coffee holder 30*c*. The coffee maker 10*k* may also include a shelf and actuator rotated 90 degrees allowing the coffee holder 30*a* to be vertically disposed into the coffee maker to tamp the coffee 41. While the coffee holder 30*c* is a preferred coffee holder for use with the coffee maker 10*k*, the coffee holders 30*a* and 30*b* may alternatively be used with the coffee maker 10*k* and such use is intended to come within the scope of the present invention.

FIGS. 76A-76C show an embodiment of the coffee holder 10*l* having the linear actuator 110 residing in the upper shelf 116, the upper shelf including rails 118 for engaging the coffee holder 30*c*. The coffee holder 30*c* (see FIGS. 15-17C) may be horizontally disposed into the coffee maker 10*l*, under the actuator 110. When the coffee making is initiated, the actuator pushes downward into the holder 30*c* to tamp the coffee 41 in the coffee holder 30*c*. The coffee maker 10*l* may also include a shelf and actuator rotated 90 degrees allowing the coffee holder 30*a* to be vertically disposed into the coffee maker to tamp the coffee 41.

FIGS. 77A-77C show an embodiment of the coffee holder 10*m* having the linear actuator 110 residing in the upper shelf 116, and a drawer 120 for receiving the coffee holder 30*c*. The coffee holder 30*c* (see FIGS. 15-17C) may be vertically disposed into the drawer 120 and the drawer horizontally closed, under the actuator 110. When the coffee making is initiated, the actuator pushes downward into the holder 30*c* to tamp the coffee 41 in the coffee holder 30*c*. The coffee maker 10*m* may also include a drawer and actuator rotated 90 degrees allowing the coffee holder 30*a* to be horizontally disposed into the drawer, and the drawer vertically closed to tamp the coffee 41. While the coffee holder 30*c* is a preferred coffee holder for use with the coffee maker 10*m*, the coffee holders 30*a* and 30*b* may alternatively be used with the coffee maker 10*m* having, for example, a greater drawer height to allow vertical space for the spring 36, and such use is intended to come within the scope of the present invention.

FIGS. 78A-78C show an embodiment of the coffee holder 10*m*' having the linear actuator 110 residing in the upper shelf 116, and a drawer 120 for receiving the coffee holder 30*c*. The coffee holder 30*c* (see FIGS. 15-17C) may be vertically disposed into the drawer 120 and the drawer pivoted about a vertical axis 123, under the actuator 110. When the coffee making is initiated, the actuator pushes downward into the holder 30*c* to tamp the coffee 41 in the coffee holder 30*c*. The coffee maker 10*m*' may also include a drawer and actuator rotated 90 degrees allowing the coffee holder 30*a* to be horizontally disposed into the drawer, and the drawer rotated about a horizontal axis to position the coffee holder 30*c* to tamp the coffee 41. While the coffee holder 30*c* is a preferred coffee holder for use with the coffee maker 10*m*', the coffee holders 30*a* and 30*b* may alternatively be used with the coffee maker 10*m*' having, for example, a greater drawer height to allow vertical space for the spring 36, and such use is intended to come within the scope of the present invention.

FIGS. 79A-79C show an embodiment of the coffee holder 10*n* having a fixed tamper 122 reaching down from an upper shelf 124, and a vertically translating drawer 126 for receiving the coffee holder 30*c*. The coffee holder 30*c* (see FIGS. 15-17C) may be vertically disposed into the drawer 126 and the drawer vertically closed under the shelf 124. When the drawer 126 is closed, the tamper 122 pushes downward into the holder 30*c* to tamp the coffee 41 in the coffee holder 30*c*. The coffee maker 10*n* may also include a drawer and fixed tamper rotated 90 degrees allowing the coffee holder 30*a* to be horizontally disposed into the drawer, and the drawer horizontally closed to tamp the coffee 41. While the coffee holder 30*c* is a preferred coffee holder for use with the coffee maker 10*n*, the coffee holders 30*a* and 30*b* may alternatively be used with the coffee maker 10*n* and such use is intended to come within the scope of the present invention. Further while the fixed tamper 122 provides a low cost embodiment, the actuator 110 may replace the tamper 122.

FIGS. 80A-80C show an embodiment of the coffee holder 10*n* having the actuator 110 reaching down from the upper shelf 124, and a vertically pivoting drawer 128 for receiving the coffee holder 30*c*. The coffee holder 30*c* (see FIGS. 15-17C) may be vertically disposed into the drawer 128 and the drawer pivoted upward along a horizontal axis and closed under the shelf 124. When the drawer 126 is closed, or when coffee making is initiated, the actuator 110 pushes downward into the holder 30*c* to tamp the coffee 41 in the coffee holder 30*c*. The coffee maker 10*n* may also include a drawer and actuator rotated 90 degrees allowing the coffee holder 30*a* to be horizontally disposed into the drawer, and the drawer horizontally closed to tamp the coffee 41. While the coffee holder 30*c* is a preferred coffee holder for use with the coffee maker 100, the coffee holders 30*a* and 30*b* may alternatively be used with the coffee maker 100 and such use is intended to come within the scope of the present invention. Further, while the actuator 110 is a preferred embodiment, the fixed tamper 122 may replace the actuator 110.

FIGS. 81A-81C show an embodiment of the coffee holder 10*p* having a fixed tamper 122 reaching down from a vertically translating upper shelf 124, and a fixed drawer 132 (or shelf 104) for receiving the coffee holder 30*c*. The coffee holder 30*c* (see FIGS. 15-17C) may be vertically disposed into the drawer 132 and the vertically translating upper shelf 124 vertically lowered over the coffee holder 30*c*. When the upper shelf 124 is lowered the tamper 122 pushes downward into the holder 30*c* to tamp the coffee 41 in the coffee holder 30c. The coffee maker 10p may also include a drawer 132 and translating tamper rotated 90 degrees allowing the coffee holder 30a to be horizontally disposed into the drawer, and the drawer horizontally closed to tamp the coffee 41. While the coffee holder 30c is a preferred coffee holder for use with the coffee maker 10n, the coffee holders 30a and 30b may alternatively be used with the coffee maker 10n and such use is intended to come within the scope of the present invention. Further while the fixed tamper 122 provides a low cost embodiment, the actuator 110 may replace the tamper 122 or by a spring, for example, the spring 36 in FIG. 38B.

FIG. 82 shows a solenoid actuator 110a according to the present invention. A water tube provides a flow of water to the solenoid actuator 110a. A piston 134 advances downward under the influence of a magnetic field created by a coil 135. The piston 134 may push a tamping spring 36 into a coffee housing, may push a coffee housing down over a spring 36, or may enter a coffee housing to tamp coffee inside the coffee housing. The water is provided to the coffee housing through the nozzle 19.

FIG. 83 shows a solenoid actuator 110a with a spray stream head 135 according to the present invention. The spray stream head 135 replaces the nozzle 19 and provides a dispersed spray into the coffee holder.

FIG. 84A shows a hydraulic actuator 110b according to the present invention in an initial position and FIG. 84B shows the hydraulic actuator 110b in a downward tamping position. The tamper 110b responded to the flow of water through the water tube 15 and the water pressure pushes a tamper 136 downward to tamp the coffee in the coffee holder. Seals 140 prevent water from leaking from the tamper 110b and help guide the plunger 136. A spring 142 biases the tamper 136 to the initial position in the absence of water pressure inside the hydraulic actuator 110b. The hydraulic actuator 110b thus automatically tamps the coffee when the coffee maker is actuated.

FIG. 85A shows a second hydraulic actuator 110c in an initial position and FIG. 85B shows the hydraulic actuator 110c in a downward extended tamping position. The hydraulic actuator 110c includes an anti-leak tube 138 having a closed upper end 138a and an open lower end 138b. In the initial position, a top end of the 19a of the nozzle 19 resides in the anti-leak tube 138 to prevent water from escaping the nozzle 19 and in the extended position the top end of the needle 19a is clear of the anti-leak tube 138 allowing water to escape from the needle into the coffee holder. The hydraulic actuator 110c is otherwise similar to the hydraulic actuator 110b.

Various embodiments have described cooperation with water or heated water. Those skilled in the art will recognize that other liquids may be used in drinks, and a drink maker according to the present invention using any liquid is intended to come within the scope of the present invention.

While the present invention is described above as placing loose coffee in a coffee holder, the invention may also be practiced by placing prepackaged coffee, for example coffee pods, into the coffee holder. Further, while the coffee holder is generally described as having a snap on lid, a screw on lid may also be used, and in general the various elements of different embodiments of coffee holders and coffee makers described above may be mixed to provide new embodiments and such new embodiments are intended to come within the scope of the present invention. Embodiments described including a coffee holder with a top tamping spring, bottom tamping spring, or not tamping spring are generally interchangeable, and merely substituting a different coffee holder is intended to come within the scope of the present invention.

Further, many embodiments are described as including a coffee chamber comprising a filter paper cup. In many cases, a filter cup made of nylon mesh or metal mesh is equally suitable, and any coffee holder or combination of coffee maker and coffee holder including a filter chamber which holds coffee and allows the coffee to be tamped as described above is intended to come within the scope of the present invention regardless of the specific filter material.

While the invention herein disclosed has been described by means of specific embodiments and applications thereof, numerous modifications and variations could be made thereto by those skilled in the art without departing from the scope of the invention set forth in the claims.

I claim:

1. A brewing material holder configured for use in a brewing chamber of a beverage brewer, comprising:
    a holder body configured to hold brewing material; and
    a holder lid;
    wherein the holder body includes an open receiving end configured to receive the brewing material;
    wherein the holder lid is configured to engage the holder body to at least partially cover the open receiving end; and
    wherein the holder lid includes an opening configured to allow fluid to flow into the holder body;
    wherein the holder lid is configured to accommodate an injection nozzle of the beverage brewer; and
    wherein the brewing material holder is configured to be removably arranged in the brewing chamber of the beverage brewer.

2. The brewing material holder of claim 1, wherein:
    the holder lid opening is a through-hole; and
    the brewing material holder is configured to accept input fluid through the holder lid through-hole to wet the brewing material when held in the holder body.

3. The brewing material holder of claim 1, wherein the brewing material holder is configured to accept input fluid through the holder lid opening and to provide a corresponding outflow of fluid.

4. The brewing material holder of claim 1, wherein at least one of the holder body and the holder lid is separate from the beverage brewer.

5. The brewing material holder of claim 1, wherein the holder base is configured to rest on a surface of the brewing chamber of the beverage brewer.

6. The brewing material holder of claim 1, wherein the holder base includes an outer surface configured to rest on a surface of the brewing chamber of the beverage brewer.

7. The brewing material holder of claim 1, wherein the holder body is configured to receive the brewing material before the brewing material holder is arranged in the brewing chamber of the beverage brewer.

8. The brewing material holder of claim 7, wherein the holder lid is configured to engage the holder body to cover the open receiving end after the holder body receives the brewing material.

9. The brewing material holder of claim 1, wherein the holder lid is configured to engage the holder body to cover the open receiving end of the holder body before the brewing material holder is arranged in the brewing chamber of the beverage brewer.

10. A brewing material holder configured for use in a brewing chamber of a beverage brewer, comprising:
    a holder body configured to hold brewing material; and a holder lid;

wherein the holder body includes an open receiving end configured to receive the brewing material;

wherein the holder lid is configured to engage the holder body to at least partially cover the open receiving end;

wherein the holder lid includes:

a portion that is configured to accommodate an injection nozzle of the beverage brewer when the holder lid engages the holder body, and a through-hole in the portion configured to allow fluid to flow into an interior of the holder body; and wherein the brewing material holder is configured to be removably arranged in the brewing chamber of the beverage brewer.

11. The brewing material holder of claim 10, wherein the brewing material holder is configured to accept input fluid through the holder lid through-hole to wet the brewing material when held in the holder body.

12. The brewing material holder of claim 10, wherein the brewing material holder is configured to accept input fluid through the holder lid through-hole and to provide a corresponding outflow of fluid.

13. The brewing material holder of claim 10, further configured to be replaceably arranged in the brewing chamber of the beverage brewer.

14. The brewing material holder of claim 10, wherein at least one of the holder body and the holder lid is separate from the beverage brewer.

15. The brewing material holder of claim 10, wherein the holder base is configured to rest on a surface of the brewing chamber of the beverage brewer.

16. The brewing material holder of claim 10, wherein the holder base includes an outer surface configured to rest on a surface of the brewing chamber of the beverage brewer.

17. The brewing material holder of claim 10, wherein the holder body is configured to receive the brewing material before the brewing material holder is arranged in the brewing chamber of the beverage brewer.

18. The brewing material holder of claim 17, wherein the holder lid is configured to engage the holder body to cover the open receiving end after the holder body receives the brewing material.

19. The brewing material holder of claim 10, wherein the holder lid is configured to engage the holder body to cover the open receiving end of the holder body before the brewing material holder is arranged in the brewing chamber of the beverage brewer.

20. A brewing material holder configured for use in a brewing chamber of a beverage brewer, comprising:

a holder body configured to hold brewing material; and a holder lid;

wherein the holder body includes an open receiving end;

wherein the holder lid is configured to engage the holder body to at least partially cover the open receiving end;

wherein the holder lid includes:

a recessed portion that extends into the holder body when the holder lid engages the holder body, and a through-hole configured to allow fluid to flow into the holder body;

wherein the recessed portion of the holder lid is configured to accommodate an injection nozzle of the beverage brewer; and wherein the brewing material holder is configured to be removably arranged in the brewing chamber of the beverage brewer.

21. The brewing material holder of claim 20, wherein the brewing material holder is configured to accept input fluid through the holder lid through-hole to wet the brewing material when held in the holder body.

22. The brewing material holder of claim 20, wherein the brewing material holder is configured to accept input fluid through the holder lid through-hole and to provide a corresponding outflow of fluid.

23. The brewing material holder of claim 20, further configured to be replaceably arranged in the brewing chamber of the beverage brewer.

24. The brewing material holder of claim 20, wherein at least one of the holder body and the holder lid is separate from the beverage brewer.

25. The brewing material holder of claim 20, wherein the holder base is configured to rest on a surface of the brewing chamber of the beverage brewer.

26. The brewing material holder of claim 20, wherein the holder base includes an outer surface configured to rest on a surface of the brewing chamber of the beverage brewer.

27. The brewing material holder of claim 20, wherein the holder body is configured to receive the brewing material before the brewing material holder is arranged in the brewing chamber of the beverage brewer.

28. The brewing material holder of claim 27, wherein the holder lid is configured to engage the holder body to cover the open receiving end after the holder body receives the brewing material.

29. The brewing material holder of claim 20, wherein the holder lid is configured to engage the holder body to cover the open receiving end of the holder body before the brewing material holder is arranged in the brewing chamber of the beverage brewer.

30. A brewing material holder assembly for being used in a brewing chamber of a beverage brewer, comprising:

holding means for holding brewing material; and covering means for engaging the holding means;

wherein the holding means includes an open receiving end for receiving the brewing material;

wherein the covering means is configured to engage the holding means to at least partially cover the open receiving end;

wherein the covering means includes pass-through means for allowing fluid to flow into the holding means wherein the covering means is configured to accommodate an injection nozzle of the beverage brewer; and wherein the brewing material holder assembly is configured to be removably arranged in the brewing chamber of the beverage brewer.

\* \* \* \* \*